United States Patent
Takahashi et al.

(10) Patent No.: US 8,070,607 B2
(45) Date of Patent: Dec. 6, 2011

(54) COMPETITION GAME SYSTEM AND GAME APPARATUS

(75) Inventors: Naoki Takahashi, Kobe (JP); Satoshi Uchiyama, Kobe (JP); Yoshihisa Inoue, Kobe (JP); Yusuke Kitakaze, Kobe (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 1098 days.

(21) Appl. No.: 11/887,288

(22) PCT Filed: Mar. 30, 2006

(86) PCT No.: PCT/JP2006/306703
§ 371 (c)(1),
(2), (4) Date: Sep. 27, 2007

(87) PCT Pub. No.: WO2006/106845
PCT Pub. Date: Oct. 12, 2006

(65) Prior Publication Data
US 2009/0275371 A1    Nov. 5, 2009

(30) Foreign Application Priority Data

Mar. 31, 2005 (JP) ................. 2005-105302
Nov. 9, 2005 (JP) ................. 2005-325479

(51) Int. Cl.
*A63F 13/00* (2006.01)
*A63F 9/20* (2006.01)
*A63F 1/02* (2006.01)

(52) U.S. Cl. ............... 463/42; 463/3; 463/31; 273/308; 273/293

(58) Field of Classification Search .......... 463/1, 3, 463/31, 42; 273/293, 308
See application file for complete search history.

(56) References Cited

U.S. PATENT DOCUMENTS 6,257,983 B1 * 7/2001 Rimoto ................... 463/38
(Continued)

FOREIGN PATENT DOCUMENTS

GB    2 375 268    11/2002
(Continued)

OTHER PUBLICATIONS

Simulation of Professional Baseball '99, Jyugemu, Oct. 1999 issue published from Media Factory on Oct. 1, 1999, p. 177.

*Primary Examiner* — Peter DungBa Vo
*Assistant Examiner* — Jeffrey Wong
(74) *Attorney, Agent, or Firm* — Jordan and Hamburg LLP

(57) ABSTRACT

A competition game system designed such that tactical data created based on respective results of input operations to manual operation sections of two game apparatuses are transmitted and received between the game apparatuses to allow a competition game having an identical event to be progressed in each of the game apparatuses based on the transmitted and received tactical data. Each of the game apparatuses comprises an action-setting section 305 adapted to create player-side tactical data corresponding to a content of an input operation from the manual operation section 10A, a communication control section 306 adapted to transmit the player-side tactical data created by the action-setting section 305, to the opponent's game apparatus, and receive opponent-side tactical data from the opponent's game apparatus, through a communication section 130, a determination section 307 adapted to determine a competition result, based on the player-side and opponent-side tactical data, and an image display control section 302 adapted to display a game image onto a display unit 3 according to the determined competition result. The competition game system of the present invention makes it possible to efficiently achieve a competition game while exchanging minimum data between a plurality of game apparatuses having the same configuration, without setting a master-servant relationship to the game apparatuses.

13 Claims, 28 Drawing Sheets

U.S. PATENT DOCUMENTS

| | | |
|---|---|---|
| 6,342,665 B1 | 1/2002 | Okita et al. |
| 2002/0160835 A1* | 10/2002 | Fujioka et al. ............ 463/31 |
| 2002/0178011 A1 | 11/2002 | Yotoriyama et al. |
| 2005/0044575 A1 | 2/2005 | Der Kuyl |

FOREIGN PATENT DOCUMENTS

| | | |
|---|---|---|
| JP | 9-152999 | 6/1997 |
| JP | 2000-237454 | 9/2000 |
| JP | 2001-087559 | 4/2001 |
| JP | 2001-129246 | 5/2001 |
| JP | 2002-351806 | 12/2002 |
| JP | 2003/190636 | 7/2003 |
| JP | 2004-357968 | 12/2004 |
| JP | 2004-536681 | 12/2004 |
| JP | 2005-007198 | 1/2005 |
| WO | WO-98/14898 | 4/1998 |
| WO | WO-99/38590 | 8/1999 |
| WO | WO-02/066128 | 8/2002 |

* cited by examiner

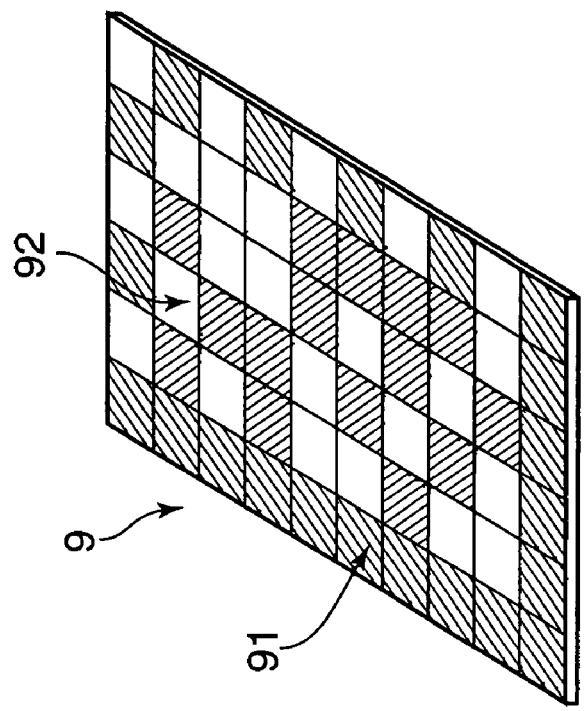
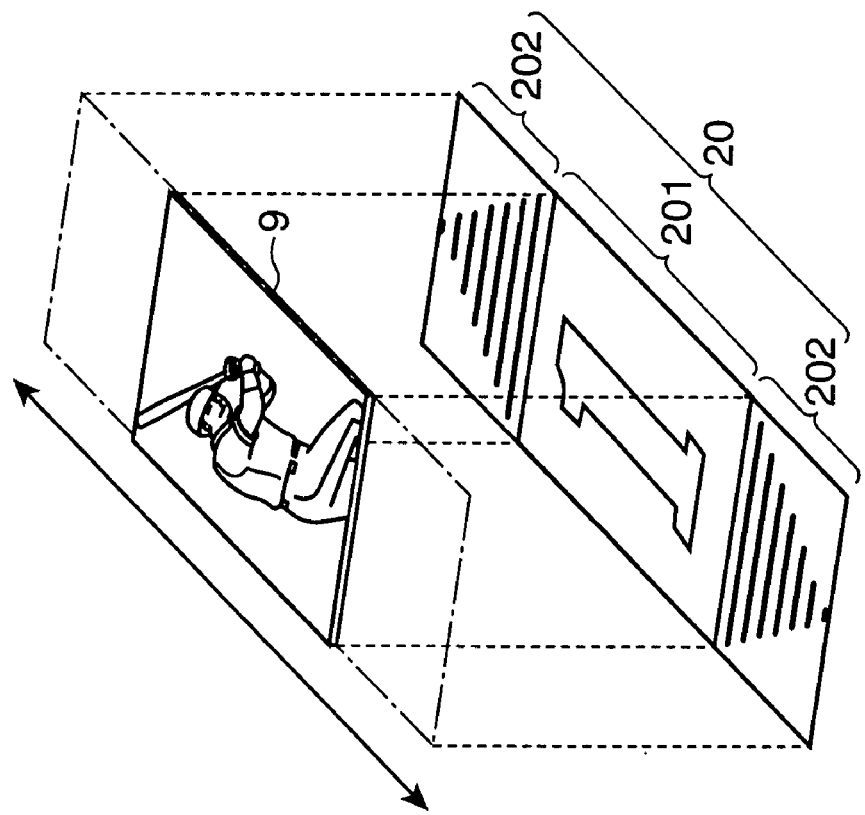

COMPETITION GAME SYSTEM AND GAME APPARATUS

TECHNICAL FIELD

The present invention relates to a competition game system designed to allow a competition game having an identical event to be progressed in each of a plurality of game apparatus, and to a game apparatus for use in the competition game system.

BACKGROUND ART

There has been proposed a music game system using a musical adaptation game apparatus designed to adapt for a piece of music, such as adaptation to a rhythm pattern, as disclosed in the following Patent Publication 1. This music game system is intended to allow each of plural persons to play the game in a different part of musical instruments. The music game system comprises first and second musical adaptation game apparatuses which are connected to each other through a communication section for transferring information about the progress of musical rendition. The communication section includes an information transmitting section provided in the first musical adaptation game apparatus, and an information receiving section provided in the second musical adaptation game apparatus.

Based on the above configuration, the music-rendition progress information is transferred between the first and second musical adaptation game apparatuses to allow the adaptation to be manually operated from respective adaptation operation sections of the first and second musical adaptation game apparatuses while synchronizing the game apparatuses with each other, so that each of the persons can play the game in a manner close to an actual music rendition, e.g., by manually operating each of the adaptation operation sections in his/her part.

In the music game system disclosed in the Patent Publication 1, it is necessary to have a scheme capable of configuring master/slave control means for assigning one of the game apparatuses undergoing an earlier input of a coin, to a master game apparatus, and assigning the other game apparatus undergoing a later input of a coin, to a slave game apparatus. Thus, the game apparatus has a problem about complexity in configuration, addition of a master processing required for the master game apparatus, and increase in volume of information to be transmitted from the master game apparatus.

In view of the above problem, it is an object of the present invention to provide a competition game system capable of efficiently achieving a competition game while exchanging minimum data between a plurality of game apparatuses having the same configuration, without setting a master-servant relationship to the game apparatuses, and to provide a game apparatus for use in the competition game system.

Patent Publication 1: JP 2000-237454A

DISCLOSURE OF THE INVENTION

In order to solve the above problem, according to one aspect of the present invention, there is provided a competition game system which comprises at least two game apparatuses each including a manual operation section for allowing a player to perform an input operation and a display unit for displaying an image, wherein tactical data created based on respective results of the input operations to the manual operation sections are transmitted and received between respective ones of the game apparatuses to allow a competition game having an identical event to be progressed in each of the game apparatuses based on the transmitted and received tactical data. In this competition game system, each of the game apparatuses includes action-setting means adapted, based on a result of an input operation to the manual operation section by a player, to create player-side tactical data, transmitting/receiving control means adapted to transmit the player-side tactical data created by the action-setting means, to the at least one opponent's game apparatus, and receive opponent-side tactical data from the opponent's game apparatus, through the communication section, determination means adapted to determine a competition result, based on the player-side tactical data, and the opponent-side tactical data received by the transmitting/receiving control means, and image display control means adapted to display a game image onto the display unit according to the competition result determined by the determination means.

In the competition game system of the present invention, player-side and opponent-side tactical data created based on respective results of input operations to the manual operation sections are transmitted and received (exchanged) between the at least two game apparatuses through the communication section. Then, the competition game having an identical event will be played in each of the game apparatuses according to the transmitted and received tactical data. In each of the game apparatuses, player-side tactical data corresponding to a result of an input operation to the manual operation section by a player is created by the action-setting means, and transmitted to the at least one opponent's game apparatus by the transmitting/receiving control means through the communication section, and opponent-side tactical data for a competition is received from the opponent's game apparatus through the communication section. Then, a competition result is determined by the determination means, based on the player-side tactical data and the opponent-side tactical data received by the transmitting/receiving control means, and a game image is displayed on the display unit by the image display control means, according to the competition result determined by the determination means.

As above, in the competition game system, only tactical data created in the player's game apparatus is transmitted to the opponent's game apparatus in an exchanging manner between the game apparatuses, and the determination means in each of the game apparatuses performs a common processing using the acquired input-operation data from the opponent's game apparatus. Thus, the same competition result will be created and a game image having an identical event will be displayed on the display unit in each of the game apparatuses. This makes it possible to eliminate the need for the conventional processing based on a master-slave relationship, so as to reduce burdens of configuration and processing.

BRIEF DESCRIPTION OF THE DRAWINGS

FIG. 3 illustrates the configuration of an athlete card and a relationship with a mounting surface, wherein A is a perspective view showing the configuration of the athlete card and the relationship with the mounting surface, and B is a schematic diagram showing a mark which is marked on a bottom surface of the athlete card.

BEST MODE FOR CARRYING OUT THE INVENTION

Figure 1:
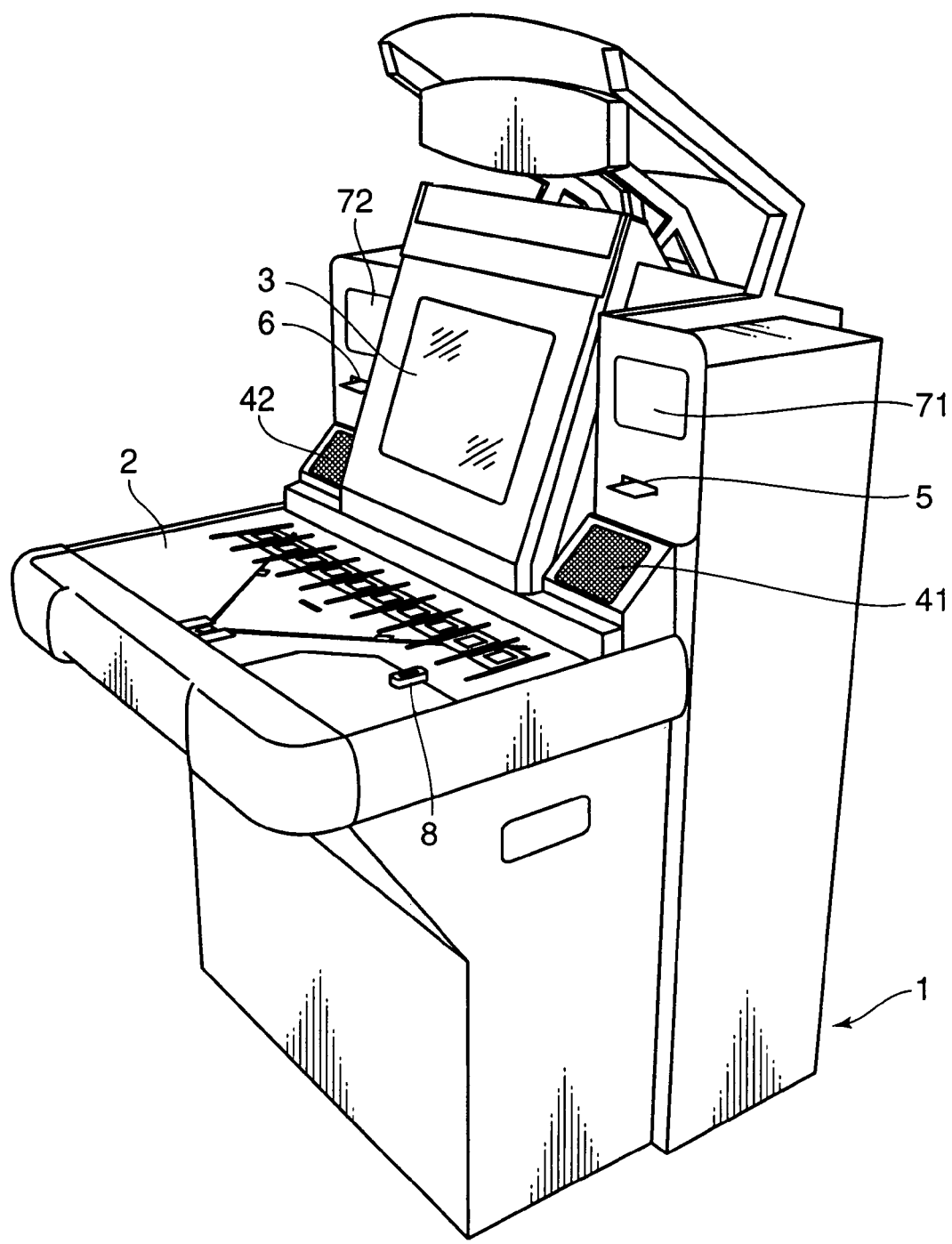
FIG. 1 is a schematic external view showing a game apparatus according to a first embodiment of the present invention.

FIGS. 1 to 20 show a game apparatus according to a first embodiment of the present invention. FIG. 1 is a schematic external view showing the game apparatus according to the first embodiment. This game apparatus comprises a housing 1 with a predetermined three-dimensional structure, for example, having an approximately rectangular parallelepiped shape. The housing 1 is formed with a card-mounting section 2 in an approximately central region of a front surface thereof. The card-mounting section 2 has a mounting surface 20 (see FIG. 2) for allowing to a player (i.e., game player) to mount thereon an athlete card with a predetermined shape. The housing 1 is provided with a monitor 3, such as a CRT display unit or a liquid-crystal display unit, which is adapted to display a game image thereon and disposed on an upper side of the card-mounting section 2, and a pair of speakers 41, 42 adapted to output audio and produce sound effects and disposed on right and left sides of the monitor 3, respectively. The housing 1 also includes a personal-card loading slot 5 formed on an upper side of one of the right and left speakers 41, 42 (in this embodiment, on an upper side of the right speaker 41), and an athlete-card issue slot 6 formed on an upper side of the left speaker 42. Further, the housing 1 is provided with a pair of light-emitting sections 71, 72 adapted to produce illumination effects and disposed on respective upper sides of the personal-card loading slot 5 and the athlete-card issue slot 6. The card-mounting section 2 is formed with a coin input slot 8 for guiding a coin input which is a condition for starting a game, at a predetermined position thereof.

Figure 2:
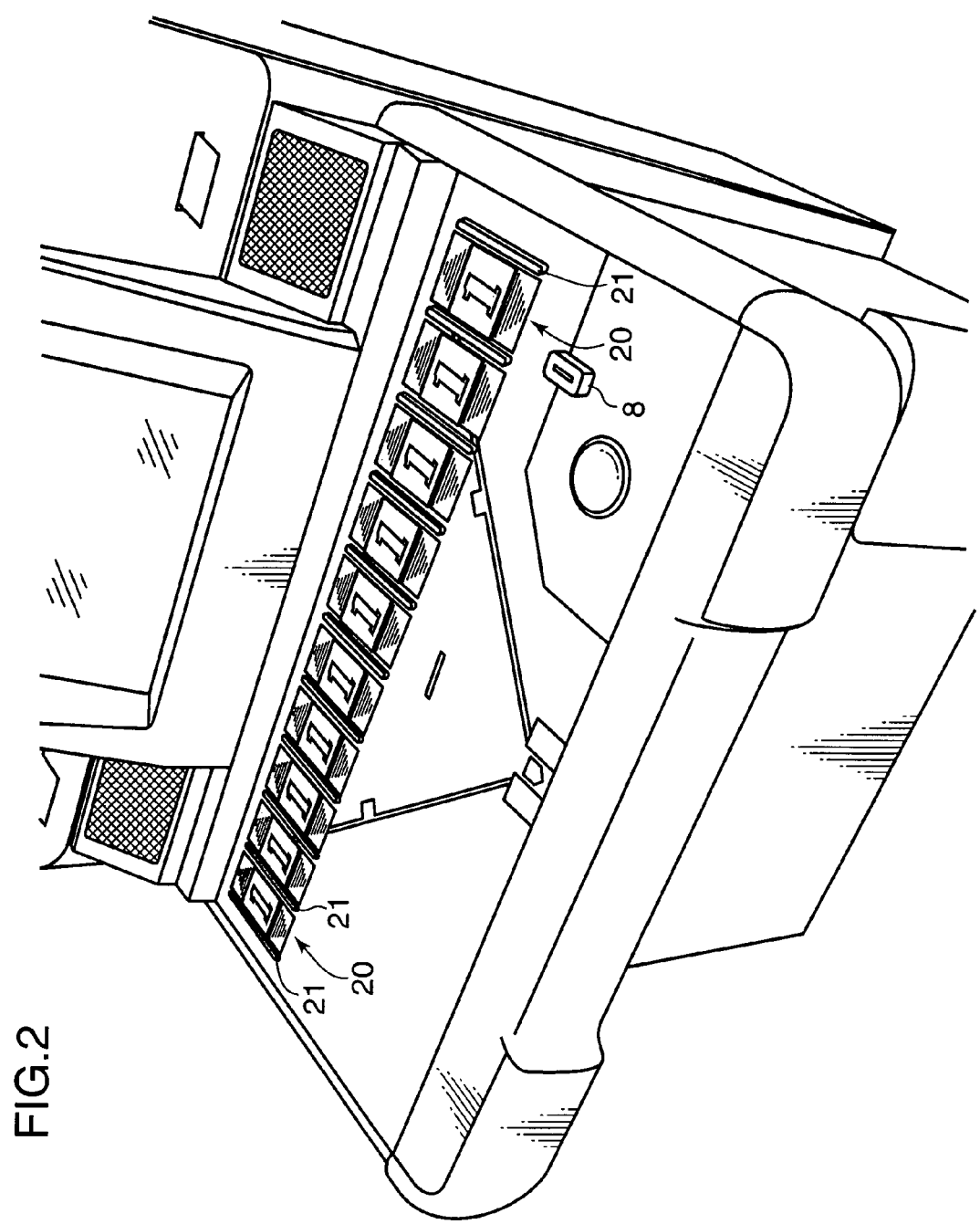
FIG. 2 is a perspective view showing one example of the configuration of a card-mounting section.

FIG. 2 is a perspective view showing one example of the configuration of the card-mounting section 2. The card-mounting section 2 has an upper surface formed in a predetermined shape (in this embodiment, a quadrilateral shape) to extend horizontally and flatly. The game apparatus according to this embodiment is designed to simulate a baseball game, and therefore a picture simulating a playing field of a baseball stadium is drawn on the card-mounting section 2. As the athlete card 9, a predetermined shaped card may be employed, and a rectangular-shaped card is employed in this embodiment, as shown in FIG. 3A. In the card-mounting section 2, the mounting surface 20 is provided in a plural number to allow a plurality (in this embodiment, ten) of the athlete cards to be mounted thereon at predetermined intervals along a rightward/leftward (i.e., lateral) direction thereof. Each of the mounting surfaces 20 is formed to have a width dimension corresponding to that of the athlete card 9. The mounting surface 20 is formed with a guide member on right and left sides thereof to serve as an assist member for guiding the athlete card 9 to facilitate a sliding movement of the athlete card 9 from a loading position in a primary direction, for example, in a frontward/rearward (i.e., longitudinal) direction. For example, the guide member consists of a pair of convex strip-shaped members 21 extending in a sliding direction (in this embodiment, the longitudinal direction) in spaced-apart relation to each other by the width dimension of the athlete card 9. Each of the convex strip-shaped members 21 has a longitudinal dimension set to be equivalent to a sliding range of the athlete card 9.

FIG. 3 illustrates the configuration of the athlete card and a relationship with the mounting surface, wherein A is a perspective view showing the configuration of the athlete card and the relationship with the mounting surface, and B is a schematic diagram showing a mark which is marked on a bottom surface of the athlete card. In FIG. 3A, the athlete card 9 is illustrated in a floated state relative to the mounting surface 20, for facilitating understanding. As shown in FIG. 3A, the mounting surface 20 has a central region 201, and front and rear sliding regions 202. The central region 201 has the same size as that of the athlete card 9, and each of the sliding regions 202 has a desired longitudinal dimension relative to the central region. For example, the dimension of the sliding region 202 may be set to be approximately one-half of a longitudinal length of the athlete card. The sliding regions 202 are provided as a means to allow the athlete card 9 to be mounted while being offset (slidingly moved) relative to the central region 201 in the range indicated by the arrow, so as to provide variations in mode of an after-mentioned action of a character to be displayed on the monitor 3 correspondingly to the athlete card 9, as will be described in detail later. The athlete card 9 has a top surface printed with an athlete character image, and a bottom surface printed with visible information about an athlete, such as a photographic image of athlete's face and athlete's name, and invisible athlete identification data.

As shown in FIG. 3B, a mark printed on the bottom surface of the athlete card 9 includes a position detection mark 91 for detecting a card-mounted position where the athlete card 9 is mounted on the mounting surface 20, and a character mark 92 representing character data (hereinafter referred to as "parameter", and variously described, for example, as a fielder parameter, a pitcher parameter and a batter parameter, depending on its content) which is identification data of an athlete character corresponding to each of the athlete cards 9. An identification number may be used as the athlete identification data. For the sake of simplifying explanation, in this embodiment, the athlete card 9 is divided into sixty areas consisting of 6 columns×10 rows, wherein peripheral areas are used as the position detection mark 91, and the remaining inward thirty two areas consisting of 4 columns×8 rows) are used as the character mark 92. In practice, the athlete card 9 is divided into a plurality of areas consisting of an adequate number of columns and rows required for storing intended data.

As the position detection mark 91, a predetermined material is attached on all the areas in adjacent two of four peripheral edges thereof, and every other ones of areas in the two remaining column-wise and row-wise peripheral edges, through a coating process or the like. That is, the position detection mark 91 consists of the continuous region, and the alternate region. This makes it possible to detect that the athlete card is erroneously mounted back to front, so as to reliably perform the position detection in a correct orientation of the athlete card.

As to the character mark 92, the athlete identification data is created by attaching the predetermined material on specific ones of the areas (each serving as one bit) on the inward side relative to the areas in the four peripheral edges, through a coating process or the like. The character data (parameters) of entire athletes are essentially pre-stored in a desired memory section of the game apparatus, in associated relation with the athlete identification data. Then, during a course of the game, one of the athlete parameters which is pre-stored in the memory section and identified by the athlete identification data obtained through a reading operation of the athlete card 9 is read from the memory section and used.

The coating material may be a visible material. In this embodiment, an invisible material, such as a material sensitive to infrared light, is use as the coating material, because infrared-light detection means is employed as will be described in detail later. As one example, the athlete card 9 is made of an infrared-light absorbing material, or the bottom surface of the athlete card 9 is coated with an infrared-light absorbing material, and then the position detection mark is marked thereon. Further, at least the mounting surface 20 of the card-mounting section 2 is made of a material transparent to infrared light.

The character mark 92 indicates identification information for identifying a corresponding athlete character, and an ability (including skills) of the athlete character. For example, in a batter (hitter) character, the ability includes, as a common item, fielder parameters (including batter parameters), such as "trajectory of batted ball (or hitting distance)", "bat control (hittability)", "swing power", "running ability", "throw distance", "defensive skill", "error-free level" and "main fielding position". Further, the ability includes, as a specific ability item in each of the characters, fielder parameters, such as "intimidating power", "bat control correction against left-handed pitcher", "hitting power correction against left-handed pitcher", "correction in chance", "swing timing", "average hitter", "power hitter", "table-setter", "winning hitter", "coping with adversity", "hitting to opposite field", "spray-hitting style", "infield single", "bunt skill", "grand-slam hitter", "pinch hitter", "strikeout leader", "first-pitch swinger", "multi-hit", "hitting streak", "cleanup batter", "back-to-back home run hitter", "tenacious player", "glove man", "stolen base leader", "hard-charging", "base running", "home base-sliding", "throwing", "blocking", "ability to inspire other players", "run-scoring error", "leadoff home run hitter in first inning", "pitcher-leading level of catcher", "laser-beam throw (quick throw-in)" and "tackle (representing forcefulness or vitality)".

In a pitcher character, the ability includes, as a common item, pitcher parameters, such as "pitched-ball speed"; "level of slider", "level of curveball", "level of fork-ball", "level of sinker" and "screwball" (i.e., level of breaking ball); "ball control"; "velocity of fastball"; "physique"; "adjusting ability as starting pitcher"; and "reconditioning ability". Further, the ability includes, as a specific ability item in each of the characters, pitcher parameters, such as "intimidating power", "correction against left-handed batter", "toughness in pinch", "toughness against hits", "coping with base runner", "level of initial pitching", "getting a boost in last innings", "emergency pitching start", "ball release", "acceleration of pitched ball", "luckiness in games", "pickoff throw", "response to batted ball", "tetchiness", "rate of four wide ones", "rate of mistake pitches", "quick pitching", "coping with close game", "sense of responsibility", "pacing", "stability of pitched ball speed" and "poker face". In this embodiment, the above fielder and pitcher parameters are set to all athlete characters. Further, the ability or tendency (positive direction/negative direction) of each of the athlete parameters is defined based on a desired number of grades or levels, for example, two grades (presence: "1" and absence: "0"), three grades (−1, 0 and 1) or four or more stages.

Figure 4:
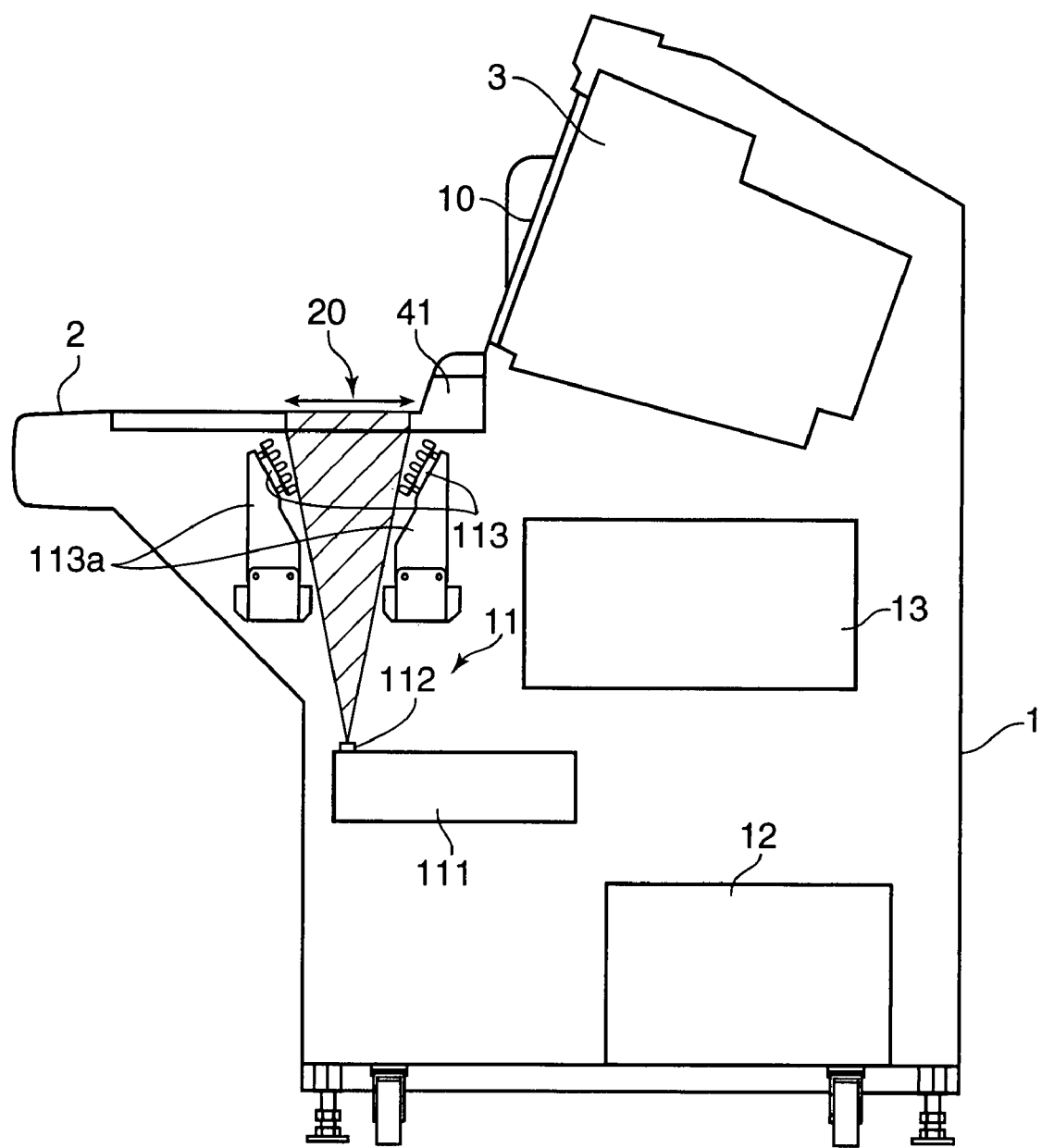
FIG. 4 is a side sectional view of the game apparatus.
Figure 5:
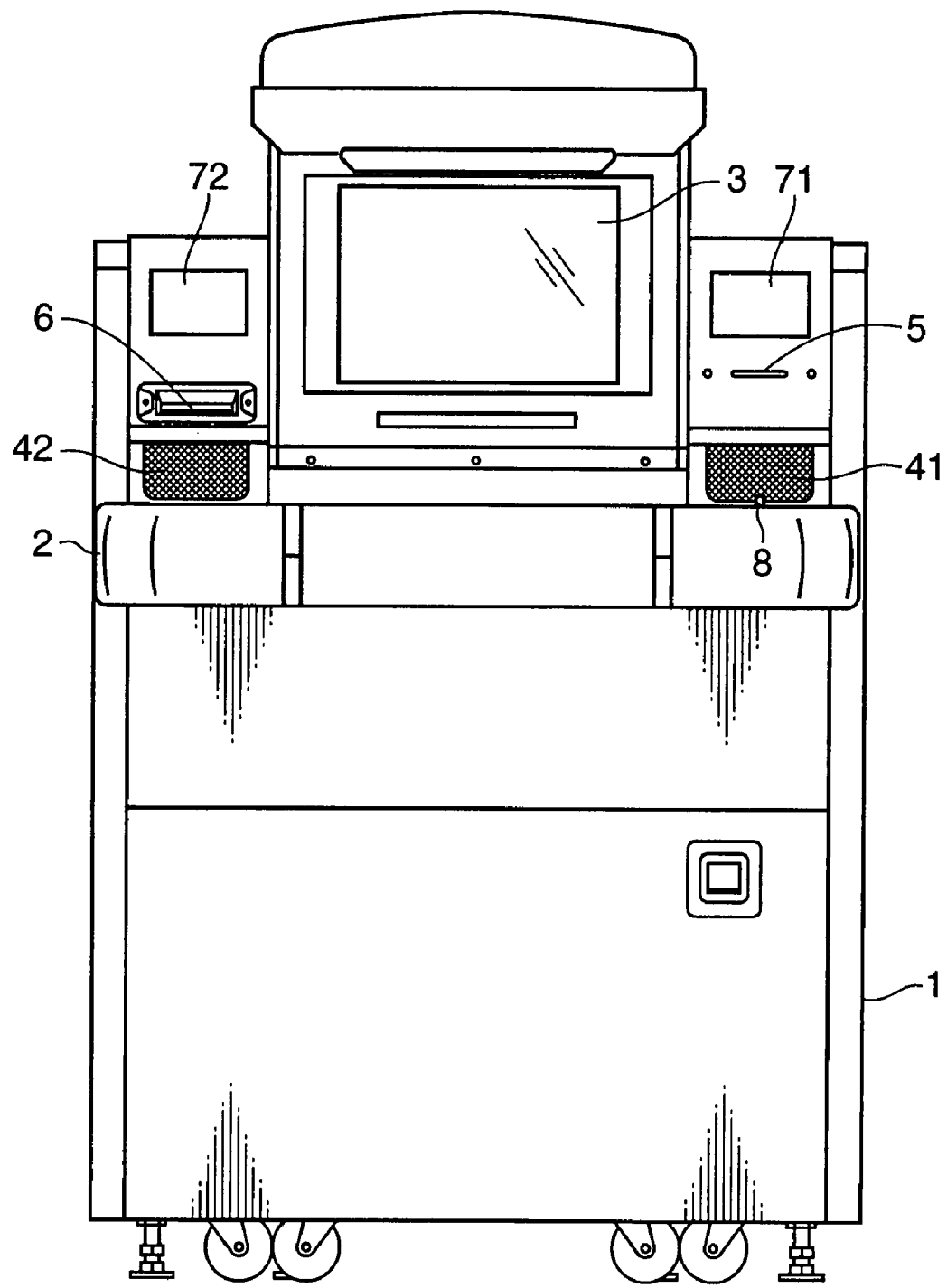
FIG. 5 is a front view of the game apparatus.

FIG. 4 is a side sectional view of the game apparatus, and FIG. 5 is a front view of the game apparatus. In FIG. 4, a touch panel 10 consisting of a transparent thin-layer-shaped pressure-sensitive element is disposed on a surface of a tube (i.e., screen) of the monitor 3 in a superimposed manner. This touch panel 10 is designed such that, when it is pressed by game player's finger or the like, the pressed position is output in the form of a voltage level indicative of horizontal and vertical positions. Specifically, the touch panel 10 is formed, for example, by arranging a transparent line-shaped pressure-sensitive material on a rectangular-shaped thin-layer member at a predetermined pitch and in lengthwise and crosswise directions, and then covering the obtained composite member by a transparent cover. The touch panel 10 is attached onto the surface of the tube of the monitor 3. As the touch panel 10, a conventional type may be employed and designed to detect a designated one of a plurality of buttons displayed on a screen of the monitor 3 to prompt selection or the like, based on an address and a pressed position of the designated button. The touch panel 10 is adapted, when an arbitrary position in an after-mentioned area graphic virtually representing a strike zone is pressed, to detect the pressed position. Specifically, coordinates of the pressed position detected from the touch panel 10 is converted to coordinates on a display screen, and the converted coordinates ate compared with coordinates of the displayed area graphic to identify the pressed position in the area graphic.

An image pickup section 11 is disposed inside the housing 1 and below the mounting surface 20. The image pickup section 11 serves as a means to detect a card-mounted position of the athlete card 9 mounted on each of the mounting surfaces 20 and read the information written on the bottom surface of the mounted athlete card 9. The image pickup section 11 comprises a casing which receives therein an image pickup processing section 111 adapted to control an image pickup operation and perform a processing of a picked-up image, an image sensor 112 serving as an image pickup means (a digital image-pickup device, such as a CCD camera) attached onto an upper portion of the casing, and a light source 113 adapted to generate infrared light. The image sensor 112 has a field angle which is set to provide a field of view covering all the mounting surfaces 20 so as to pick up images of the marks 91, 92 written on the bottom surface of each of the athlete cards 9 mounted on respective ones of the mounting surfaces 20. Although not seen in FIG. 4, in this embodiment, a predetermined plural number (e.g., two) of the image sensors 112 are disposed parallel to each other in the lateral direction (in FIG. 4, a depth direction of the drawing sheet), wherein one of the two image sensors 112 is set to have a field of view for covering the right-half five mounting surfaces 20, and the other image sensor 112 is set to have a field of view for covering the left-half five mounting surfaces 20.

The light source 113 is supported by a light-source support member 113a, and disposed below the card-mounting section 1 to extend obliquely downwardly relative to the longitudinal direction of the card-mounting section 1. The light source 113 is adapted to emit light of a predetermined wavelength range [in this embodiment, infrared light (including far-infrared light)] from the supported position toward the loading surfaces 20 in an obliquely upward direction, so as to irradiate the mounting surfaces 20 with the infrared light, i.e., irradiate the respective bottom surfaces of the athlete cards 9 mounted on the mounting surfaces 2 with the infrared light. With a view to uniformly irradiating all the mounting surfaces 20, a plurality of the light sources 113 are arranged over the lateral direction at desired intervals or approximately continuously. In order to achieve further uniform irradiation, the light sources 113 are disposed, respectively, on frontward and rearward sides of the mounting surfaces 20, and located out of the field angle of the image sensor 112 so as not to hinder the image pickup operation. The image sensor 112 comprises a large number of photoelectric conversion elements arranged, for example, in a matrix pattern. The image sensor 112 is adapted to periodically receive an optical image of infrared light which is emitted from the light source 113 and then reflected by the bottom surface of the athlete card 9 on each of the mounting surfaces 20 to represent the marks 91, 92, by each of the photoelectric conversion elements, and convert the received optical image to an electric signal having a level corresponding to an amount of the received infrared light. Although not illustrated, a filter is preferably disposed in front of the photoelectric conversion elements to transmit only infrared light therethrough. The image pickup processing section 111 is operable to, after performing a processing of transferring (loading) a periodically-picked-up image into an internal memory (not shown), extract the position detection mark 91 from the picked-up image developed in the memory, as a memory address, and identify a shape of the position detection mark 91 through the use of a pattern recognition technique or the like so as to calculate a card-mounted position of the athlete card 9 on the mounting surface 20. The image pickup processing section 111 is also operable to read the athlete identification data of the character mark 92, for example, in the form of bit information of the areas in the column and row directions, based on address information of a pixel which has detected the position detection mark 91 in the picked-up image.

The housing 1 is internally provided with a power supply section 12 adapted to supply a desired level of electric power to each section of the game apparatus, and a control board section 13 internally equipped with various control boards for generally executing a game processing.

Figure 6:
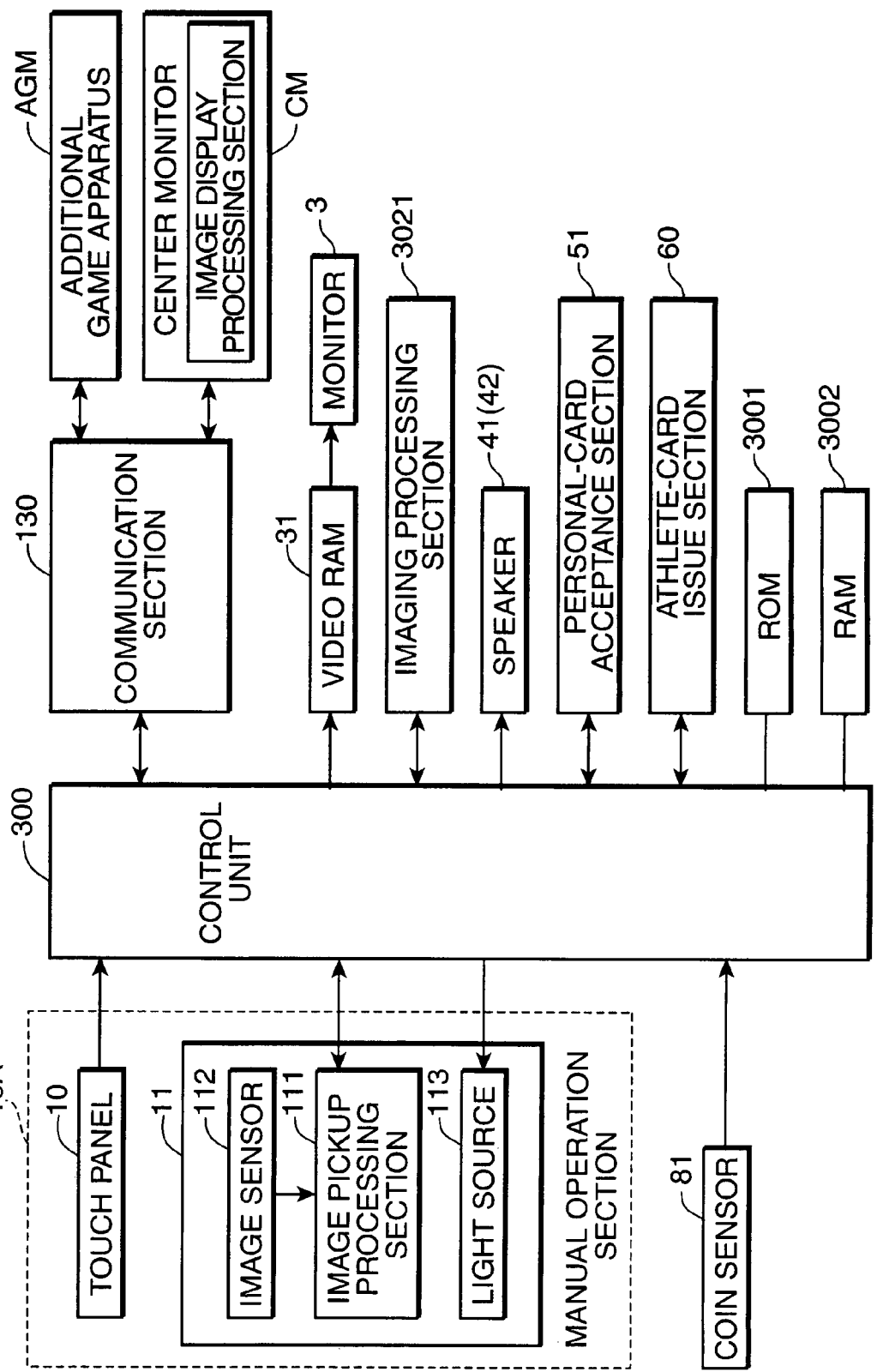
FIG. 6 is a block diagram showing a hardware comprising a control unit incorporated in a control board section, and various sections.

FIG. 6 is a block diagram showing a hardware comprising a control unit incorporated in the control board section, and various sections. In FIG. 6, an interface between the control unit 300 and each section, and a section adapted to generate a drive signal for driving each section, in response to receiving a control instruction, may be configured in a conventional manner, and will be omitted where appropriate.

A communication section 130 is adapted to receive and transmit data from/to at least one second game apparatus AGM, and transmit data, such as game state information, to a center monitor CM, according to need. The game apparatus according to this embodiment is intended to be placed in a hall (game hall or game arcade) in a desired plural number. The center monitor CM is internally equipped with a computer including a center-monitor image display processing section, and adapted to receive an operational signal, such as a signal representing a use state or a game state during execution of the game, from each of the game apparatuses, and selectively display information about the use and/or game states in the hall, or display, in the hall, information about the game state, such as large score difference or even score, or a game image of a particular state, such as a pinch or chance in the 9-th inning, to promote motivation to the play.

In a system where the game apparatuses are placed in a plurality halls separately, the system will be configured to allow the game to be played between the different ones of the halls through the communication section 130. Further, the communication section 130 is communicatably connected to a center server through a network, in such a manner that, when a personal card is inserted into the game apparatus, data necessary for a game processing, such as after-mentioned predetermined record data about previous games, in game record data of a player identified by information of the personal card is transferred to the game apparatus which is operated by this player (hereinafter referred to as "player's game apparatus") and at least one second game apparatus which is operated by an opponent who plays a competition game against the player (hereinafter referred to as "opponent game apparatus"), according to need, and, upon termination of the game, a result of this game is acquired to update the record and manage the updated data.

The touch panel 10 and the image pickup section 11 make up a manual operation section 10A. A coin sensor 81 is disposed inside the coin input slot 8 provided as the game start condition, to check whether the input coin is true or false, and count a required number of input coins. The input coins will be stored in a cashbox (not shown) disposed inside the housing. A personal-card acceptance section 51 is disposed inside the personal-card loading slot 5, and adapted, when a personal card is inserted into the personal-card loading slot 5, to check whether a player of the personal card is a membership, through the center server, and, upon termination of the game, to return the personal card from the personal-card loading slot 5. In a system devoid of the center server, the game apparatus may store membership information to perform the above checking processing, or the personal card may be configured to fully store data, such as game record data.

An athlete-card issue section 60 is internally provided with a card container (not shown) where a large number of athlete cards 9 are contained in a stacked state, and adapted to carry a predetermined number (in this embodiment, one) of athlete cards 9 from the card container to the athlete-card issue slot 6 and offer (give away) the athlete card 9 to the player. This is intended to create a scheme where a player collects the athlete cards, and arouse the player to play the game. The number of athlete cards to be issued may be changed depending on a game result.

A ROM 3001 stores a game program for operating the game, entire image data to be displayed on the monitor 3, and an imaging processing program for creating a three-dimensional image in a game space. The ROM 3001 also stores various parameters necessary for determining a game progression and a game result, and various data to be used as factors for judgment, in the form of a table. Particularly, in connection with the assumption that the game apparatus according to this embodiment is designed to simulate a baseball game, a control program for executing a defensive-side processing and an offensive-side processing in conformity to actual baseball rules is created and stored in the ROM 3001, and the fielder parameters and pitcher parameters for each of all athletes who will appear in the game as the characters are stored in the ROM 3001, in associated relation with the athlete identification data.

A RAM 3002 includes a work area for temporarily storing data during a course of a processing, and serves as a means to store various data read from the ROM 3001, and various parameters, such as abilities of each of the athlete cards 9 picked up by the image pickup section 11, during the game, and allow the stored data and parameters to be read therefrom and reflected on the game, according to need.

A video RAM 31 is designed to have a memory capacity corresponding to at least that of display pixels of the monitor 3, and used for forming a display image. An imaging processing section 3021 is a hardware circuit section operable, in response to receiving an imaging command from the control unit 300, to develop a display image to the video RAM 31.

Figure 7:
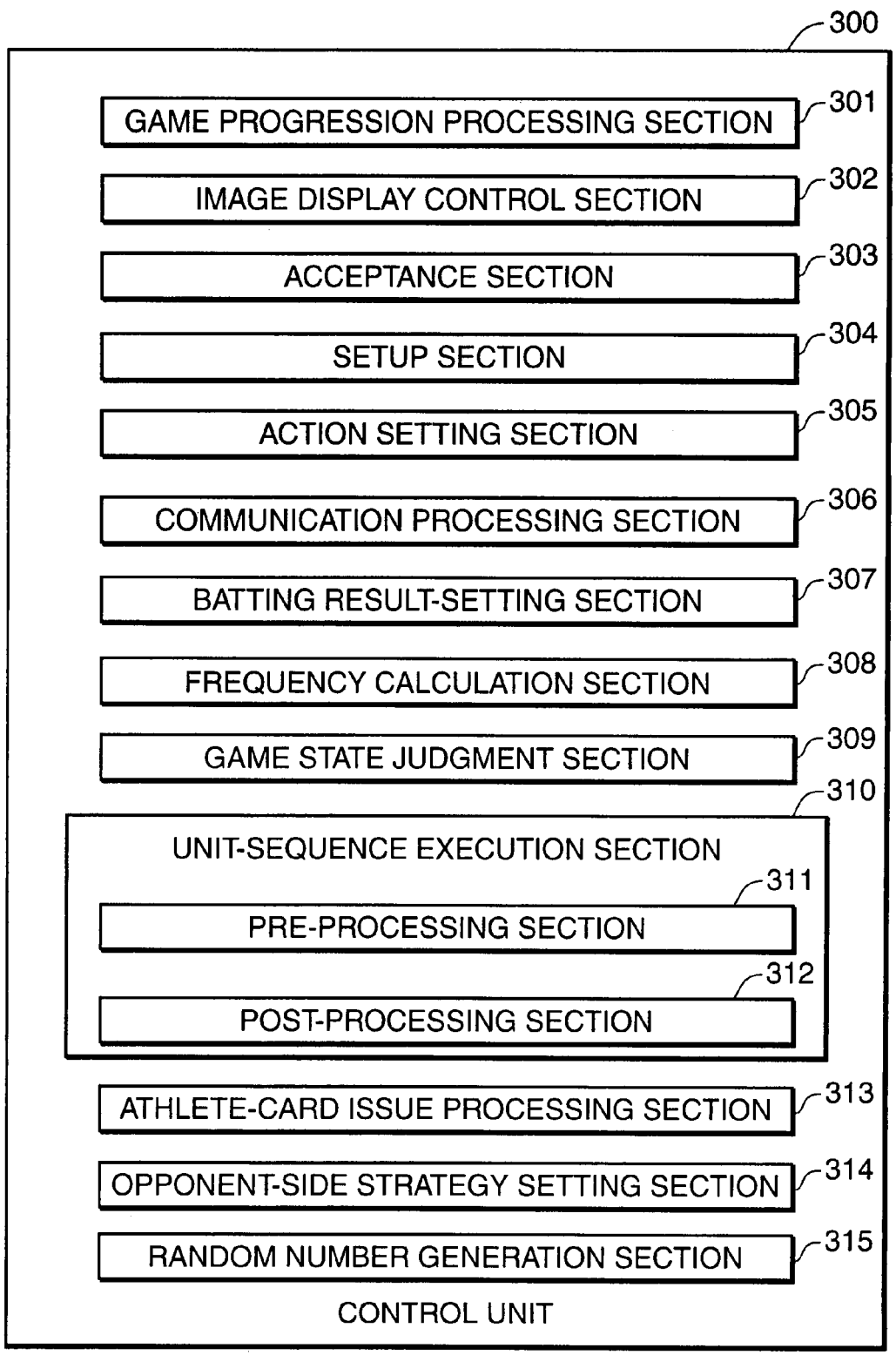
FIG. 7 is a block diagram for explaining a function of the control unit.

FIG. 7 is a block diagram for explaining a function of the control unit. The control unit 300 comprises: a game progression processing section 301 operable, based on the game program and an input operation to the manual operation section 10A, to generally control a progression of the game; an image display control section 302 operable to controllably display a game image onto the monitor 3; an acceptance section 303 operable to accept input operation information from the manual operation section 10A; a setup section 304 operable, based on a pitch location or a swing location designated when an after-mentioned "location designation" button displayed on the monitor 3 is selected, to set up a position and shape of a mark image; an action-setting section 305 operable, based on a content accepted by the acceptance section 303, to create pitching data for pitching of a pitcher character or batting data for swing of a batter character; a communication processing section 306 operable to allow an exchange about the pitching data or the batting data with the opponent's game apparatus AGM and a communication about data necessary for the center monitor CM to be performed through the communication section 130, and, according to need, allow data exchange with the center server to be performed; a batting result-setting section 307 operable, based on data received from the action-setting section 305 and the opponent's game apparatus AGM, to determine a batting result; a frequency calculation section 308 operable, based on a previous game record of an opponent, to calculate data about a tendency of a pitch or swing location to be designated; a game state judgment section 309 operable to judge a game state having an impact on a competition result; a unit-sequence execution section 310 operable to controllably execute a series of sequences individually, based on a content of the batting result determined by the batting result-setting section 307, a content of the input operation from the manual operation section 10A, and the pitcher parameters when the player's character is a pitcher or the fielder parameters when the player's character is a fielder, or when there is no input operation; an athlete-card issue processing section 313 operable to issue an athlete card 9; and a random number generation section 315 operable to generate a pseudo-random number for use in a probability processing. In the setup section 304 and the action-setting section 305, at least the action-setting section 305 corresponds to action-setting means in the present invention.

The image display control section 302 is adapted to display various image, such as a baseball field, athlete characters on defensive and offensive sides (at least a pitcher character and a batter character), a ball character, a bat character, an after-mentioned area graphic virtually representing a strike zone, and after-mentioned first and second mark images to be created as a result of after-mentioned location designation, on the monitor in conjunction with the game progression. The image display control section 302 includes the video RAM 31. In the present invention, the image display control section 302 serves as at least character-image display control means, area-graphic display control means and mark display control means.

In this embodiment, the baseball game is configured on the assumption that an action for one at-bat (this action will hereinafter be referred to as "single sequence"), where a player's character (i.e., a pitcher character when the sequence is a defensive-side sequence, or a batter character when the sequence is an offensive-side sequence) given with an action-related instruction from a player (i.e., a game player who operates the game apparatus), duels with an opponent's character (i.e., a batter or pitcher character which competes against the player's character) given with an instruction from an opponent (i.e., an opponent who operates the opponent's game apparatus or an internal CPU of the player's game apparatus), in a pitcher vs. batter relation, is executed total 27 times (serially or sequentially), i.e., 3 outs/inning×9 innings, in conformity to the baseball rules, and the player and the opponent compete on a final score, i.e., a game result (i.e., competition result). More specifically, in this embodiment, the baseball game is configured to be progressed every execution of a duel consisting of one pitch to one batter.

With a view to three-dimensional imaging, each of the pitcher character, the batter character, and optionally other athlete characters and a background image simulating a baseball field, is formed of a desired number of polygons. The imaging processing section 3021 (see FIG. 6) is operable, based on an imaging instruction from the image display control section 302, to perform a calculation for conversion from a position on a three-dimensional space to a position on a pseudo three-dimensional space, a light-source calculation processing and others, and then perform a processing of writing data about a target image in the video RAM 31, e.g., a processing of writing (pasting) texture data to an area of the video RAM 31 designated by the paragons.

A relationship between respective operations of the image display control section 302 and the imaging processing section 3021 will be described below. Based on an operating system recorded on the ROM 3001, the image display control section 302 reads image data, control program data and game program data from the ROM 3001. A part or entirety of the read image data, control program data and game program data are stored in the RAM 3002. Subsequently, the image display control section 302 performs an image display processing, based on an image processing subroutine in the control program stored in the RAM 3002, various data (polygons and texture of a display object, other image data including text image, and audio data), a detection signal from a detection section and others. Specifically, according to the game progression, the image display control section 302 appropriately creates a command for a task of imaging or audio output. Based on the command, the image processing section 3021 performs a calculation of a viewpoint position, a calculation of a character position on the three-dimensional space (or on a two-dimensional space, as is obvious) with respect to the calculated viewpoint position, a light source calculation, an audio-data creation/modulation processing and others. Then, based on the above calculation results, the image processing section 3021 performs a processing of writing data about a target image in the video RAM 31. The image data written in the video RAM 31 is sent to the monitor 3 (after being sent to a D/A converter through an interface and converted to an analog image signal), and displayed as an image on the surface of the tube. In the same manner, the audio data and sound effect data are output from the ROM 3001 through the RAM 3002, and output as audio from the speakers 41, 42 (through an amplifier after being sent to a D/A converter through an interface and converted to an analog audio signal).

The imaging command includes an imaging command for imaging a three-dimensional image using the polygons, and another imaging command for imaging a usual two-dimensional image. Each of the polygons is a two-dimensional image having a polygonal shape (in this embodiment, a triangular shape or a quadrangular shape). The imaging command for imaging a three-dimensional image using the polygons comprises polygon-apex address data read from the ROM 3001, data about a texture address indicative of a storage position of texture data to be pasted onto the polygon, data about a color-pallet address indicative of a storage position of color pallet data representing a color of the texture data, and luminance data indicative of a luminance of the texture. One character (or object) is made up of a large number of the polygons. The image display control section 302 is operable to store, on the RAM 3002, coordinate data of each of the polygons on three-dimensional space. Then, in an operation of moving the characters and others on the screen of the monitor 3, the following processing is performed.

Based on three-dimensional data about the apexes of the respective polygons which is temporarily stored in the RAM 3002, translation-distance data of the respective polygons and rotation-angle data of the respective polygons, the image display control section 302 sequentially calculates three-dimensional coordinate data of the respective polygons after translation and rotation. Among the calculated three-dimensional coordinate data of the respective polygons, horizontal and vertical coordinate data are sent as address data on a display area of the RAM 3002, i.e., polygon-apex address data, to the imaging processing section 3021. The imaging processing section 3021 writes texture data designated by pre-assigned texture address data, on a triangular-shaped or quadrangular-shaped display area designated by address data of three or four polygon apexes. In this manner, a character (or object) formed of a number of polygons with texture data pasted thereon is displayed on the display surface of the monitor 3.

The acceptance section 303 is adapted to accept information about pressing by a player, from the manual operation section 10A (specifically, from the touch panel 10), and accept information about a card-mounted position of an athlete card based on a player's operation, and information about the pitcher parameters or fielder parameters representing abilities of an athlete character in the ROM 3001 which corresponds to athlete identification data on a bottom surface of the athlete card 9, from the image pickup section 11.

Figure 16:
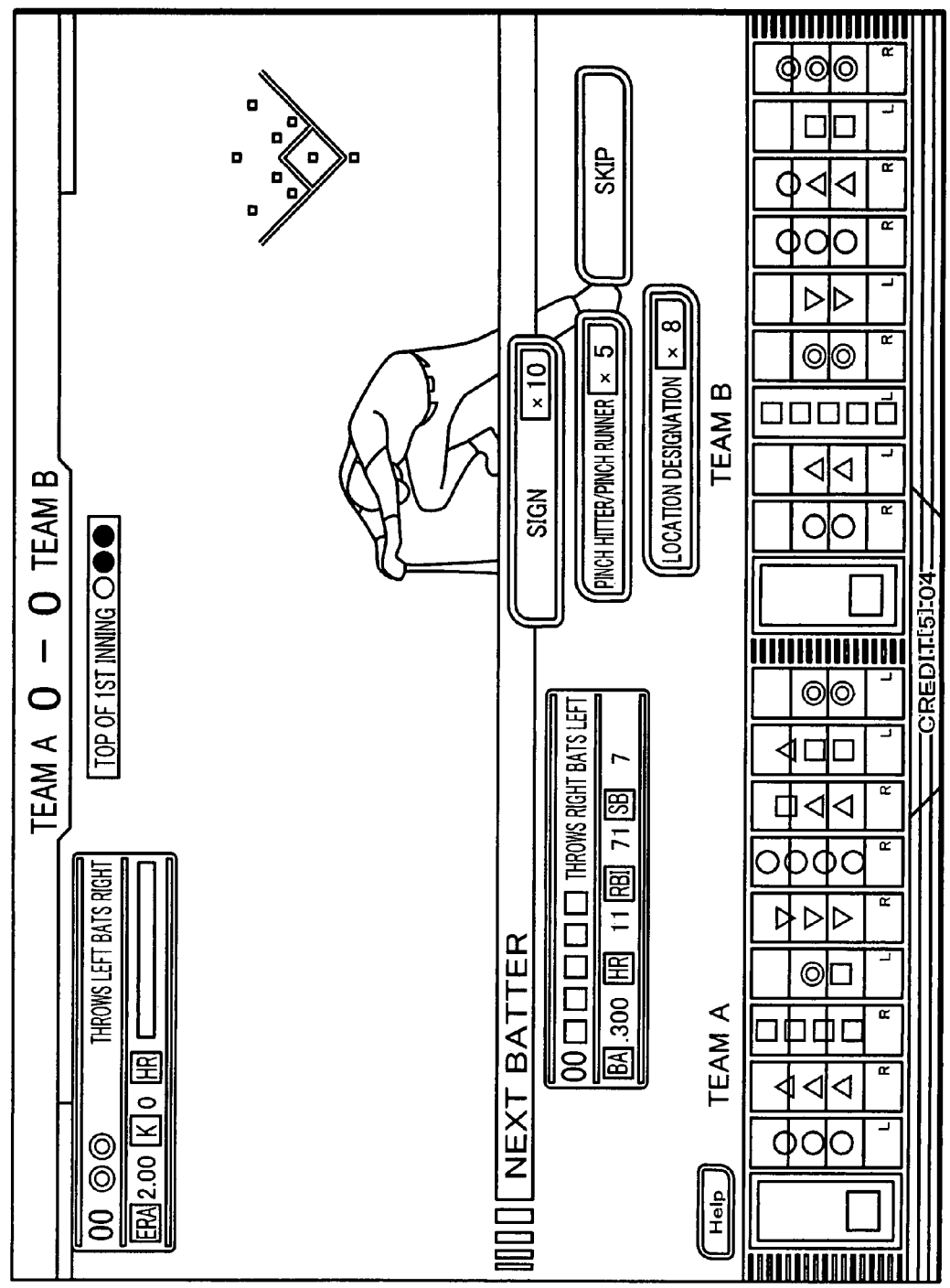
FIG. 16 illustrates a game image at start of a sequence in case where a player plays the game on a batter side.

A plurality of items for use in a competition are stored in the ROM 3001 in a selectable manner. In this embodiment, the items include "sign (directive)", "pinch hitter/pinch runner", "location designation", and "skip" to be used when none of the above items is selected. The image display control section 302 is operable, in response to start of each sequence, to display each of the items in the form of a button, as shown in FIG. 16.

The item "sign" includes the following five sub-items prepared for a defensive side (i.e., fielding team (fielding side)): "lookout for stolen base", "lookout for hit and run", "defense for bunt", "defense for double play" and "defense for extra-base hit", and the following seven items prepared for an offensive side (i.e., team at bat (batting side)): "bunt", "sacrifice bunt", "hit and run", "stolen base (double steal)", "stolen second base", "stolen third base" and "squeeze play". When the item "sign" is selected, contents of the above sub-items will be selectably displayed on the screen in the form of a button. It is understood that any other suitable defensive item may be employed in place of or in addition to the above items.

The item "pinch hitter/pinch runner" is executed by mounting a new athlete card 9 of an intended pinch hitter or pinch runner on the mounting surface 20 where an athlete card 9 to be changed has been mounted. When the athlete card 9 is replaced, athlete parameters corresponding to athlete identification data newly read by the image pickup section 11 will be read from the ROM 3001, and used for the game.

The item "location designation" enables a player to manually designate a pitch location when the player plays the game on a pitcher side, or to manually designate a swing location when the player plays the game on a batter side.

An area graphic having a predetermined shape, typically a quadrangular shape, and virtually representing a given zone, such as a strike zone, above a home base (the area graphic will hereinafter be referred to "strike zone image SZ" for descriptive purposes) is displayed in the game space, preferably, as a semi-transparent image obtained through a processing by the image display control section 302. Thus, the pitch or swing location can be manually designed by pressing an intended position in the strike zone image SZ through the touch panel 10 superimposed on the monitor 3.

In response to pressing of the "location designation" button in FIG. 16, the image display control section 302 is operable to display the strike zone image SZ (see FIG. 17) so as to allow the player to designate a pitch location when the player's character is on the defensive side, or display the strike zone image SZ (see FIG. 18) so as to allow the player to designate a swing location when the player's character is on an offensive side. Further, every time the location is designated, image screens illustrated in FIG. 17 or 18 and FIG. 19, 20 or 21 will be displayed to allow the player to check the designated location.

Figure 17:
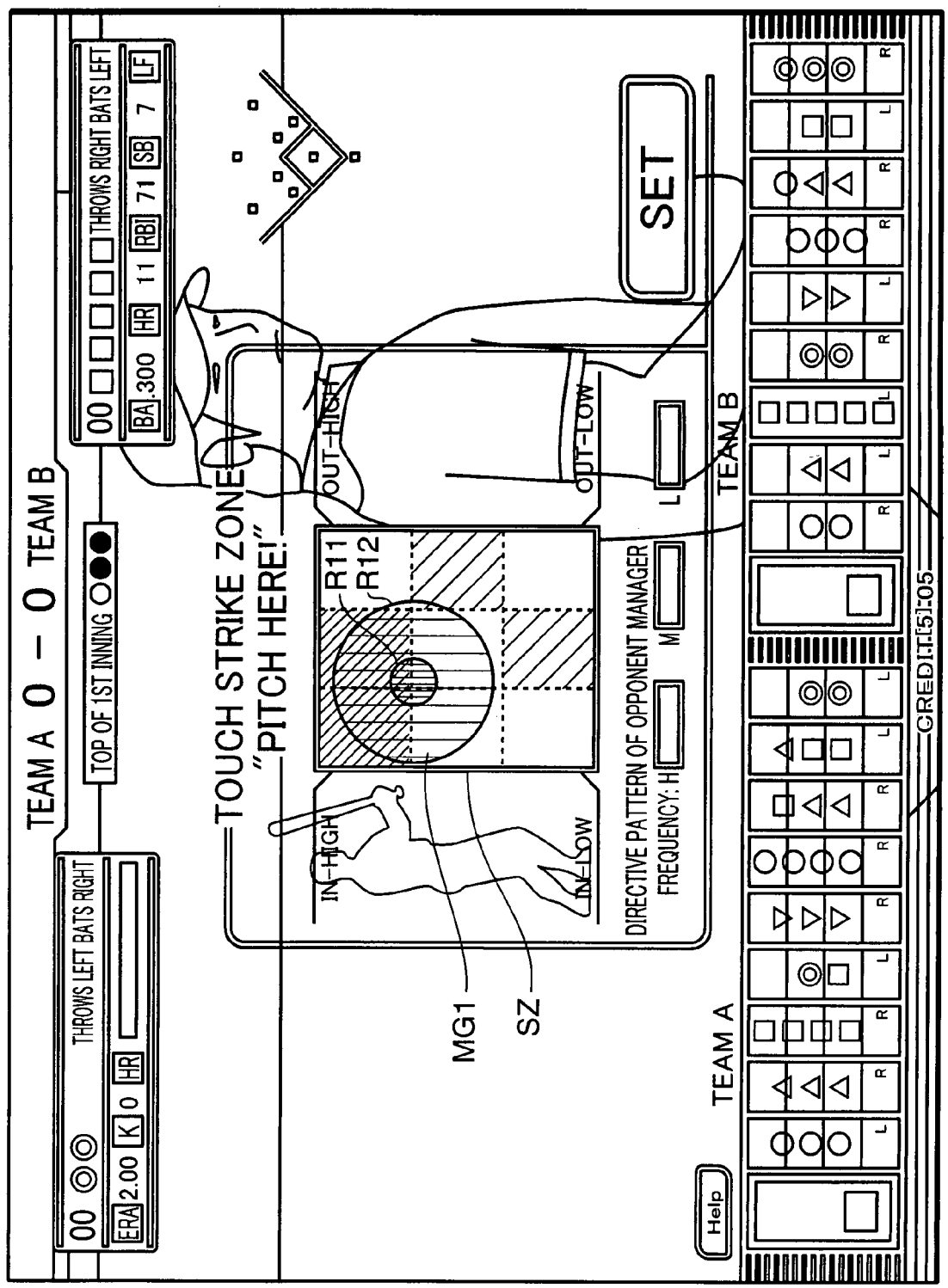
FIG. 17 illustrates a game image for guiding designation of a pitch location in case where the player plays the game on a pitcher side.
Figure 18:
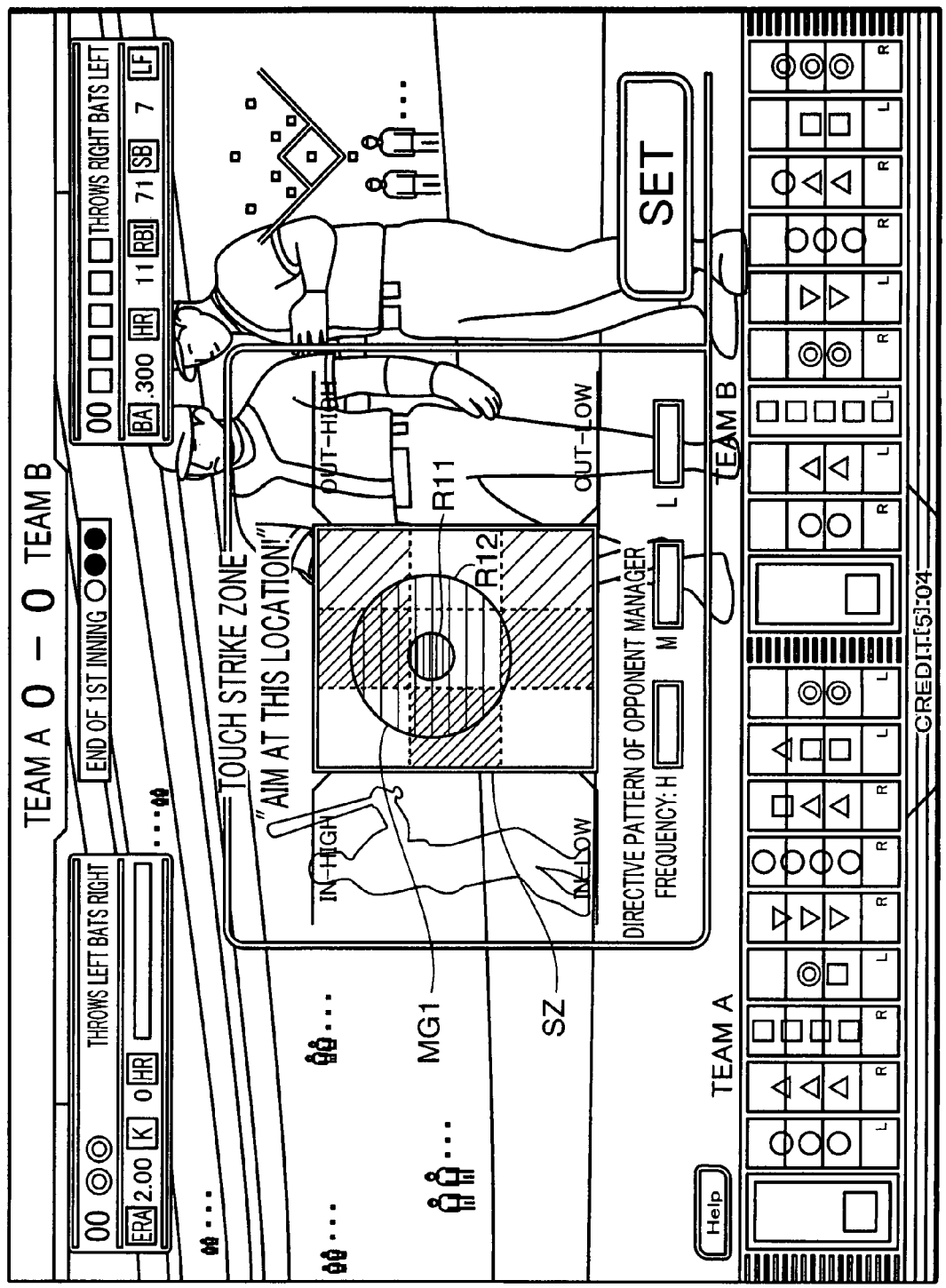
FIG. 18 illustrates a game image for guiding designation of a swing location in case where the player plays the game on the batter side.

When the "location designation" button in FIG. 16 is pressed, the setup section 304 is activated to set up the position pressed by the player through the touch panel 10 on the monitor 3, to the strike zone image SZ illustrated in FIG. 17 or 18. Specifically, the position to be designated when the player plays the game on the defensive side is a position where the ball character configured to simulate a ball to be thrown by the pitcher character passes through the strike zone image SZ, i.e., a pitch location, and the position to be designated when the player plays the game on the offensive side is a position where the bat character configured to simulate a bat to be swung by the batter character passes through the strike zone image SZ, i.e., a swing location.

Figure 19:
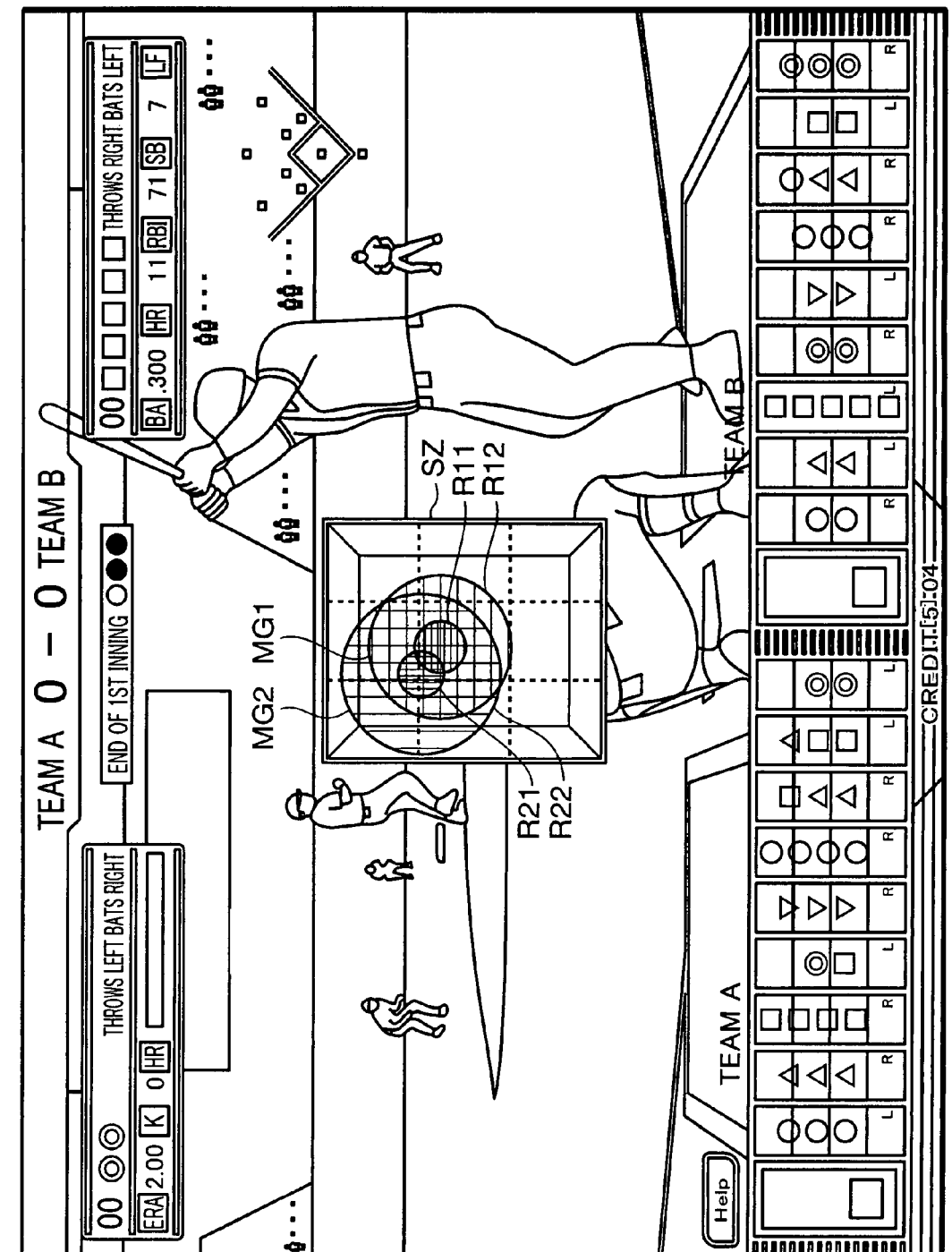
FIG. 19 illustrates a game image showing a state when the pitch location and the swing location overlap each other in case where the player plays the game on the batter side.
Figure 20:
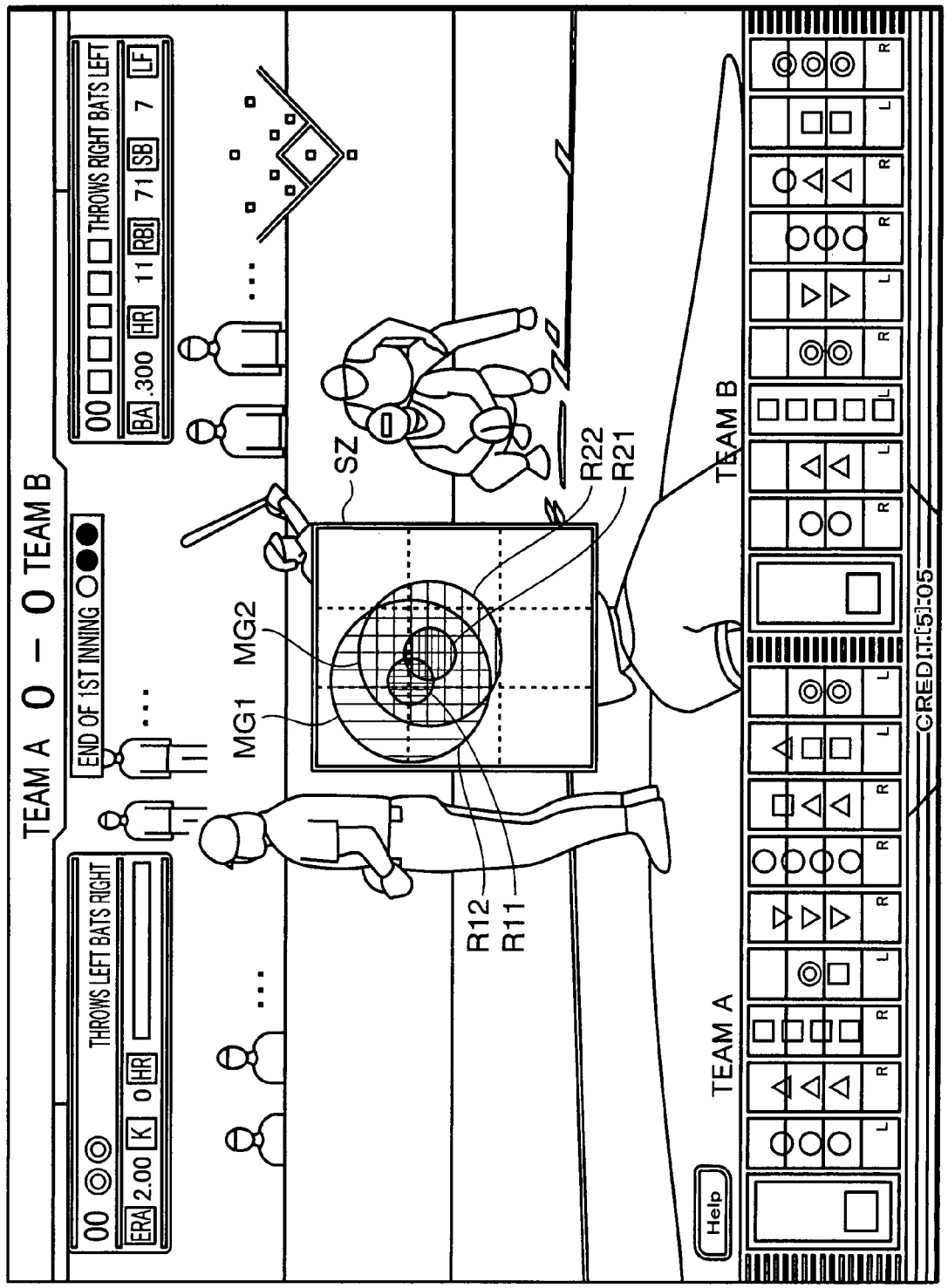
FIG. 20 illustrates a game image showing a state when the pitch location and the swing location overlap each other in case where the player plays the game on the pitcher side.
Figure 21:
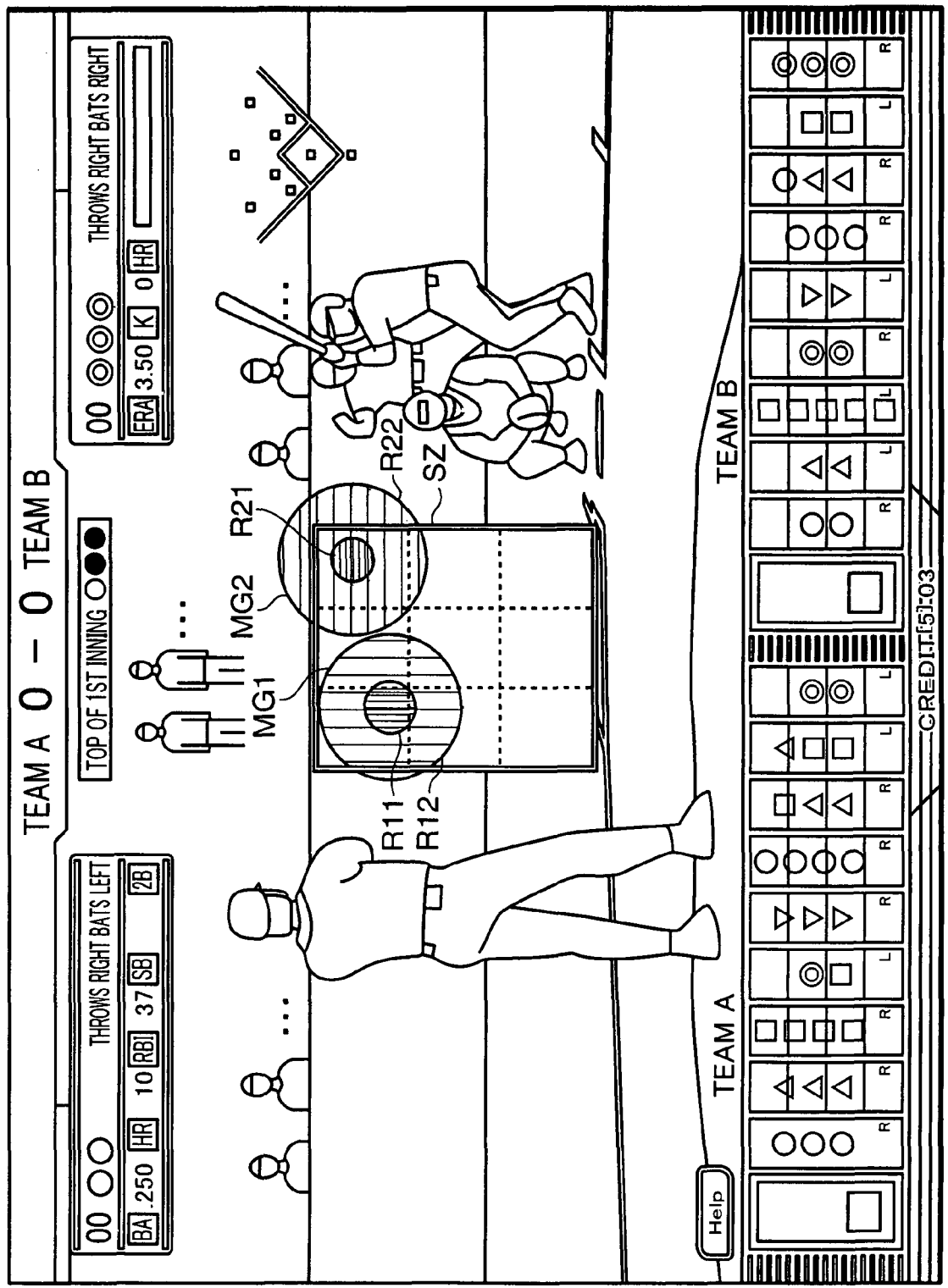
FIG. 21 illustrates a game image showing a state when the pitch location and the swing location have no overlapping in case where the player plays the game on the batter side.

Then, the setup section 304 is operable to create a predetermined shaped graphic on the basis of the location designated by the player (in this embodiment, a circular graphic which has a center located at the designated location and a predetermined radius). The image display control section 302 is then operable to display the created graphic on the monitor 3 as a mark image MG1 (first mark image). Concurrently, in the opponent's game apparatus operated by an opponent who plays against the player, the location designation operation is performed relative to the strike zone image SZ in the same manner, and the player's game apparatus receives data about opponent's designated location through the communication section 130, as will be described in detail later. Thus, as to the opponent's designated location, the setup section 304 is operable to create a circular graphic having a predetermined radius in the same manner, and the image display control section 302 is operable to display the created graphic as a mark image MG2 (second mark image) together with the mark image MG1, as shown in FIGS. 19 to 21. In this operation, the image display control section 302 is configured to perform the simultaneous display of the mark images MG1, MG2 after completion (setup) of the location designation processing for the mark image MG1, so as to validate game's attractions coming from predicting the location to be designated by the opponent (reading opponent's tactics).

The circular graphic of the mark image MG1, MG2 employed in this embodiment is a double circle, although it may be a single circle. Specifically, the double circle consists of an inner central circle region R11 and an outer ring region R12, which are displayed in different display modes to facilitate discrimination therebetween, typically in different colors.

The setup section 304 is configured to set up a diameter of the central circle region R11 and a width of the ring region R12 of the mark image MG1, based on the following parameter. As to a pitcher, the parameter for the central circle region R11 includes a factor about a level of pitched-ball power, such as "pitched-ball speed", "intimidating power", "correction against left-handed batter" and "acceleration of pitched ball", and the parameter for the ring region R12 includes a factor about a level of pitched-ball control, such as "ball control"; "rate of four wide ones", "rate of mistake pitches", "quick pitching". As to a batter, the parameter for the central circle region R11 includes a factor about a level of batted-ball power, such as "hitting power", "trajectory of batted ball", "intimidating power", "power hitter", "winning hitter", "coping with adversity", "multi-hit", "tackle" and "cleanup batter", and the parameter for the ring region R12 includes a factor about a level of hittability, such as "bat control", "bat control correction against left-handed pitcher", "correction in chance", "hitting to opposite field", "spray-hitting style", "infield single", "bunt skill", "grand-slam hitter", "first-pitch swinger", "hitting streak" and "tenacious player". It is understood that any other suitable factor (parameter) may be employed in place of or in addition to the above parameters.

Thus, as to the pitcher character, the radius of the central circle region R11 (R21) becomes smaller as a total parameter value of the factors about pitched-ball power is increased, and the radius of the ring region R12 (R22) becomes smaller as a total parameter value of the factors about pitched-ball control is increased. As to the batter character, the radius of the central circle region R11 (R21) becomes larger as a total parameter value of the factors about batted-ball power is increased, and the radius of the ring region R12 (R22) becomes larger as a total parameter value of the factors about hittability is increased. That is, as the pitcher character has higher ability, the mark image for the pitcher side becomes smaller so as to become more likely to overlap the swing location of the batter side (become favorable to the pitcher side). On the other hand, as the batter character has higher ability, the mark image for the batter side becomes larger so as to become less likely to overlap the pitch location of the pitcher side (become favorable to the batter side).

A part of the above parameters are used without relation to a game state, and the remaining parameters are used in connection with the game state (sequence). In the latter case, one or more of the parameters corresponding to the game state will be used. For example, in a game state (sequence) where an opponent's batter is a left-hand batter when the player plays the game on the defensive side, a "left-hand batter" parameter is applied to the pitcher. In this case, if the "left-hand batter" parameter is "1", the central circle region R11 of the mark image MG1 will be set to have a relatively small radius. In a game state (sequence) where the bases are loaded when the player plays the game on the offensive side, a "bases loaded" parameter is applied to the batter. In this case, if the "bases loaded" parameter is "1", the ring region R12 of the mark image MG1 will be set to have a relatively large width. Conversely, if the "bases loaded" parameter is "0", the ring region R12 of the mark image MG1 will not be changed by this parameter.

In order to set up the diameter of the central circle region R21 and the width of the ring region R22 of the mark image MG2, athlete identification data of an athlete card is received through the communication section 130 upon start of the game or when one or more of the opponent's characters are changed, and athlete parameters corresponding to the received athlete identification data are read from the ROM 3001 and used for the setup processing. Levels of the respective radii of the central circle regions R11, R21 and levels of the respective widths of the ring regions R12, R22 will have impact on a level of overlapping between the mark images MG1, MG2. Specifically, there are the following cases: the mark images MG1, MG2 have no overlapping; only the ring regions R12, R22 overlap each other; the central circle region R11 (or R21) of either one of the mark images MG1, MG2 overlaps the ring regions R22 (or R12); and the central circle regions R11, R21 overlap each other. The overlapping level reflects on a batting result. This point will be described in detail later with reference to FIGS. 8 to 10.

The action-setting section 305 is provided as a means to create information necessary for determining a batting result, i.e., data to be transmitted to the opponent's game apparatus, based on a part of input operation information from the manual operation section 10A, and the athlete parameters, according to the selection items illustrated in FIG. 16. In information to be input from the manual operation section 10A, information about the card-mounted position from the image pickup section 11 reflects on a processing of allowing an attribute defining a mode of an action of an athletic character in a plurality of levels to be set at one of the levels so as to virtually determine in what mode the character's action is taken.

The level of the attribute represents a level (pitching power) of a pitcher when he throws a ball at full power or while saving its power, or a level (swing power) of a batter when he swings a bat. Specifically, as to the attribute level for a pitcher, when an athlete card 9 is mounted on a front side relative to the central position of the mounting surface, the pitching power will be set closer to the full power to increase a pitched-ball speed and lower a hits-allowed rate while increasing a stamina consumption. When the athlete card 9 is mounted on a rear side relative to the central position of the mounting surface, the pitching power will be saved (the pitched-ball speed is lowered) to increase the hits-allowed rate while reducing the stamina consumption. The parameter of stamina consumption is pre-managed, and configured to be increased in a virtual situation when the pitcher is on the batting side and in a dugout or bench. Further, the parameter of stamina consumption for the pitcher is configured to be reduced depending on the level of pitching power by a predetermined value.

As to the attribute level for a batter, when an athlete card 9 is mounted on a front side relative to the central position of the mounting surface, the swing power will be increased to more hardly swing a bat, and lower a hitting rate. When the athlete card 9 is mounted on a rear side relative to the central position of the mounting surface, the swing power will be more saved to suppress a hard swing and increase a value of the hitting rate. The increase/decrease in swing power of a batter is reflected on respective level of distance and speed of a batted ball, i.e., a height in trajectory (i.e., a value of ascending vertical angle) of the batted ball, and a hit rate.

When the "sign (directive)" button in FIG. 16 is selected and then either one of the sub-items is selected when the player plays the game on the offensive side, the acceptance section 303 accepts the selection's content, and the action-setting section 305 receives the selection's content and sets the received selection's content as a result of the directive selection. According to an after-mentioned unit-sequence execution section 310, this directive selection result will reflect on a processing of changing the position of a fielder and a processing of a defensive position of a fielder and a processing of controlling base-running of a base runner, in such a manner as to simulate an actual baseball (i.e., according to a control program based on the baseball rules).

In this embodiment, the action-setting section 305 is adapted to create the following transmitting data: "ball release timing", "pitch type", "selected directive item", "pitch location" and "attribute level (full power to saved power)" for pitching data; and "swing timing", "selected directive item", "swing location" and "attribute level (hard swing to controlled swing) for batting data. In the pitching data, the "ball release timing", i.e., a time lag relative to the "ball release" (optimum ball release timing) in the pitcher parameters, is set based on the random number generation section 308 or a random processing. The "pitch type" is set from various breaking balls in the pitcher parameters, in consideration of the directive information and the attribute level. If the "location designation" button in FIG. 16 is not selected, the "pitch location" and "swing location" will be set by the CPU based on both the pitcher and batter parameters. In the batter data, the "swing timing", i.e., a time lag relative to the "swing timing" (optimum swing timing) in the fielder parameters, is set based on the random number generation section 308 or a random processing. Further, when the acceptance section 303 or the action-setting section 305 (corresponding to operation judgment means) judges that the none of the items including the "location designation" is selected within a predetermined acceptance time period, the action-setting section 305 is operable to set respective contents of pitching and batting, based on the pitcher and batter parameters and others owned by the player's game apparatus according to a predetermined rule using a pseudo-random number from the random number generation section 315, and transmit the result to the opponent's game apparatus as tactical data, in a bidirectional manner.

The communication processing section 306 is provided as a means to transmit given information set by the setup section 304 and the action-setting section 305 based on the contends of selection and designation from the manual operation section 10A, to the opponent's game apparatus, in a bidirectional manner. The communication processing section 306 has a buffer at respective transmitting and receiving interfaces to transmit and receive data through the transmit buffer and receiving buffer, or at least a receiving interface to receive data through the receiving buffer. Thus, the player's and opponent's game apparatuses can receive data from the other side to have the same information therebetween.

The batting result-setting section 307 is provided as a means to determine a batting result. The batting result-setting section 307 is adapted to set the batting result in different processings depending on whether or not the "location designation" button is selected. Specifically, the batting result-setting section 307 is operable, when the "location designation" button is selected, to perform a processing, for example, of calculating a probability of making a hit by the pitcher character (hit rate), based on the pitcher and batter parameters and the exchanged data between the player's and opponent's game apparatuses, and using a predetermined calculation formula, then determining whether the batting result is whiff (struck out swinging) or hit, depending on a level of the probability (determined by an after-mentioned hitting determination processing), and, if hit, determining a trajectory (strength or distance) of a batted ball. In the above calculation formula, the stamina consumption is also used as a coefficient.

When the "location designation" button is selected, the batting result-setting section 307 is operable to perform a hitting determination processing corresponding to the "location determination". The hitting determination processing is intended to determine a hitting level, and a contact rate (%), depending on a level of overlapping between the mark images MG1, MG2.

Figure 8A:
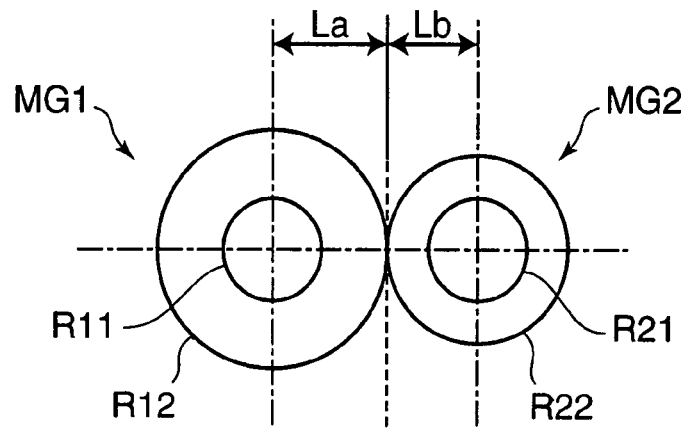
FIG. 8 is an explanatory diagram of a level of overlapping with a central circle region R11 and an outer ring region R12 of a mark image.
Figure 8B:
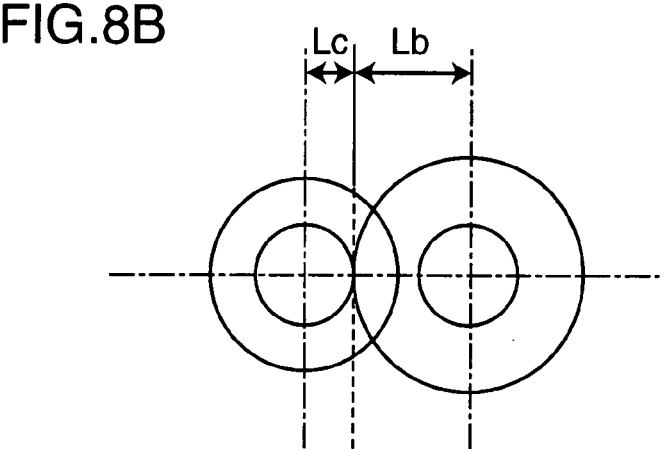
Figure 8C:
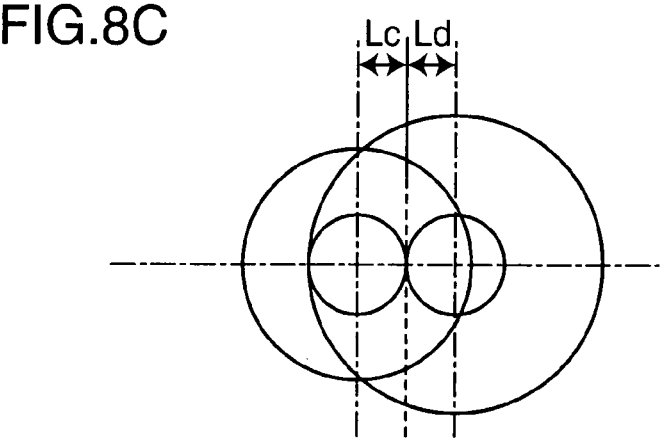
Figure 9:
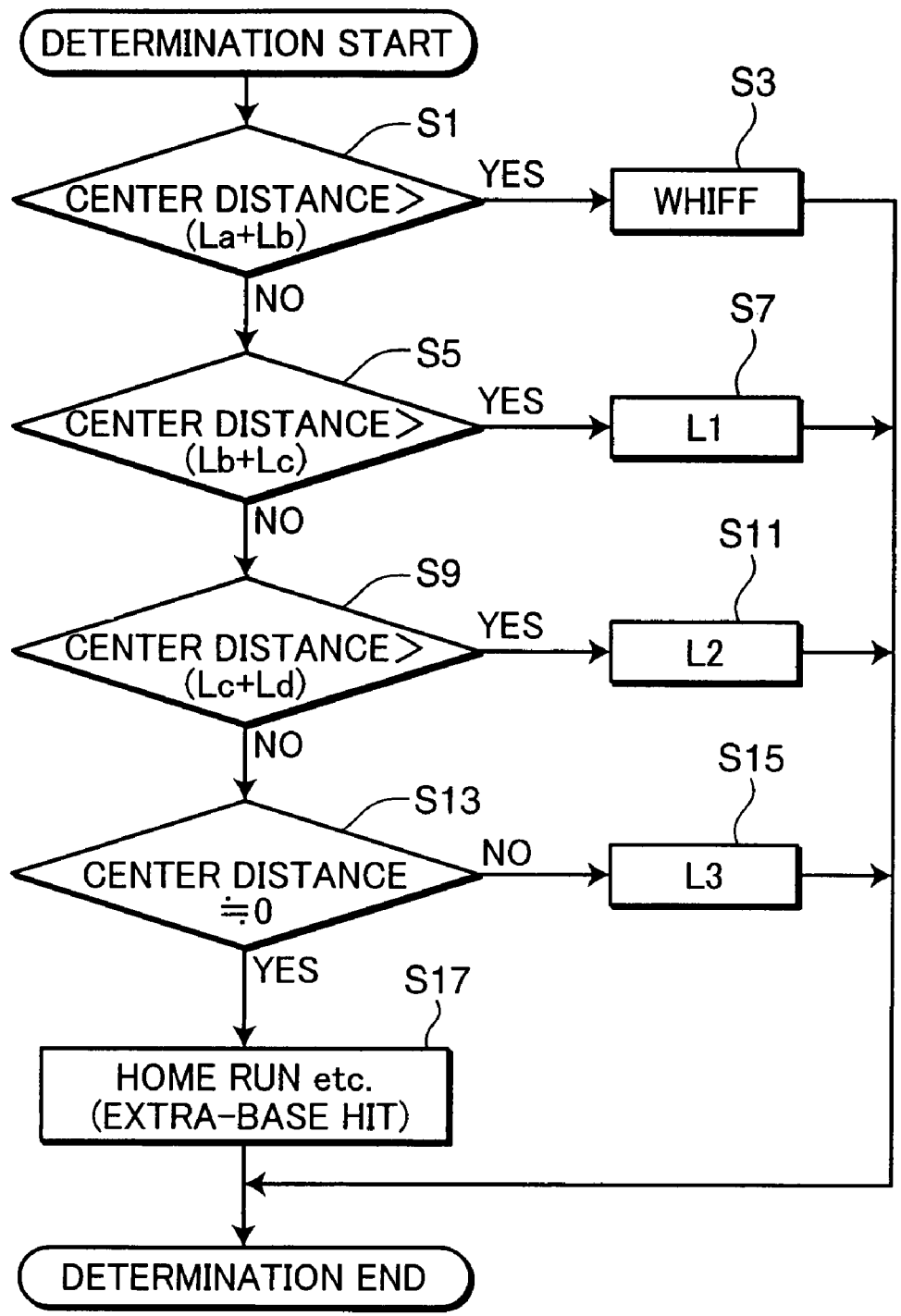
FIG. 9 is a flow chart showing a processing of determining a hitting level for the overlapping level.

FIG. 8 is an explanatory diagram showing a level of overlapping with the central circle region R11 and the outer ring region R12 of the mark image, and FIG. 9 is a flowchart showing a processing of determining a hitting level for the overlapping level. FIG. 8A shows a state when the respective ring regions R12, R22 of the mark images MG1, MG2 are in contact with each other. FIG. 8B shows a state when an outer peripheral edge of the ring region R22 of the mark image MG2 is in contact with an outer peripheral edge of the central circle region R11 of the mark image MG1, and FIG. 8C shows a state when the respective central circle regions R11, R21 of the mark images MG1, MG2 are in contact with each other. In FIG. 8, a radius between the center of the mark image MG1 (mark image MG2) and the outer peripheral edge of the ring region R12 (ring region R22) is defined as La (Lb). Further, the central circle region of one of the mark images (in FIG. 8, the central circle region R11 of the mark image MG1) is defined as Lc, and the central circle region of the other mark image (in FIG. 8, the central circle region R21 of the mark image MG2) is defined as Ld.

In FIG. 9, it is first determined whether a center distance between the mark images MG1, MG2 is greater than (La+Lb) (Step S1). If the center distance is greater than (La+Lb), there is no overlapping, and therefore "whiff" will be set as the batting result (Step S3). When the center distance is equal to or less than (La+Lb), it is determined whether the center distance is greater than (Lb+Lc). If the center distance is greater than (Lb+Lc), the mark images MG1, MG2 are in between the states illustrated in FIGS. 8A and 8B, and therefore a level-1 hitting processing will be set as the batting result. When the center distance is equal to or less than (Lb+Lc), it is determined whether the center distance is greater than (Lc+Ld). If the center distance is greater than (Lc+Ld), a level-2 hitting processing which is favorable to a batter, for example, a processing of providing a higher batted-ball speed, will be set as the batting result. When the center distance is equal to or less than (Lc+Ld), it is determined whether the center distance is greater that a predetermined value approximately equal to zero. If the center distance is greater that the predetermined value, the overlapping level is higher than at least that in FIG. 8C, and therefore a level-3 hitting processing which is more favorable to the batter as compared with the level-2, for example, a processing of providing a higher batted-ball speed, will be set as the batting result. When the center distance is equal to less that the predetermined value approximately equal to zero (i.e., the centers are approximately aligned with each other), a processing which is more favorable to the batter as compared with the level-3, typically a processing of providing a home run, is set as the batting result.

The batting result-setting section 307 is also operable, when the "location designation" is selected, to perform a processing of determining the batting result, based on the hitting level determined by the processing in FIG. 9, and a contact rate (%) corresponding to the overlapping level between the mark images MG1, MG2.

With reference to FIG. 8, the contact rate (%) corresponding to the overlapping level between the mark images MG1, MG2 in each of the levels-1, 2, 3. In the level-1 where only the ring regions R12, R22 overlap each other as shown in FIGS. 8A and 8B, a percent value corresponding to the overlapping level can be calculated by the following formula: $100 \times (La+Lb)/[L_0-(Lc+Ld)]$, wherein $L_0$ is a center distance between the mark images MG1, MG2. That is, the value is zero % in the state illustrated in FIG. 8A, and 100% in the state illustrated in FIG. 8B. More specifically, in case where each of the mark images MG1, MG2 have the same shape, when the ring region 12 is in contact with the central circle region R21 of the other mark image, the ring region R22 is also in contact with the central circle region R11 of the other mark image. Thus, in this case, the value is determined to be 100%. In case where each of the mark images MG1, MG2 have a different shape, when the ring region 12 is in contact with the central circle region R21 of the other mark image, the ring region R22 is not in contact with the central circle region R11 of the other mark image. Thus, in this case, the value is determined to be less than 100%.

In the level-2 where at least one of the ring regions R12, R22 overlaps the central circle region of the other mark image as shown in FIGS. 8B and 8C a percent value corresponding to the overlapping level can be calculated by the following formula: $100 \times (La+Ld-L_0)/(La-Lc)$, wherein La>Lb, and $L_0$ is a center distance between the mark images MG1, MG2. That is, the value is zero % in the state illustrated in FIG. 8B, and 100% in the state illustrated in FIG. 8C.

In the level-3 where the mark images overlap each other in such a manner that the respective reference locations thereof are moved from the state illustrated in FIG. 8C to come closer to each other, a percent value corresponding to the overlapping level can be calculated by the following formula: $100 \times [(Lc+Ld)-L_0]/(Lc+Ld)$, wherein $L_0$ is a center distance between the mark images MG1, MG2. That is, the value is zero % in the state illustrated in FIG. 8B, and 100% in the state illustrated in FIG. 8C (the value is zero % in the state illustrated in FIG. 8C, and 100% in a state when the respective centers of the mark images MG1, MG2 are aligned with each other??)

As above, while each of the levels-1, 2, 3 originally represents a level that the swung bat character can make a solid contact with the pitched ball character (i.e., can hit the pitched ball character clearly), a level of solid contact in each of the levels-1, 2, 3 is set in a continuously-variable manner or in a greater number of stages (than three stages in the levels-1, 2, 3), correspondingly to the mark-image overlapping level, to produce higher realistic sensation. For example, the level of solid contact may be expressed by a power rate (0 to 100%) which determines a trajectory of a ball after being batted (i.e., batted-ball speed), wherein the level-1, the level-2 and the level-3 are set in the range of 20 to 40%, in the range of 50 to 70%, and in the range of 80 to 100%, respectively. In this case, when the mark-image overlapping level is 50% in the level-1, the batted-ball speed is set to 30%. That is, a trajectory (i.e., batted-ball speed) of 30% of a hitting power of the batter character is given to the batted ball character. The levels divided in the above manner allows the batted-ball power (strength) to be reflected in a multistage manner, instead of being reflected on an entire level of the parameter in proportional relation.

Figure 10:
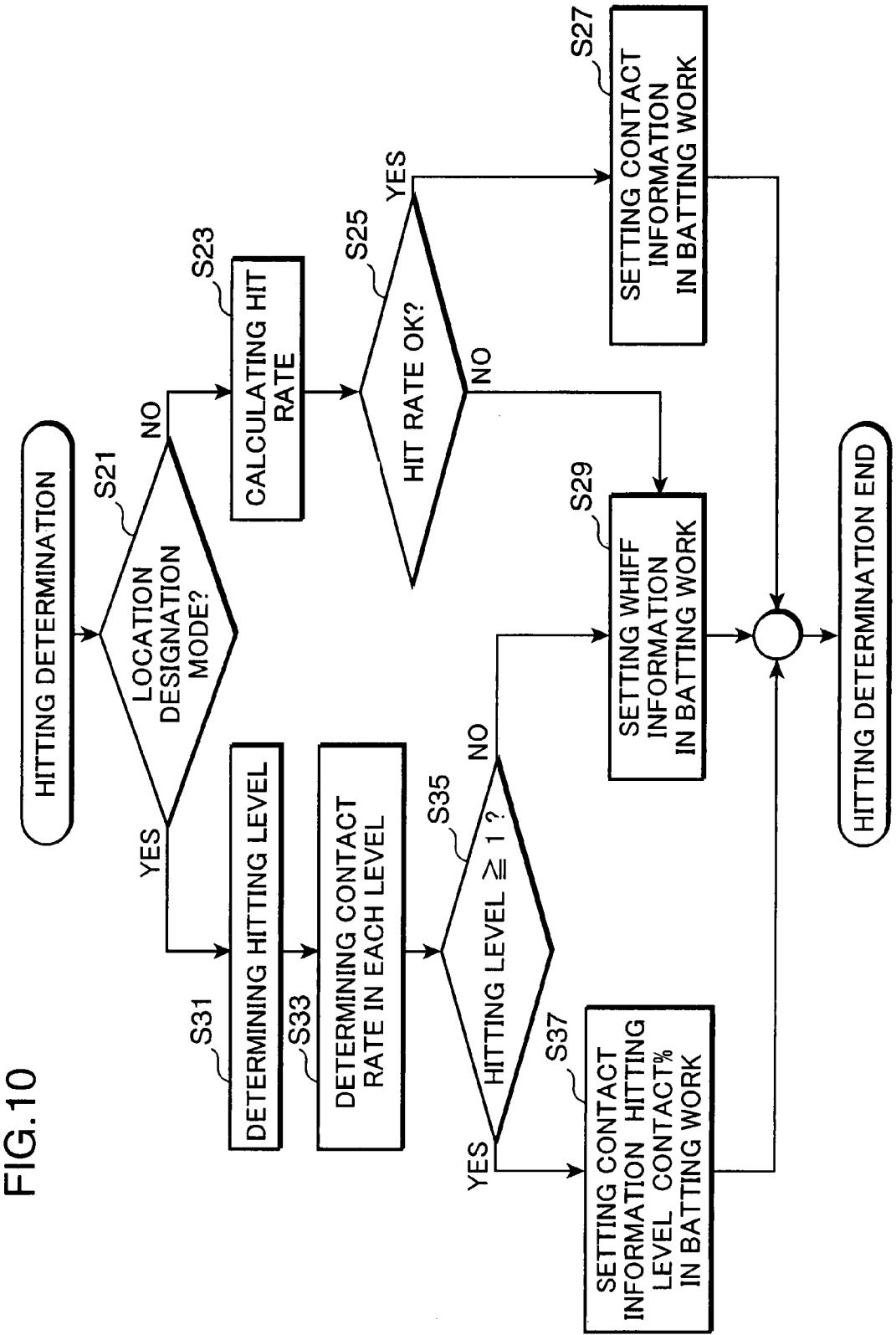
FIG. 10 is a flowchart showing one example of a hitting determination processing.
Figure 14:
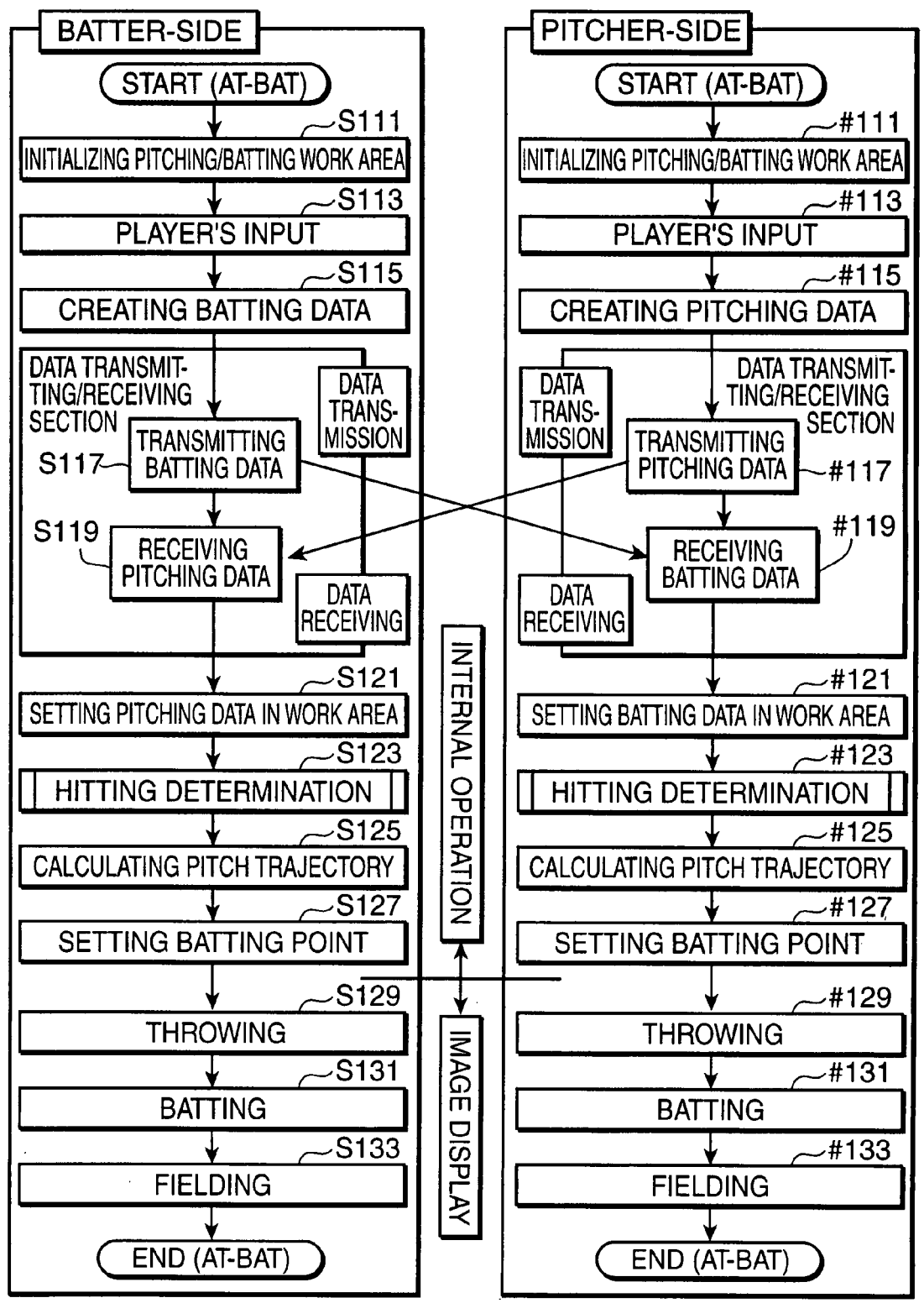
FIG. 14 is a flowchart showing a pitching/batting (at-bat) subroutine included in a sequence execution processing in Step S45 illustrated in FIG. 11.

FIG. 10 is a flowchart showing one example of the hitting determination processing (details of Step S123 in FIG. 14). In FIG. 10, it is determined whether the "location designation" button is selected on the image screen in FIG. 16. If the "location designation" button is not selected, the subroutine will advance to Step S23 to perform a normal hit-rate calculation. Specifically, as mentioned above, a probability of making a hit by the pitcher character is calculated, based on the pitcher and batter parameters and the exchanged data between the player's and opponent's game apparatuses, and using a predetermined calculation formula, and it is determined whether the calculated probability (hit rate) is equal to or greater than a predetermined value (Step S25). If the hit rate reaches the predetermined value, a hitting processing corresponding to the hit rate will be set in a batting work area of the RAM 3002 (Step S27). When the hit rate does not reach the predetermined value, a whiff processing is set in the batting work area of the RAM 3002 (Step S29).

When the "location designation" button is selected on the image screen in FIG. 16, after performing the determination of the hitting level (Step S31) and the determination of the contact rate (%) (Step S33), it is determined whether the hitting level is equal to or higher than the level-1 (Step S35). If the hitting level does not reach the level-1, the whiff processing will be set in the batting work area of the RAM 3002 (Step S29). When the hitting level is equal to or higher than the level-1, information about the hitting, the hitting level and the contact rate (%) is set in the batting work area of the RAM 3002 (Step S37).

The frequency calculation section 308 is activated when the "location designation" button is selected. As shown in FIGS. 16 and 17, the strike zone image SZ is divided into nine areas in vertical and horizontal directions, and each of the areas is displayed in a predetermined display mode where a frequency level of location designation is indicated for each of the areas based on a previous record (in this embodiment, respective colors are distinguished in a predetermined number of stages in such a manner that the colors becomes more reddish as the frequency increases, and preferably after being subjected to a processing for obtaining a semi-transparent image. In this case, the number of areas is nine. Thus, the frequency may be divided into the following three ranges: 0 to 10%; 11 to 20%; and 21% or more, or the four ranges including an additional range of 31% or more. Alternatively, the frequency may be guided in the form of a ranking, or only a part of the areas having a predetermined frequency value or more may be displayed in a different display mode from that for the remaining areas. Information about the frequency of location designation is obtained by aggregating, on a area-by-area basis, all previous designated-location data (or a part of previous designated-location data corresponding to a predetermined number of recent games) of the player or opponent which is stored in the center server, and calculating a ratio of a designation member in each of the areas to a total designation members. For example, instead of indicating the frequency for all the areas, a frequency of location designation to each of plural groups of areas divided by height, e.g., three groups consisting of high, middle and low locations, may be displayed in the above display mode having a predetermined number of stages.

The game state judgment section 309 has a game management function of managing a game state. Specifically, the game state judgment section 309 is operable to issue an instruction for data exchange of athlete parameters of each of a plurality of athlete cards 9 to be used in each of the player's and opponent's game apparatuses, at start of the game, and an instruction for transmitting/receiving of athlete parameters of a substitute athlete during change in the athlete character, and judge a game state (score, pinch, chance, etc.) based on the number of executed sequences, i.e., the number of innings or the number of outs in a baseball game, and an adjacent sequence execution result. When a result of the judgment is a predetermined special state (e.g., final inning) or a notable state (bases loaded), this state will be reflected on a batting result to be determined by the batting result-setting section 307, i.e., a processing of determining whether the batting result is hit or out. When the "location designation" button is selected, the above game state may be used as a parameter for setting the mark image, e.g., the respective widths of the ring regions R12, R22. This makes it possible to provide higher excitement to the game. Further, when the "location designation" button is selected, the game state judgment section 309 is operable to transmit data about the pitch and swing location to the center server in associated relation with the player.

The image display control section 302 in this embodiment is adapted to image an identical event from different viewpoint positions desirable for respective ones of pitcher and batter sides so as to provide enhanced visibility of game progression to each of pitcher-side and batter-side players, while it may be configured to display the same display image (i.e., display images which are same in a view point of a virtual camera and a direction of a sight line) on respective ones of pitcher-side and batter-side screen.

The unit-sequence execution section 310 is adapted to sequentially calculate respective movements of the pitcher character, the fielder character, the batter character and the base runner character during a series of actions in a process from pitching by the pitcher character through until a result of batting, and a movement of the ball character configured to simulate a ball, and sequentially lead the sequential calculation results to the image display control section 302.

The unit-sequence execution section 310 comprises a pre-processing section 311 and a post-processing section 312. The pre-processing section 311 is operable to obtain a processing result using a content of a determination by the action-setting section 305 and parameters used for the determination, before the pitcher character displayed on the monitor 3 throws the ball character. Specifically, when the player plays the game on the pitcher side, the pre-processing section 311 is operable to calculate respective data about a pitch location, a pitched-ball speed (using the "pitched-ball speed" and "ball release" in the pitcher parameters), a pitch type, a trajectory of a pitched ball and a ball-passing position above a home base. When a player plays the game on the batter side, the pre-processing section 311 is operable to calculate a trajectory of bat swing, whether the bat can hit the pitched-ball, and respective parameters of "batted-ball speed", "batted-ball angle" and "rate of decrease in batted-ball speed" at a moment when batted, when it is calculated that the bat can hit the pitched-ball. The respective trajectories of the pitched-ball character and the bat swing in the above calculations may be obtained in consideration of a commonly-used dynamics and air resistance, or may be obtained through a simulation-based calculation on the basis of a movement close to an actual movement and at a processing speed required for a game processing.

The post-processing section 312 is designed for a processing for an action to be performed after the pitching movement, and adapted to perform calculations for allowing a fielder character to have a natural defensive movement, relative to the movements of the ball character and the base runner character and allowing the base running character to have a natural base-running movement, relative to the movements of the ball character and the fielder character (according to a control program in conformity to the baseball rules), and perform a calculation for moving the ball character based on the data at the time when it is hit by the bat character. The post-processing section 312 is also operable to calculate a batted-ball speed and a batted-ball angle after hitting, in accordance with a misalignment and a time lag between respective ones of the passing position and timing of the ball character above the home base and the swing position and timing of the bat character, and by use of the respective parameters of the "batted-ball speed", the "batted-ball angle" and the "rate of decrease in batted-ball speed" obtained by the pre-processing section 311. In this calculation, the "batted-ball speed" and the "batted-ball angle" may be configured to provide variations in trajectory of the batted ball, using the random number generation section 308, so as to produce an enhanced realistic image.

The post-processing section 312 is operable to repeatedly perform the above calculation in a predetermined cycle and lead the obtained result to the image display control section 302 so as to dynamically display respective movements of the ball character, the pitcher character, the batter character, the fielder character and the base runner character on the monitor 3 to achieve more realistic sequence processing.

The athlete-card issue processing section 313 is operable, in response to termination of the game, to generate an instruction for issuing a predetermined number (in this embodiment, one) of athlete cards from the athlete card container in the housing 1 through the athlete card issue slot 6. Thus, a player can steadily collect a different type of athlete card every time he/she plays the game.

The ROM 3001 in the game apparatus pre-stores an athlete character image in a number enough to form one computer-controlled baseball team and respective parameters of athlete characters (pitcher parameters and fielder parameters). The opponent-side strategy setting section 314 serves as a means to achieve a competition between the CUP and a player, using a single of the game apparatus, and plays a roll of performing a processing of selecting the "location designation" item and the "sign" item, a processing of determining the attribute level and a batting result, and a processing of executing each sequence. Fundamentally, this opponent-side strategy setting section 314 is operable to activate the setup section 304 (second setting means), the action-setting section 305, the batting result-setting section 307, the frequency calculation section 308, the game state judgment section 309 and the unit-sequence execution section 310, in the player's game apparatus, in substantially the same manner as that in a situation where an opponent player exists, and perform an processing of display an image on a single monitor.

The random number generation section 315 is operable to generate a pseudo-random number in accordance with a predetermined rule so as to allow a content whose result is determined by probability (in this embodiment, "ball release timing" and "swing timing") to be subjected to a probability processing using the generated pseudo-random number, as described above. The game progression processing section 301 is operable to initialize the random number generation section 315, before start of a next game, or at start of the game, or at initiation of each sequence. In the competition game between the two game apparatuses, the game apparatuses exchange their data therebetween through the communication processing section 306 to perform the probability processing under the same condition, i.e., using the same data, so that each of the random number generation sections 315 in the two game apparatuses can constantly generate pseudo-random numbers coincidentally to thereby provide a coincident processing result therebetween. Further, when the unit-sequence execution section 310 performs a probability processing using a pseudo-random number as will be described in detail later, a content of the processing can also be constantly coincident between the two game apparatuses without exchanging processing data through the communication processing section 306. This makes it possible to display the same game image on the respective monitors 3 of the two game apparatuses, along with progression of the game.

FIG. 16 shows a game image at start of a sequence in case where the player plays the game on the batter side, and FIG. 17 shows a game image for guiding the designation of the pitch location in case where the player plays the game on the pitcher side. FIG. 18 shows a game image for guiding the designation of the swing location in case where the player plays the game on the batter side, and FIG. 19 shows a game image during a duel in a state when the player plays the game on the batter side, and the pitch location overlaps the swing location. FIG. 20 shows a game image during a duel in a state when the player plays the game on the pitcher side, and the pitch location overlaps the swing location. FIG. 21 shows a game image during a duel in case where the player plays the game on the batter side, and the pitch location and the swing location have no overlapping (i.e., whiff). As shown in FIGS. 17 to 21, in addition to the game image, an opponent (team name) and contents concerning a game status (score, inning, etc.) are displayed on an upper side of the image screen, and data about a pitcher and a batter dueling against each other is displayed on opposite lateral sides of the image screen. Further, a list of team members is displayed on a lower side of the image screen. The strike zone image SZ is displayed at a central position of the image screen. In this embodiment, the strike zone image SZ is divided into nine areas, and opponent's data about the frequency of the location designation is displayed in each of the areas in a distinguishable manner, and the player's mark image MG1 (see FIGS. 17 and 18) or the player's and opponent's mark images MG1, MG2 (see FIGS. 19 to 21), is/are displayed together with the strike zone image SZ.

Figure 11:
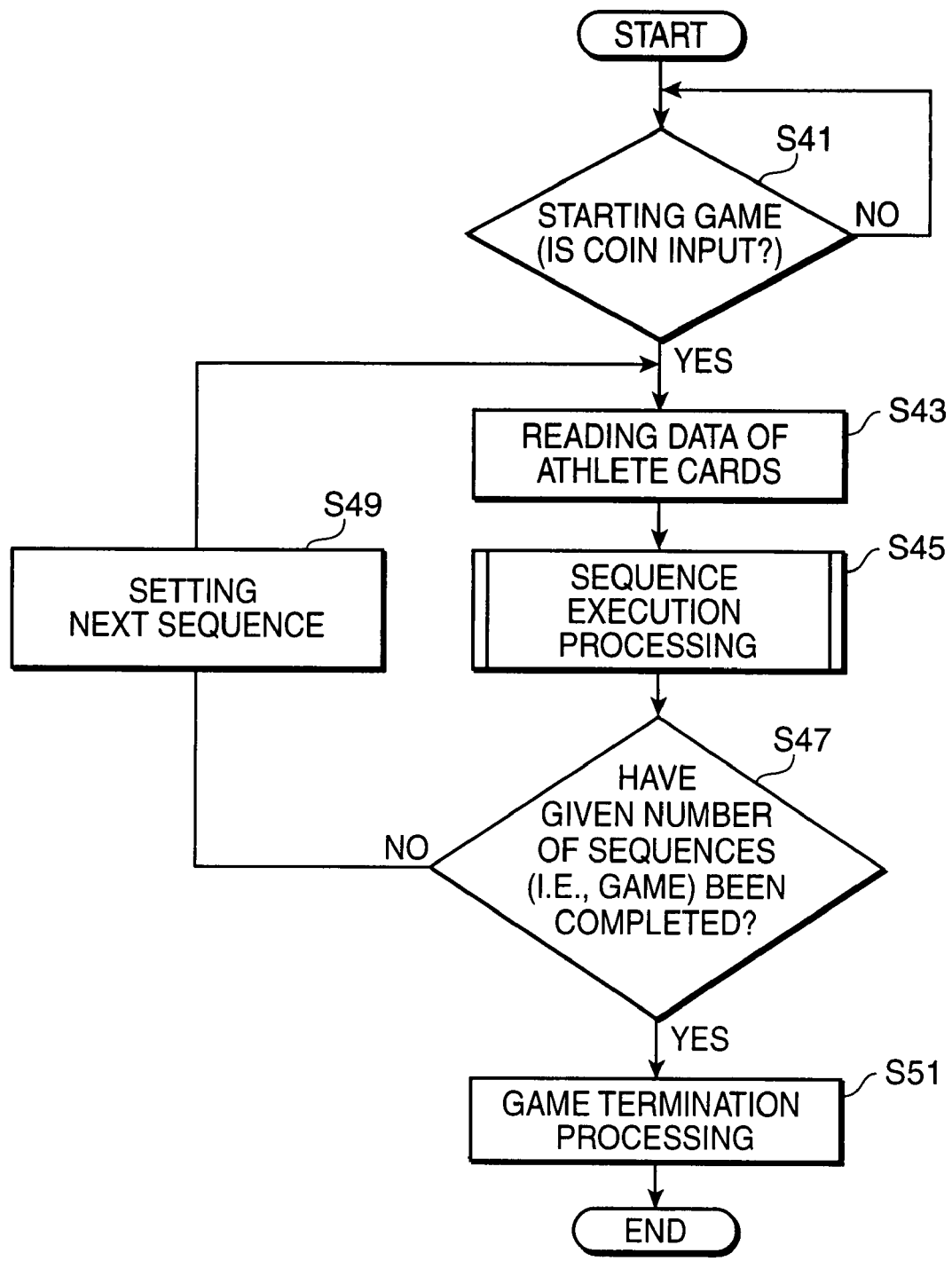
FIG. 11 is a flowchart showing a general flow of a game process.

FIG. 11 is a flowchart showing a general flow of a game process. Firstly, the coin sensor 81 detects whether a coin is input (Step S41). If YES, the image pickup section 11 is activated to detect that a required number (in a baseball game, nine) of athlete cards 9 are mounted on the mounting surfaces 20, and read athlete identification data of the respective athlete cards 9 (Step S43). Subsequently, after the game is initiated and data exchange with an opponent is performed, the routine advances to a processing of executing one sequence for a duel against one batter character (Step S45). Every time such a sequence is completed, it is determined whether the game is terminated (Step S47). When there is a remaining out or inning, another sequence for a duel against a next batter character is set, and the routine returns to Step S43. If it is determined in Step S47 that the game is terminated, a game termination processing, for example, of presenting superiority/inferiority (victory/defeat) on the monitor 3 is performed. Then, an instruction for issuing one new athlete card 9 is generated, and then this routine is terminated. The above routine is configured to adjust timings between the data transmitting and receiving in such a manner as to perform a receiving processing after completion of a transmitting processing during the data exchange with the opponent in the initial stage of the game, as will be described later.

Figure 12:
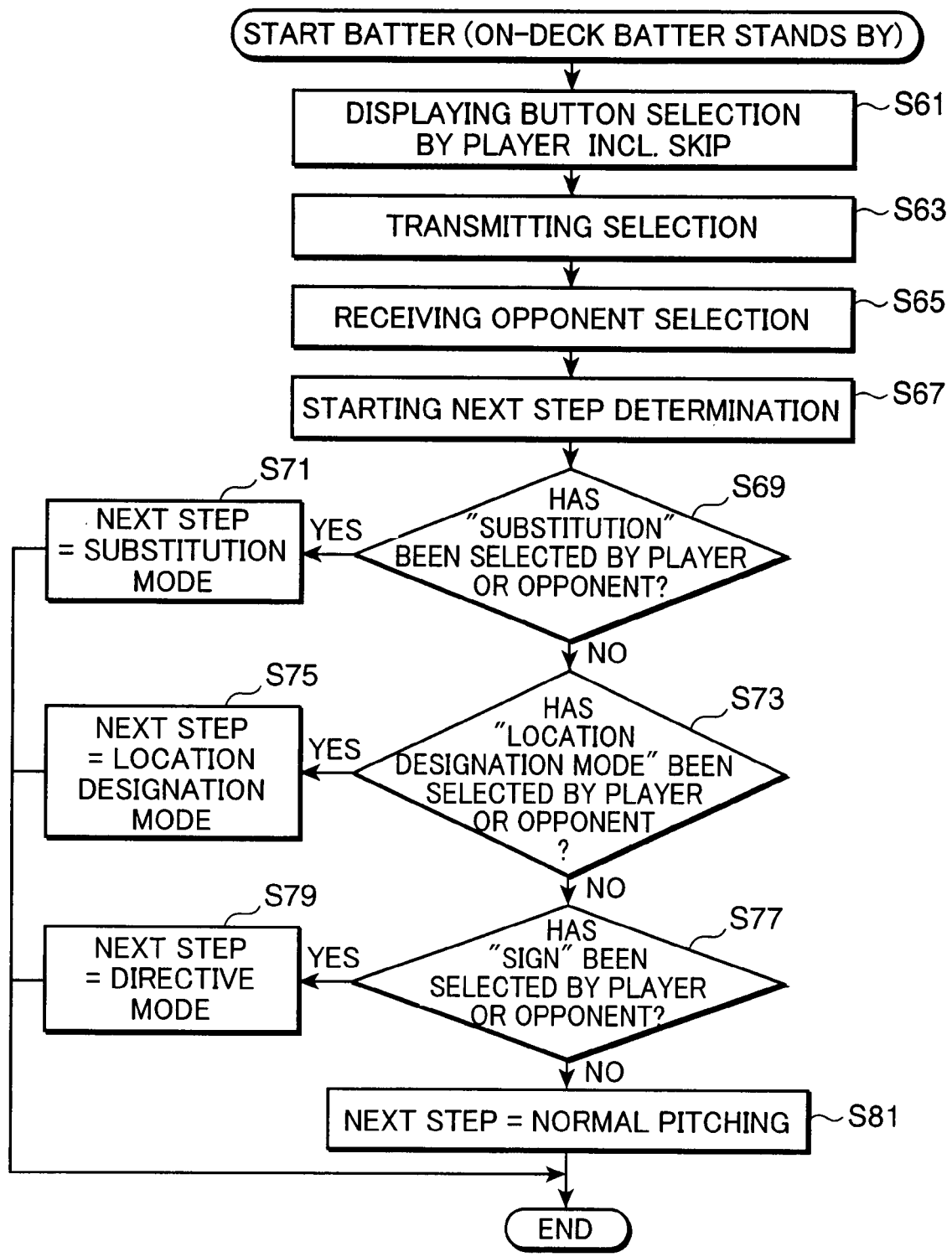
FIG. 12 is a flowchart for explaining a selection processing for an image screen illustrated in FIG. 16.

FIG. 12 is an explanatory flowchart of a processing for selection to the image screen illustrated in FIG. 16. The image screen in FIG. 16 represents the start of one sequence, wherein a batter warms up to be next at bat. The four buttons: "sign", "pinch hitter/pinch runner", "location designation" and "skip", are displayed on the image screen. In response to accepting information about selection of any one of the buttons (Step S61), the acceptance section 303 transmits the selection's content to the opponent's game apparatus (Step S63), and receives a content selected by an opponent from the opponent's game apparatus (Step S65). There is a difference between respective timings of the player's and opponent's selections. Thus, in the processings of transmitting/receiving the selection's contents, one of the game apparatuses where the selection is made at an earlier timing may perform the transmitting processing in first. More specifically, as shown in Steps S117 and S119 in FIG. 14 which will be described later, the protocol of the data exchange about the selection's content with the opponent is configured to adjust timings of the data exchange in such a manner as to perform the receiving processing after completion of the transmitting processing.

When the receiving of the opponent-side selection's content is completed, a step determination processing is performed (Step S67). Specifically, this selection subroutine in this embodiment is configured to set a priority to the "sign", "pinch hitter/pinch runner" and "location designation", and permit the player to select only one of these items. Firstly, it is determined whether the "substitution" (i.e., "pinch hitter/pinch runner") is selected by either one of the player and the opponent (Step S69). If the "substitution" is selected, the subroutine will advance to a substitution mode, wherein the image screen is switched to a predetermined image screen for guiding a substitution operation (Step S71). When the "substitution" is not selected, it is determined whether the "location designation" is selected by either one of the player and the opponent (Step S73). If the "location designation" is selected, the subroutine will advance to a location designation mode, wherein a processing of shifting to the image screen in FIG. 17 (or FIG. 18) and further to the image screen in FIG. 19 (or FIG. 20) or the image screen in FIG. 21, is performed (Step S75). When the "location designation" is not selected, it is determined whether the "sign" is selected by either one of the player and the opponent (Step S77). If the "sign" is selected, the subroutine will advance to a sign mode wherein the image screen is switched to a predetermined screen image where a plurality of buttons representing various types of signs are displayed to prompt a selection of the signs (Step S79). If the "skip" is selected, or none of the buttons is selected even after an elapse of a predetermined time (NO in Step S77), a sequence processing will be performed under contents of pitching and batting set by the computer (action-setting section 305, batting result-setting section 307), and an image screen for the sequence processing will be displayed (Step S81). In the above case where the "skip" is selected, or none of the buttons is selected even after an elapse of the predetermined time, data indicative of no input operation is transmitted/received through an after-mentioned transmitting/receiving processing in FIG. 15.

It is not guaranteed that each of the player and the opponent selects the same item (button) to the image screen in FIG. 16. On the assumption that each of the player and the opponent selects a different one of the buttons, the following priority is pre-set. If either one of the player and the opponent selects the "pinch hitter/pinch runner" button, the subroutine will advance to the substitution mode even if the other selects one of the remaining buttons. If either one of the player and the opponent selects the "location designation" button, the subroutine will advance to the location designation mode even if the other selects either one of the "sign" and "skip" buttons. If either one of the player and the opponent selects the "sign" button, the subroutine will advance to the sign mode even if the other selects the "skip" button.

Figure 13:
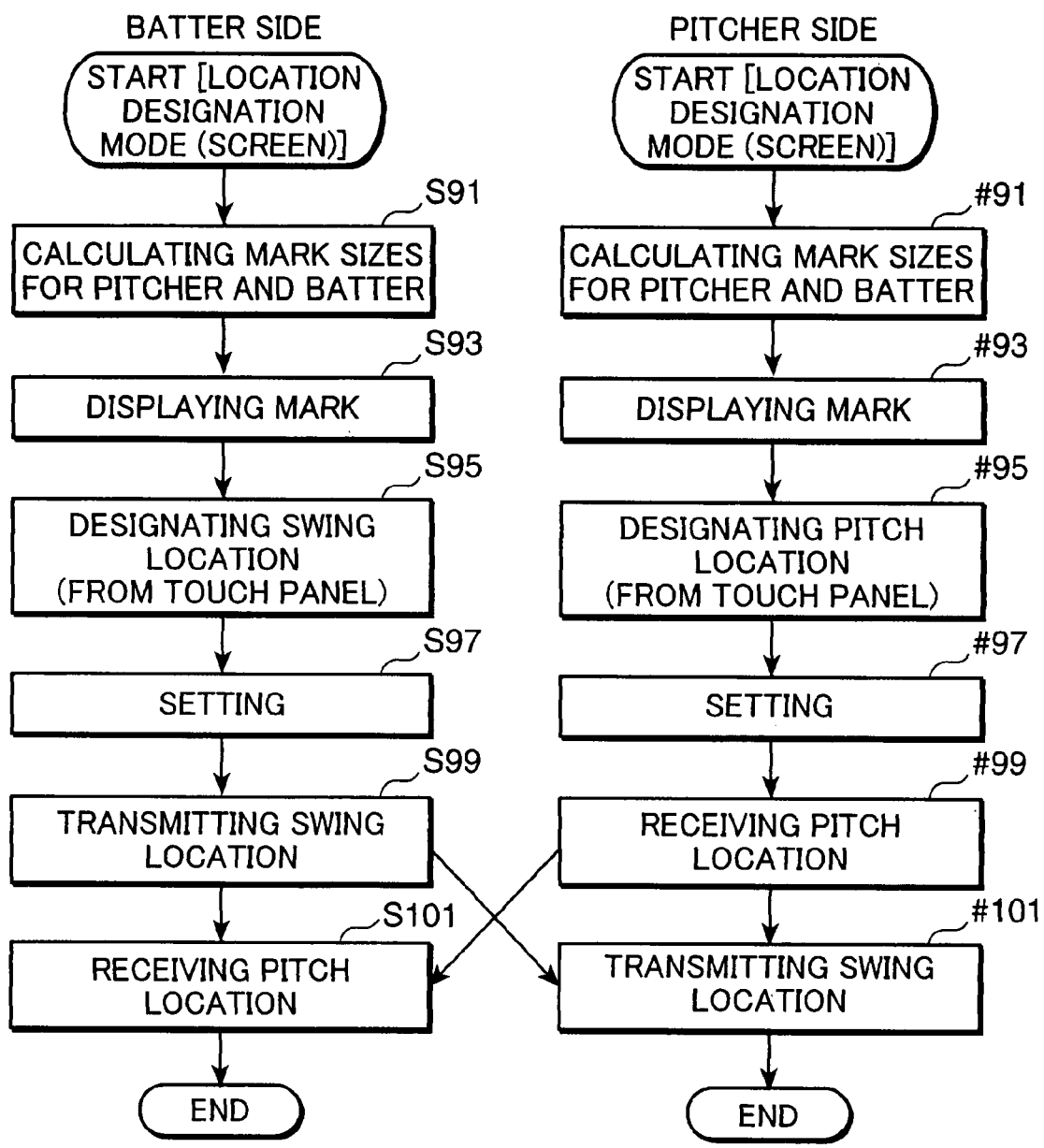
FIG. 13 is a flowchart showing a subroutine for a "location designation mode" in Step S75 illustrated in FIG. 12.

FIG. 13 shows a subroutine of the location designation mode selected in Step S75 illustrated in FIG. 12. The following description will be made on the assumption that the player plays the game on the offensive side, and the opponent plays the game on the defensive side. When the player plays the game on the defensive side (i.e., the opponent plays the game on the offensive side, the relationship between the batter and the pitcher may be simply reversed, and therefore description about this case will be omitted.

In response to shifting to the location designation mode, a size of the mark image MG1 for the batter character, i.e., the radius of the central circle region R11 and the width of the ring region R12, is set up, and a size of the mark image MG2 for the pitcher character (i.e., opponent's character), i.e., the radius of the central circle region R21 and the width of the ring region R22, is set up (Step S91). Then, only the player-side (i.e., batter-side) mark image MG1 is displayed in an appropriate position, e.g., in a central position, of the strike zone image SZ (Step S93). This allows the player to press a desired position of the strike zone image SZ through the touch panel 10 while visually checking the mark image MG1. When the player presses a desired position of the strike zone image SZ as a designated location, a processing of moving a center of the mark image MG1 to the pressed position is performed (Step S95). The operation of moving the mark image MG1 to the designated location may be achieved by a drag-and-drop operation for the mark image MG1. After determining the designated location, the player can press a set button illustrated in FIG. 18 to fix the designated location as a swing location (Step S97).

Subsequently, information of the determined swing location is transmitted to the opponent's game apparatus through the communication section 130 (Step S99), and receives information of a pitch location designated in the opponent's game apparatus (Step S101).

Then, the player's game apparatus calculates and sets up the central circle region R21 and the ring region R22 of the mark image MG2, based on data originally stored in the player's game apparatus and with reference to the pitcher parameters of the pitcher character (i.e., opponent's character) and a game state, and sends the pitch location information designated and received by/from the opponent's game apparatus, to the image display control section 302, so as to allow the mark image MG2 to be displayed together with the mark image MG1 on the monitor 3 of the player's game apparatus. A processing of displaying the mark image MG2 on the monitor is not performed in this flowchart, but, for example, in Step S123 illustrated in FIG. 14. As shown in FIGS. 17 and 18, an image representing the location-designation frequency of the opponent is also displayed in the strike zone image SZ. In the above manner, at least after the swing location is determined (fixed) in the player's game apparatus, the pitch location designated by the opponent is displayed through the information exchange. Thus, the player designates the swing location while predicting or sherlocking opponent's strategy or tactics based on only information of the opponent's location-designation frequency. This makes it possible to maintain excitement/enjoyment of the game at high level.

In the opponent's game apparatus which is operated by the opponent who plays the game on the pitcher side, a size of the mark image MG1 (defined from the side of the opponent' game apparatus) for the pitcher character, i.e., the radius of the central circle region R11 and the width of the ring region R12, is set up, and a size of the mark image MG2 for the batter character (i.e., the player's character which is the opponent's character as defined from the side of the opponent), i.e., the radius of the central circle region R21 and the width of the ring region R22, is set up (Step #91). Then, only the pitcher-side) mark image MG1 is displayed in an appropriate position, e.g., in a central position, of the strike zone image SZ (Step #93). This allows the opponent to press a desired position of the strike zone image SZ through the touch panel 10 while visually checking the mark image MG1. When the opponent presses a desired position of the strike zone image SZ as a designated location, a processing of moving a center of the mark image MG1 to the pressed position is performed (Step #95). After determining the designated location, the player can press a set button illustrated in FIG. 16 to fix the designated location as a pitch location (Step #97).

Subsequently, information of the determined pitch location is transmitted to the player's game apparatus through the communication section 130 (Step #99), and receives information of the swing location designated in the player's game apparatus (Step #101). That is, in the data exchange about the designated contents between the player and the opponent, respective timings of transmitting and receiving the data are adjusted to perform a receiving processing after completion of a transmitting processing, as will be described later. The transmitting/receiving processings at Steps S99 and S101 (Steps #99 and #101) may be performed in conjunction with Steps S117 and S119 (Steps #117 and #119). In this embodiment, if the "skip" in FIG. 12 is selected, or none of the buttons is selected even after an elapse of a predetermined time, data (data about a pitch location, data about a swing location) is created by each of the CPUs of the player's and opponent's game apparatuses. Then, upon completion of the data creation, the data is transmitted/received through the transmission/receiving processings in FIG. 14.

Then, the opponent's game apparatus sets up the central circle region R21 and the ring region R22 of the mark image MG2, with reference to the batter's parameters and a game state, and sends information of the swing location designated and received by/from the player's game apparatus, to the image display control section 302 of the opponent's game apparatus, so as to allow the mark image MG2 to be displayed together with the mark image MG1 on the monitor 3 of the player's game apparatus. After determining the pitch location, the swing location designated by the player is displayed through the information exchange. Thus, the opponent designates the pitch location while predicting or sherlocking player's strategy or tactics. This makes it possible to maintain excitement/enjoyment of the game at high level.

FIG. 14 is a flowchart showing a pitching/batting subroutine included in the sequence execution processing in Step S45 illustrated in FIG. 11. The following description is firstly described about a subroutine to be executed when the player plays the game on the batter side. A subroutine to be executed when the player plays the game on the pitcher side is fundamentally the same as that in FIG. 14, and therefore a description therefor will be made about only a different from the subroutine to be executed when the player plays the game on the batter side.

Firstly, data about a pitching/batting processing (work) executed in an adjacent sequence is initialized (Step S111). Then, a strategy setting/displaying processing and an input of selection, i.e., a processing of accepting a result of player's selection of the items, such as "sign", and other information, is performed (Step S113). Player's input information to be accepted through this processing includes data about a card-mounted position of the athlete card 9 on each of the mounting surfaces 20. If none of the items is selected, and the card-mounted position data of the athlete card 9 on each of the mounting surfaces 20 is not changed (which can be determined by comparison with card-mounted position data in an adjacent sequence), an operation result indicative of no operation, such as no selection, will be accepted. When the "skip" button (see FIG. 16) is pressed, the same signal is accepted.

When the player's input is accepted, batting data to be transmitted to the opponent's game apparatus is created (Step S115). Then, this batting data is transmitted to the opponent's game apparatus (Step S117), and pitching data transmitted from the opponent's game apparatus is received (Step S119). This transmitting/receiving processings may be configured to be performed at a timing after an appropriate time required for the player to set tactics has elapsed from initiation of the batting processing, so as to allow the player's and opponent's game apparatuses to transmit the data mutually in an approximately the same time zone.

Figure 15:
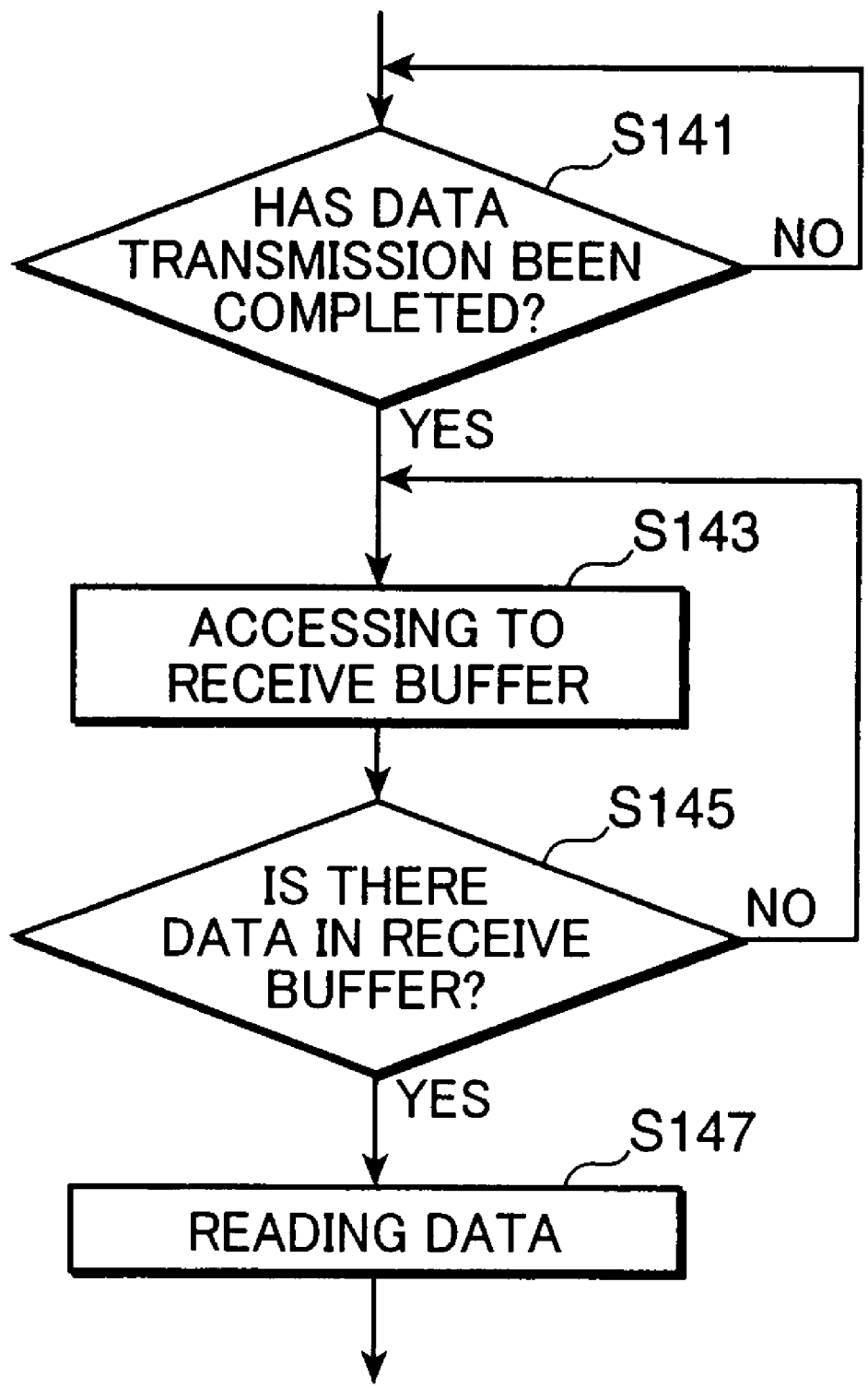
FIG. 15 is a detailed flowchart showing one example of data transmitting/receiving.

FIG. 15 is a detailed flowchart showing one example of the data transmitting/receiving processings. The communication processing section 306 in each of the game apparatuses is adapted to access a receive buffer through an interrupt processing so as to receive data, so that, just after creation of data, the created data can be transmitted to the other game apparatus. Specifically, when a processing of transmitting data from the player's game apparatus is completed (YES in Step S141), the communication processing section 306 accesses the receive buffer at time intervals, for example, of 1/60 seconds, to acquire received data (Step S143), so as to allow the received data to be read from the receive buffer into the game apparatus after data transmission (Steps S145 and S147). The access and data acquisition are performed as follows. As to data to be exchanged, a certain rule, such as a rule of attaching a predetermined code in a stream head of the data, is pre-set. Then, in each access, it is determined whether data having this code is percent or absent. If there is data with the code, the data in the receive buffer is read into the player's game apparatus as data from the opponent's game apparatus. Thus, the batting result-setting section 307 in each of the player's and opponent's game apparatuses can have both player's data and opponent's data in a processable manner constantly and simultaneously.

In the case where the location designation mode in FIG. 12 is selected, if no input operation is performed to the opponent's game apparatus, the opponent's game apparatus will transmit pitch or swing location data automatically created by the CPU thereof at a timing after an elapse of a predetermined input-acceptance time period. Thus, the player's game apparatus will repeat the determination "NO" at Steps S143 and S145, and finally read the data transmitted from the opponent's game apparatus and received by the receive buffer, to create tactical data and perform the hitting determination, as mentioned above. After data transmission, the opponent's apparatus is allowed (permitted) to access the receive buffer so as to acquire transmitted swing or pitch location data. If no input operation is made to the player's game apparatus, the same processing will be performed. If the "skip" in FIG. 12 is selected, or none of the buttons is selected even after an elapse of a predetermined input-acceptance time period, data (pitching data, batting data) is created by each of the CPUs of the player's and opponent's game apparatuses. Then, upon completion of the data creation, the data is transmitted/received through the transmission/receiving processings in FIG. 15. Further, for example, if no input operation is made to the player's and opponent's game apparatuses despite selection of the location designation mode, data (pitch location data, swing location data) is created by each of the CPUs of the player's and opponent's game apparatuses. Then, upon completion of the data creation, the data is transmitted/received through the transmission/receiving processings in FIG. 15, to create tactical data and perform the hitting determination, as mentioned above.

After the elapse of the predetermined input-acceptance time period, data is transmitted from each of the player's and opponent's game apparatuses, then each of the player's and opponent's game apparatuses may reads the data transmitted from the other game apparatus and received by the receive buffer.

As above, the data exchange processing is performed in both the cases where an input operation is made to each of the player's and opponent's game apparatuses, and where an input operation is not made to at least one of the game apparatuses. Thus, each of the player's and opponent's game apparatuses can have the same pitching and batting data. In addition, the sharing of the same data can prevent a time lag in image display between the game apparatuses from occurring so as to provide a game environment without a feeling of strangeness in the player/opponent and advantage/disadvantage in the player/opponent due to communication.

Then, the received pitching data is stored in a work area of the RAM 3002 (Step S121), and the batting result-setting section 307 performs the hitting determination based on the pitching data, the batting data and others (Step S123). In this hitting determination, a processing for a normal mode (including the case where only the "sign (directive)" item is selected" is performed.

In Step S125, a calculation for a trajectory of a pitched ball is performed using the pitching data. Then, a "batting point" which is a ball-passing position above a home base is obtained from the pitched-ball trajectory calculation, and set (stored) in the work area (Step S127). Subsequently, based on the result obtained from the pitched-ball trajectory calculation, a "pitching" image is displayed on the monitor 3 according to a pitching-movement/pitched ball processing (Step S129). Then, a swing timing, a batted-ball direction and a batted-ball speed as a result of the batting are calculated, and, based on these calculated data, a "batting" image is displayed on the monitor 3 of according to a batting-movement/batted ball processing (Step S131). Then, in response to the batting result, respective movements of a fielder character, a base runner and a ball character are sequentially calculated and displayed as images on the monitor 3 (Step S133).

When the player plays the game on the pitcher side, the processings from Steps #111 to #133 are executed in synchronization with the processings from Steps S111 to S133. In Step #117, pitching data is transmitted. In Step #119, batting data is received. In this manner, the game will be progressed while temporarily stopping the game processing during a period of the data transmitting/receiving (data exchange) between the player's and opponent's game apparatuses, and re-starting the game processing every time the data transmitting/receiving processing is completed.

With reference to FIGS. 22 to 28, a game apparatus according to a second embodiment of the present invention will be described below. In the second embodiment, a "calling athlete (tactic)" item is provided in addition to the "sign", "pinch hitter/pinch runner" and "location designation" or in place of the "pinch hitter/pinch runner" and "location designation", wherein the setup section 304 illustrated in FIG. 7 is operable to set up a tactical item, i.e., a type of tactic and the number of tactics, to be displayed on the monitor 3, and calculate a success probability of each of the tactical items. In the second embodiment, the following configuration is employed. In the second embodiment, the frequency setting section 308 is unnecessary.

As the tactical item, the ROM 3001 stores, for a pitcher-side player, "attack by fastballs", "throw inside/outside", "fend off by breaking balls" and "change ball (i/e., pitched-ball) speed", and stores, for a batter-side player, "hit fastballs", "find out pitch location", "aim at breaking balls" and "adjust to changes in ball speed", as tactics against the pitcher-side player. The tactical item is not limited to the above items, but any desired number of tactical items may be prepared. Each of the pairs of "attack by fastballs" for the pitcher-side player and "hit fastballs" for batter-side player; "throw inside/outside" for the pitcher-side player and "find out pitch location" for batter-side player; "fend off by breaking balls" and "aim at breaking balls" for the batter-side player; and "change ball speed" for the pitcher-side player and "adjust to changes in ball speed" for the batter-side player, are coincident tactical items (coincidence in strategy). Each of the tactical items is stored in associated relation with a success probability. For example, the "attack by fastballs" and "throw inside/outside" are associated with success probabilities of 90% and 80%, respectively. As to the pitch location, an area, e.g., a strike zone, above a virtual home base in the game space is divided into a plurality of sub-areas, for example, in a matrix pattern, and the pitch location are set correspondingly to a desired one of the sub-areas. As to pitched-ball speed, a predetermined value corresponding to each of after-mentioned pitcher parameters and a value for a change in pitched-ball speed are prepared. In the same manner, as to batting, a predetermined swing speed corresponding to each of after-mentioned fielder parameters and a swing location are prepared.

Figure 24:
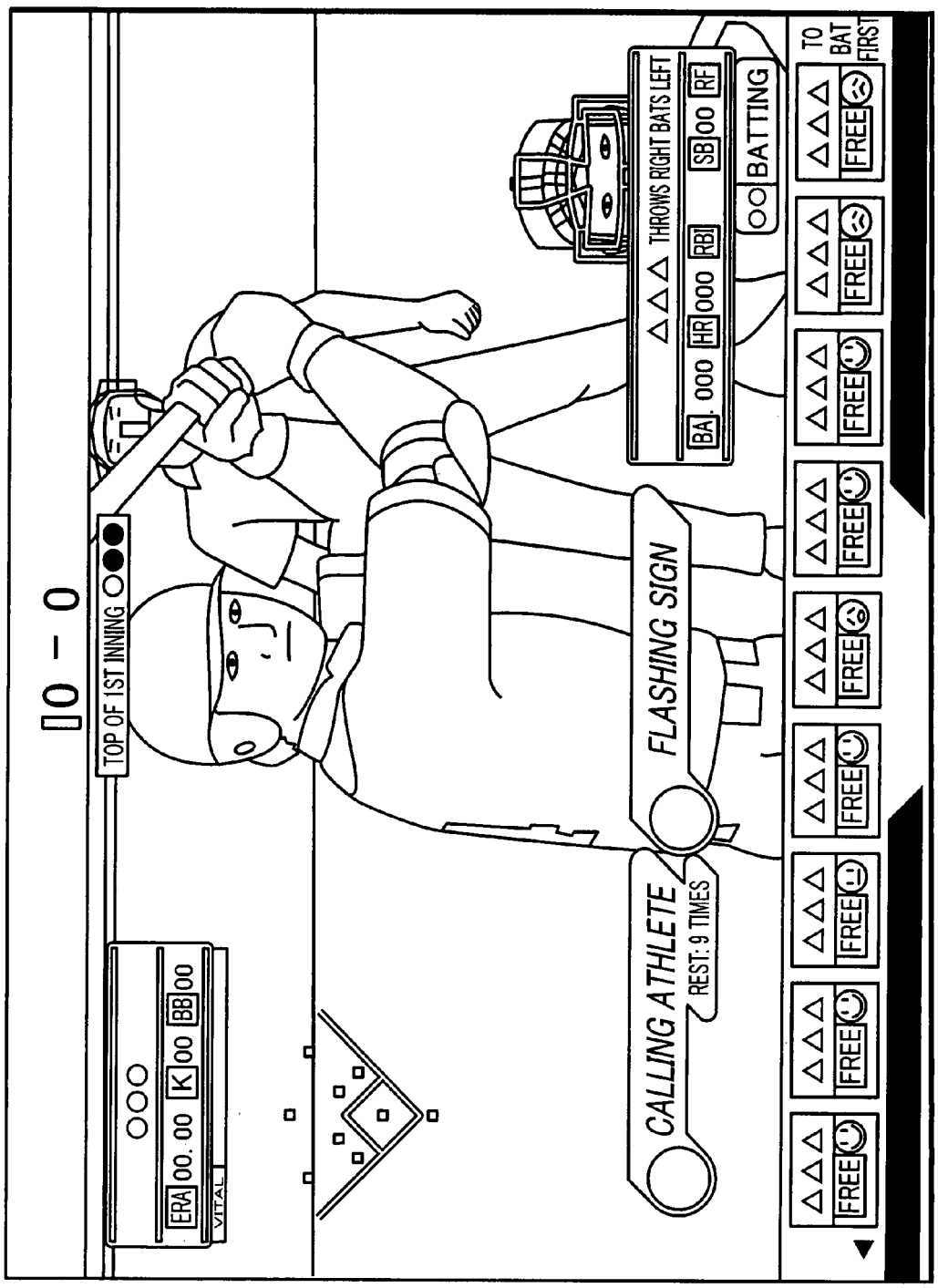
FIG. 24 illustrates a game image for guiding a selection of strategic items in the second embodiment.
Figure 25:
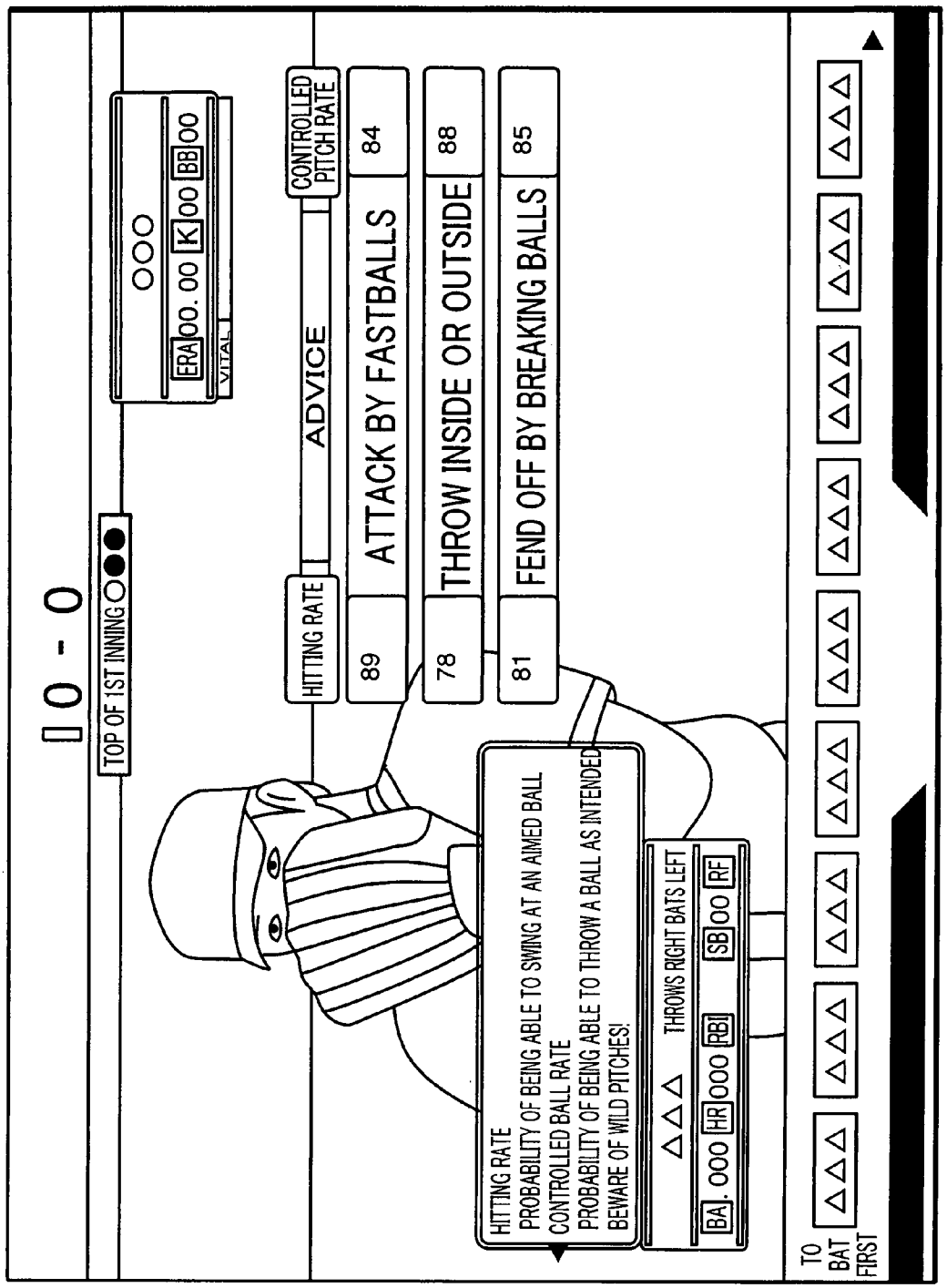
FIG. 25 illustrates a game image for guiding a selection of tactical items, in case where a player plays the game on a pitcher side in the second embodiment.
Figure 26:
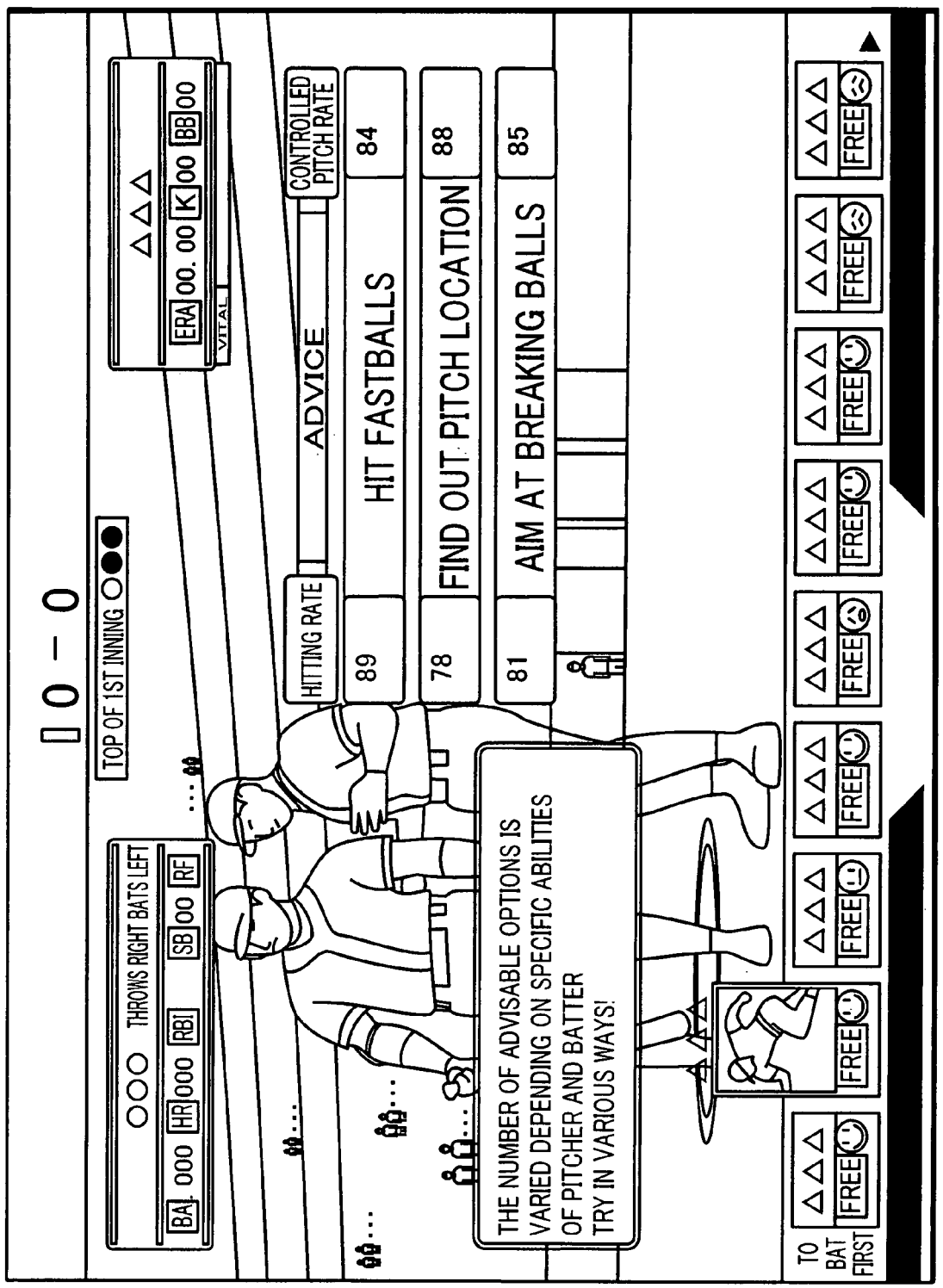
FIG. 26 illustrates a game image for guiding a selection of tactical items, in case where the player plays the game on a batter side.

The image display control section 302 is operable, in response to pressing of a "calling athlete" button on an image screen illustrated in FIG. 24, to display a strategy designation image screen illustrated in FIG. 25 when the player's character is a pitcher character, or switchingly display a strategy designation image screen illustrated in FIG. 26 when the player's character is a batter character. In FIG. 25, three buttons "attack by fastballs", "throw inside/outside" and "fend off by breaking balls" are displayed as the tactical items. In FIG. 26, three buttons "hit fastballs", "find out pitch location" and "aim at breaking balls" are displayed as the tactical items.

An instruction for displaying the tactical items in FIG. 26 is issued on a condition that one of the tactical items in FIG. 25 is selected by a player, and a signal indicative of the selection is transmitted to display the tactical items in FIG. 26. This process is also applied to a relationship between two image screens illustrated in FIGS. 27 and 28 which are displayed when a "flashing sign" button in FIG. 24 is pressed.

As shown in FIGS. 25 and 26, a success probability is displayed in association with each of the tactical items. More specifically, in FIG. 25 which shows the image screen to be displayed when the player's character is a pitcher character, a success probability corresponding to each of the pitcher-side tactical items is displayed on a right side of each of the pitcher-side tactical items, and a success probability corresponding to each of the batter-side tactical items coincident with the pitcher-side tactical items is displayed on a left side of each of the pitcher-side tactical items. For example, as to the "attack by fastballs", "84%" is displayed as a value of controlled pitch rate which is set as the pitcher-side success probability, and "89%" is displayed as a value of hitting (i.e., solid contact) rate which is set as the batter-side success probability. In FIG. 26 which shows the image screen to be displayed when the player's character is a batter character, a success probability corresponding to each of the batter-side tactical items is displayed on a left side of each of the batter-side tactical items, and a success probability corresponding to each of the pitcher-side tactical items coincident with the batter-side tactical items is displayed on a right side of each of the batter-side tactical items. Thus, considering the respective probabilities, the player can set a strategy, i.e., can select one of the tactical items.

Figure 27:
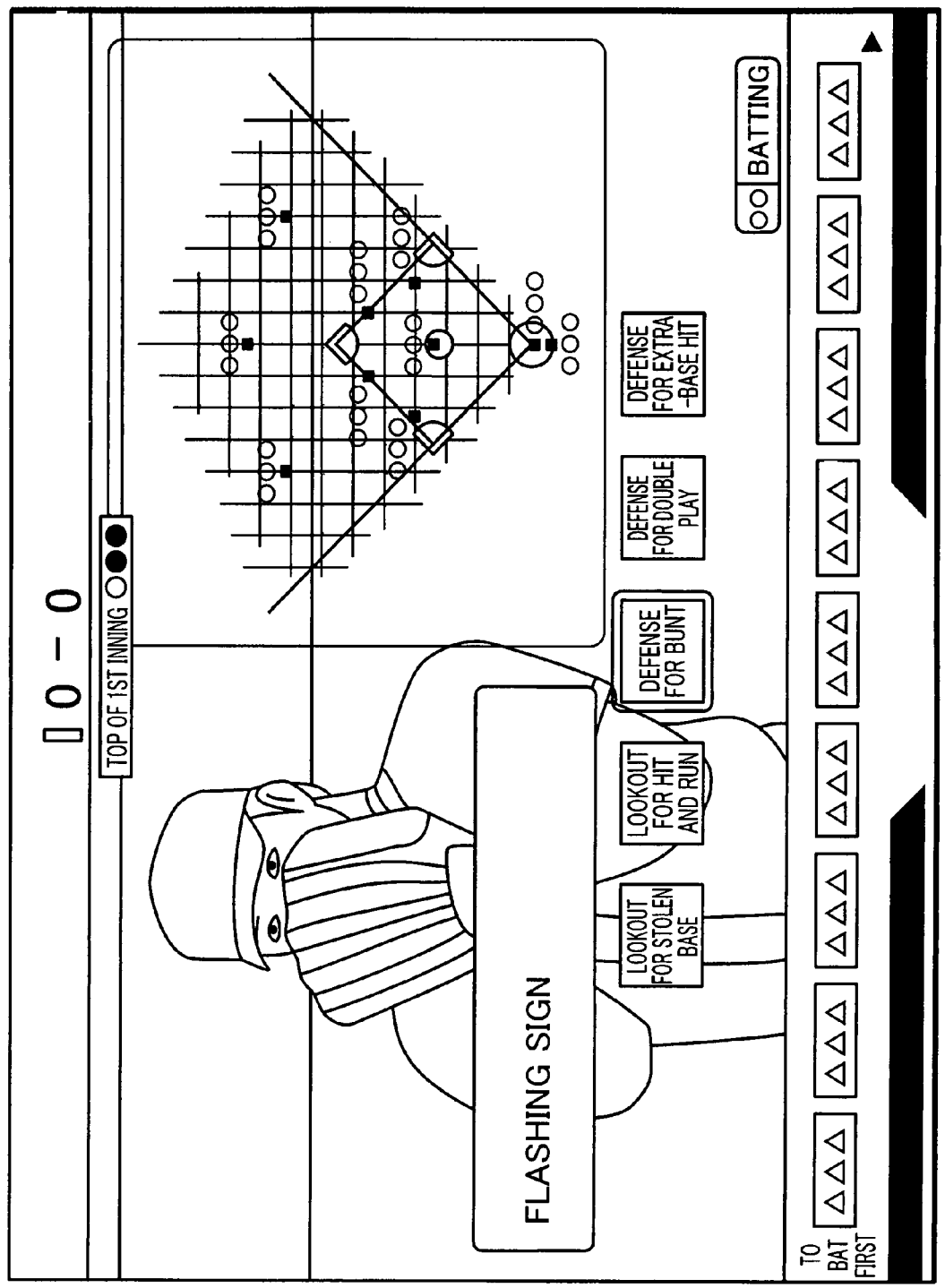
FIG. 27 illustrates a game image for guiding a selection of directive items, in case where the player plays the game on a pitcher side.
Figure 28:
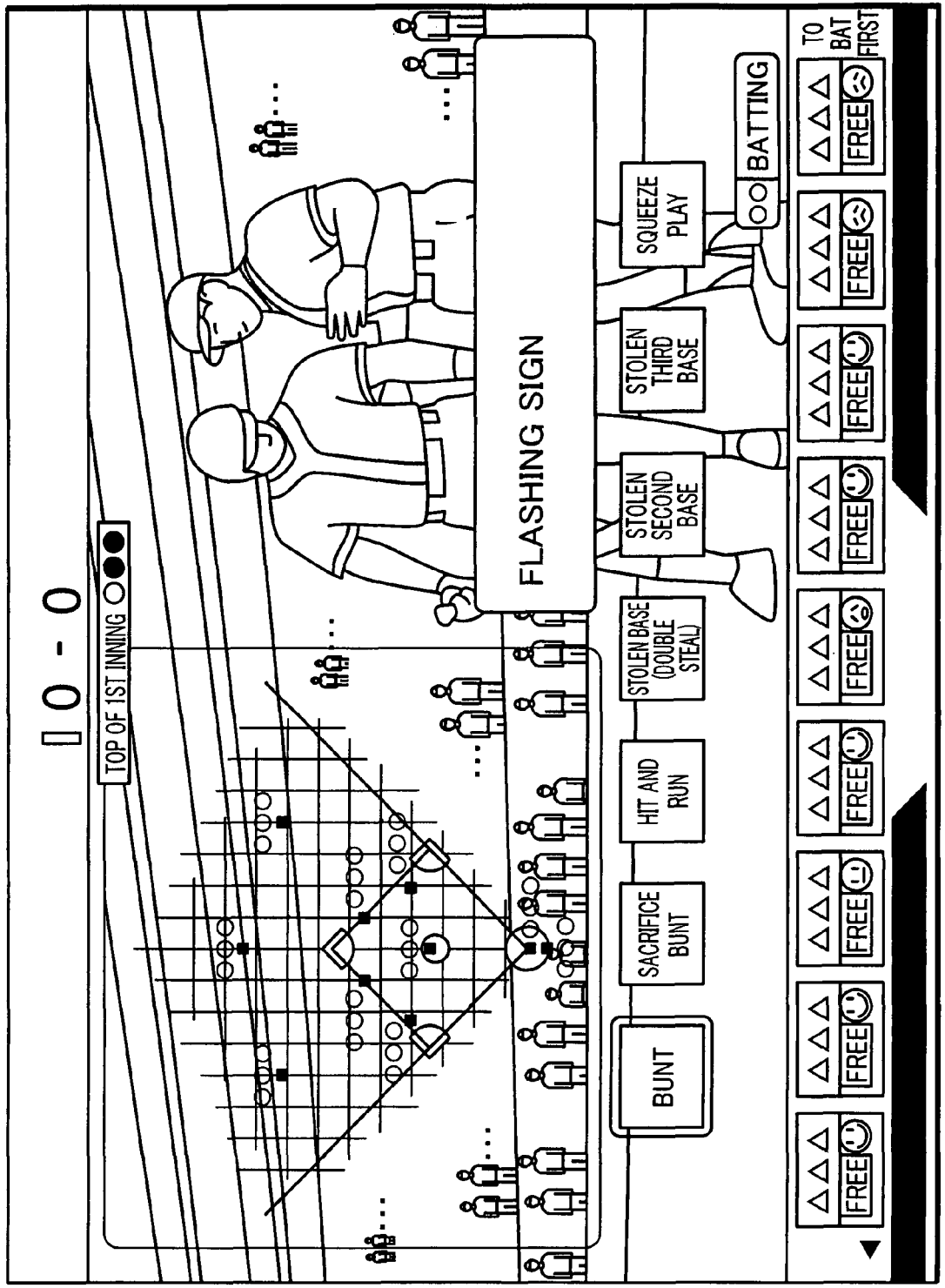
FIG. 28 illustrates a game image for guiding a selection of directive items, in case where the player plays the game on the batter side.

The image display control section 302 is also operable, in response to pressing of the "flashing sign" in FIG. 24, to display a directive designation image screen illustrated in FIG. 27 when the player's character is on the defensive (i.e., fielding) side, or display a directive designation image screen illustrated in FIG. 28 when the player's character is on the offensive (i.e., batting) side. In FIG. 27, five buttons "lookout for stolen base", "lookout for hit and run", "defense for bunt", "defense for double play" and "defense for extra-base hit" are displayed as the defensive-side directive items. In FIG. 28, seven buttons "bunt", "sacrifice bunt", "hit and run", "stolen base (double steal)", "stolen second base", "stolen third base" and "squeeze play" are displayed as the offensive-side directive items. In the second embodiment, the game progression control section 301 is configured to accept only either one of the tactical item and the directive item, while it may be configured to allow a player to select both ones of the tactical item and the directive item.

The setup section 304 is configured to be activated when the "calling athlete" button is pressed, and operable to set the tactical items which as selectable by a player through the touch panel 10 on the monitor 3, as shown in FIGS. 25 and 26. Specifically, a type of tactical item and the number of tactical items to be displayed on the monitor 3 are set based on a specific one or more of the pitcher parameters and the fielder parameters corresponding to respective ones of a pitcher character and a batter character, as follows. For example, a plurality of items, such as "hit fastballs", "find out pitch location" and "aim at breaking balls", are prepared in advance, and the type of tactical item and the number of tactical items are selected therefrom based on a calculation result obtained from contents of respective pitcher and batter parameters of a pitcher and batter who duel with each other, in accordance with a predetermined rule.

The setup section 304 is operable, when the batter has a relatively high ability and the pitcher has a relatively low ability, in terms of a level of the parameters, to reduce the number of tactical items so as to become favorable to the batter. Conversely, when the batter has a relatively low ability and the pitcher has a relatively high ability, the tactical-item setting section 304 is operable to increase the number of tactical items so as to become favorable to the pitcher. For example, the following pitcher (specific ability) parameters for a pitcher: "correction against left-handed batter", "toughness in pinch", "coping with base runner", "emergency pitching start", "level of initial pitching", "getting a boost in last innings", "coping with close game" and "sense of responsibility", and the following fielder (specific ability) parameters for a batter: "hittability correction against left-handed pitcher", "correction in chance", "winning hitter", "coping with adversity", "grand-slam hitter", "pinch hitter", "strikeout leader", "multi-hit", "hitting streak", "cleanup batter", "leadoff home run hitter in first inning", "back-to-back home run hitter" and "table-setter", are used as a factor for determining a type of tactical item and the number of tactical items. It is understood that any other suitable parameter may be employed in place of or in addition to the above factors (parameters).

The action-setting section 305 is provided as a means to create information necessary for determining a strategy result, i.e., data to be transmitted to the opponent's game apparatus, based on a part of input operation information from the manual operation section 10A, and the athletic parameters. As shown in FIG. 24, the image display control section 302 is operable to display a guide image for prompting a player to select a strategy, (in this embodiment, the plurality of buttons including the texts "calling athlete" and "flashing sign") in a game image. The action-setting section 305 is operable, when one of the buttons is pressed by a player, to switch this image screen to the image screen for inputting the tactical items for a duel, through the touch panel 10.

In the second embodiment, in order to virtually set in what mode an action of each of the athletic characters is performed, card-mounted position information from the image pickup section 11 which is a part of information input from the manual operation section 10A, is reflected on an operation of setting an attribute defining the action mode in a plurality of preset levels, at one of the levels.

The level of the attribute represents a level (pitching power) of a pitcher when he throws a ball at full power or while saving its power, or a level (swing power) of a batter when he swings a bat. Specifically, as to the attribute level for a pitcher, when an athlete card 9 is mounted on a front side relative to the central position of the mounting surface, the pitching power will be set closer to the full power to increase a pitched-ball speed and lower a hits-allowed rate while increasing a stamina consumption. When the athlete card 9 is mounted on a rear side relative to the central position of the mounting surface, the pitching power will be saved (the pitched-ball speed is lowered) to increase the hits-allowed rate while reducing the stamina consumption. The parameter of stamina consumption is pre-managed, and configured to be increased in a virtual situation when the pitcher is on the offensive side and in a dugout or bench. Further, the parameter of stamina consumption for a pitcher is configured to be reduced depending on the level of pitching power by a predetermined value.

As to the attribute level for a batter, when an athlete card 9 is mounted on a front side relative to the central position of the mounting surface, the swing power will be increased to more hardly swing a bat, and lower a hitting rate. When the athlete card 9 is mounted on a rear side relative to the central position of the mounting surface, the swing power will be more saved to suppress a hard swing and increase a value of the hitting rate. The increase/decrease in swing power of a batter is reflected on respective level of distance and speed of a batted ball, i.e., a height in trajectory (i.e., a value of ascending vertical angle) of the batted ball, and a hit rate.

The action-setting section 305 is also operable to perform a directive determination processing in the image screen in FIG. 27 switched in response to selection of the "flashing sign (directive)" button in FIG. 24 by a player on the defensive side, and in the image screen in FIG. 28 switched in response to selection of the "flashing sign" in FIG. 24 by a player on the offensive side. Specifically, when a player on the defensive side selects any one of the buttons illustrated in FIG. 27, or a player on the offensive side selects any one of the buttons illustrated in FIG. 28, the action-setting section 305 is operable to accept a content of the selection from the acceptance section 303 and fix the content of the selection as a directive selection result. Then, the unit-sequence execution section 310 is operable to reflect the directive selection result on a processing of changing a defensive position of a fielder and a processing of controlling base-running of a base runner, in such a manner as to simulate an actual baseball (i.e., according to a control program based on the baseball rules).

In the second embodiment, the action-setting section 305 is adapted to create the following transmitting data: "ball release timing", "pitch type", "selected tactical item", "selected directive item", "pitch-ball control" and "attribute level (full power to saved power)" for pitching data; and "swing timing", "selected tactical item", "selected directive item", "batted-ball direction" and "attribute level (hard swing to controlled swing) for batting data. In the pitching data, the "ball release timing", i.e., a time lag relative to the "ball release" (optimum ball release timing) in the pitcher parameters, is set based on the random number generation section 315 or a random processing. The "pitch type" is set from various breaking balls in the pitcher parameters, in consideration of the directive information and the attribute level. The "pitch location" is set based on both the pitcher and batter parameters. In the batting data, the "swing timing", i.e., a time lag relative to the "swing timing" (optimum swing timing) in the fielder parameters, is set based on the random number generation section 315 or a random processing.

The communication processing section 306 is provided as a means to allow given information including the strategy information created by the action-setting section 305 based on the content of the selection from the manual operation section 10A, to be bidirectionally transmitted from one of the game apparatuses to the other game apparatus. The communication processing section 306 has a buffer at respective transmitting and receiving interfaces to transmit and receive data through the transmit buffer and receiving buffer, or at least a receiving interface to receive data through the receiving buffer. Thus, the player's and opponent's game apparatuses can receive data from the other side to have the same information therebetween.

Based on one selected from the tactical items in FIG. 25 or 26 by a player, a success probability of the selected tactical item, card-mounted position information of each athlete card 9 on the mounting surfaces 20 and parameter information of the athlete card in the ROM 3001, obtained from the image pickup section 11 (through the acceptance section 303), and data received from the opponent's game apparatus through the communication section 306, the batting result-setting section 307 is operable to determine a duel result while taking account of an attribute level as a mode of the selected tactical item. The batting result-setting section 307 is also operable to subject a success probability of the tactical item selected by each of the pitcher-side and batter-side players, to a probability processing based on a pseudo-random number generated by the random number generation section 315 as will be described in detail later, so as to determined whether a result of the duel is hit or out (struck out swinging, i.e., whiff). Specifically, if respective tactical items selected by the pitcher-side and batter-side players are coincident with each other, the determination on hit/out is performed using data of one of the sides which becomes favorable as a result of the coincidence in strategy, i.e., the batter-side. If the selected tactical items ate not coincident with each other, the determination on hit/out is performed using data of one of the sides which becomes favorable as a result of the non-coincidence in strategy, i.e., the pitcher-side. In this process, the stamina consumption is also reflected of the determination. Alternatively, the game apparatus may be configured such that, when a judgment section (not shown) determines that a stamina consumption of an athlete becomes equal to or less than a predetermined threshold, an instruction for change of the athlete is issued.

The batting result-setting section 307 is also operable, when neither the tactical item nor the directive item is selected, to perform the hit/out determination through an after-mentioned hitting processing (FIG. 23) based on pitcher (pitching) data or batter (batting) data transmitted to the other game apparatus without any selected tactical item or directive item. If there is no change in input data, strategy data is automatically created using the pitcher data, the batter data and the pseudo-random number from the random number generation section 315, in the same manner as that in the first embodiment.

The random number generation section 315 is operable to generate a pseudo-random number in accordance with a pre-determined rule so as to allow the success probability of the tactical item is subjected to the probability processing using the generated pseudo-random number, as described above. For example, when a batter becomes favorable as a result of coincidence between the batter-side and pitcher-side tactical items, and the success probability of the coincident tactical items is 90%, a counter countable from 1 to 100 is activated, and the match result is determined as success (hit) if a value of the counter when it is stopped at a time determined in accordance with a predetermined rule is in the range of 1 to 90. Further, if the value of the stopped counter is in the range of 91 to 100, the match result is determined as failure (whiff). That is, the success probability of greater than 50%, e.g., 90%, does not directly lead to success. This can add a sense of expectancy and unpredictability to provide enhanced entertainment/amusement of game. The game progression processing section 301 is operable to initialize the random number generation section 315, before start of a next game, or at start of a game, or at initiation of each sequence. In a competition game between the two game apparatuses, the game apparatuses exchange their data therebetween through the communication processing section 306 to perform the probability processing under the same condition, i.e., using the same data, so that each the random number generation section 315 in the two game apparatuses can constantly generate pseudo-random numbers coincidentally to thereby provide a coincident duel result therebetween. Further, when the unit-sequence execution section 310 performs a probability processing using a pseudo-random number as will be described in detail later, a content of the processing can also be constantly coincident between the two game apparatuses without exchanging processing data through the communication processing section 310. This makes it possible to display the same game image on the respective monitors 3 of the two game apparatuses, along with progress of the game.

The ROM 3001 in the game apparatus pre-stores an athlete character image in a number enough to form one computer-controlled baseball team and respective parameters of athlete characters (pitcher parameters and fielder parameters). The opponent-side strategy setting section 314 serves as a means to achieve a duel between the CUP and a player using a single of the game apparatus, and plays a roll of performing a processing of selecting the tactical item and the directive item, a processing of determining the attribute level and a duel result, and a processing of executing each sequence. Fundamentally, this opponent-side strategy setting section 314 is operable to activate the setup section 304, the action-setting section 305, the communication processing section 306, the batting result-setting section 307, the game state determination section 309, the unit-sequence execution section 310 and the random number generation section 315, in the single game apparatus, in substantially the same manner as that in a situation where an opponent (or an opponent's game apparatus) exists, and perform an processing of display an image on a single monitor.

Figure 22:
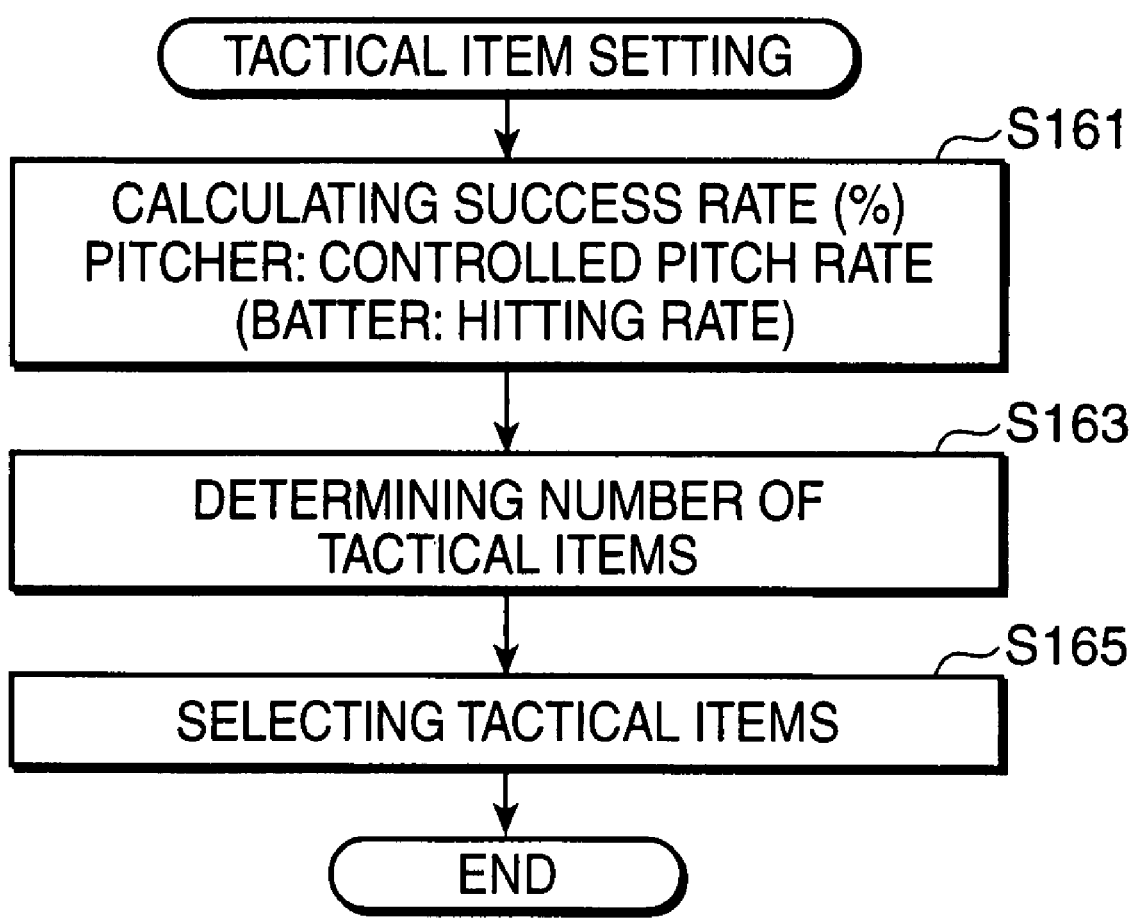
FIG. 22 is a flowchart showing a tactical-item setting subroutine included in a strategy setting/display processing in a second embodiment of the present invention.

FIG. 22 is a flowchart showing a tactical-item setting subroutine included in the strategy setting/display processing, which corresponds to Step S113 (#113) in FIG. 14. In response to selection of the "calling athlete" in FIG. 24 after start of a sequence, this subroutine is initiated to transmit information about this selection to an opponent's game apparatus and correspondingly display the tactical items. Specifically, for each of a pitcher character and a batter character, a plurality of tactical items are created, and a success probability (success rate) of each of the tactical items is calculated, based on the aforementioned predetermined pitcher parameters when the player plays the game on the pitcher side, or the aforementioned predetermined batter parameters when the player plays the game on the batter side (Step S161). These tactical items and the corresponding success probabilities (success rates) for each of the batter data and the pitcher data are calculated in each of the player's and opponent's game apparatuses. Based on this result, the number of tactical items and types of tactical items are set according to a predetermined rule to display the setup tactical items on the monitor 3 (Step S163; see FIGS. 25 and 26), and the subroutine is kept in a standby state for waiting an input by the player. Then, information about which button the player presses to select one of the plurality of tactical items is received as information about a selected tactical item (Step S165), and the subroutine is terminated. For example, if none of the buttons in at least one of the player's and opponent's game apparatuses is pressed within a waiting time, a processing of arbitrarily or randomly selecting one of the tactical items will be performed by the control section 300. In this case, the transmitting/receiving processings in Steps S117 and S119 illustrated in FIG. 14 are performed in the same manner as described above.

After the received batting data is stored in a work area of the RAM 3002, the batting result-setting section 307 performs a hitting determination processing (Steps S123 and #123 in FIG. 14) based on the pitching data, the batting data and others. In response to receiving information about the presence or absence of selection of a tactical mode, the hitting determination processing is performed in a separated manner between the tactical mode with selection of the tactical item, and a normal mode without selection of the tactical item (the normal mode includes a mode with selection of only the directive item), as follows.

Figure 23:
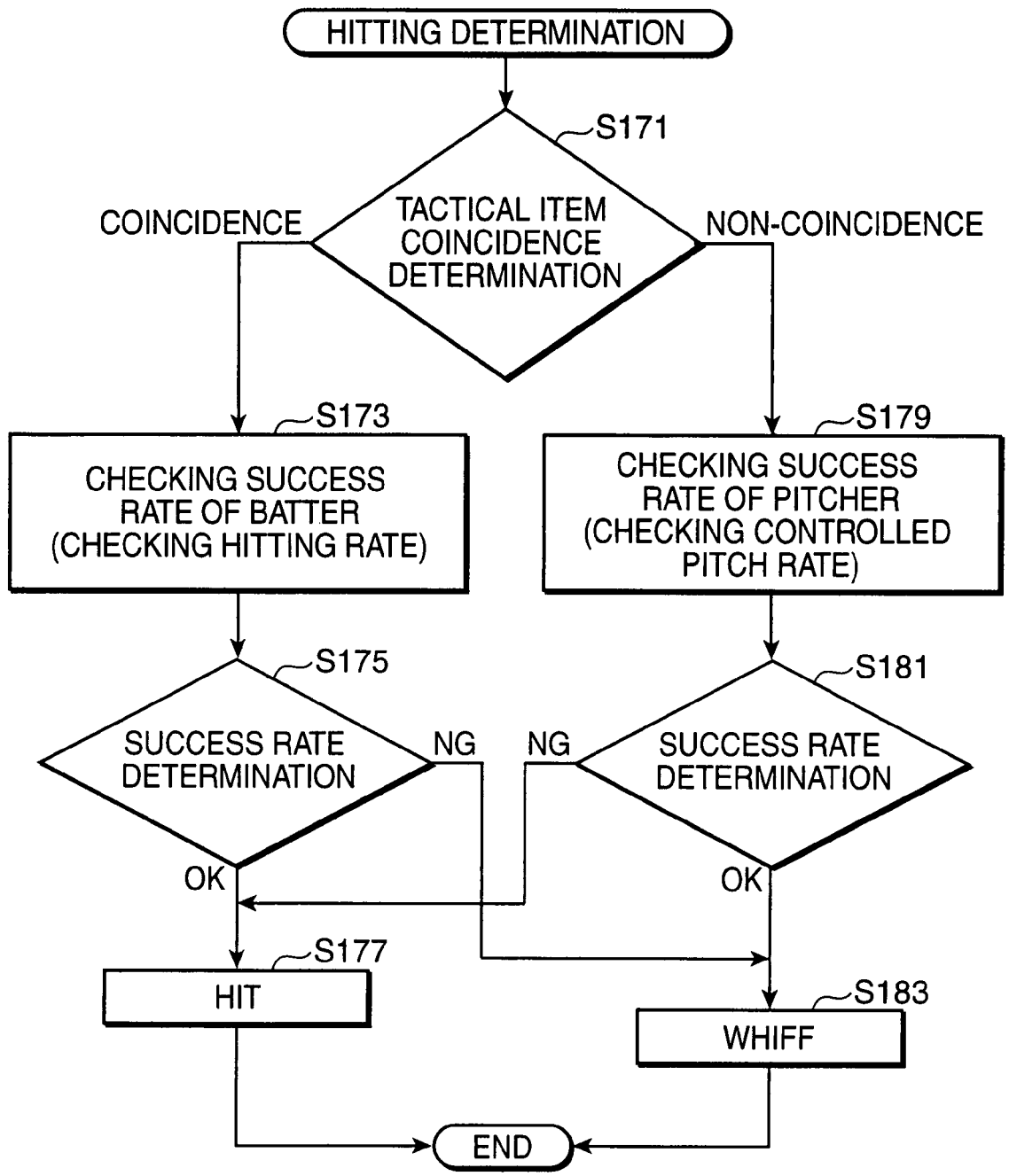
FIG. 23 is a flowchart showing a hitting determination processing in the second embodiment.

FIG. 23 is a flowchart showing the hitting determination processing. In FIG. 23, in the tactical mode, it is firstly determined whether the selected tactical items are coincident with each other (Step S171). If the selected tactical items are coincident with each other, the subroutine advances to Step S173. If the selected tactical items are not coincident with each other, the subroutine advances to Step S179.

In Step S173, a batter-side success probability (success rate, i.e., hitting rate) for the selected tactical item is checked, and the success probability is subjected to a probability processing using a pseudo-random number from the random number generation section 315, to determine whether the hitting succeeds or fails, i.e., perform a success rate determination (Step S175). If it is determined that the hitting succeeds, the determination is defined as "solid contact", i.e., "hit" (Step S177). Conversely, if it is determined that the hitting fails, the determination is defined as "whiff" (Step S183). In Step S179, a pitcher-side success probability (success rate) for the selected tactical item is checked, and the success probability is subjected to a probability processing using a pseudo-random number from the random number generation section 315, to determine whether the pitching succeeds or fails, i.e., perform a success rate determination (Step S181). If it is determined that the pitching succeeds, the determination is defined as "whiff" (Step S183). Conversely, if it is determined that the pitching fails, the determination is defined as "solid contact", i.e., "hit" (Step S177).

In the hitting determination for the normal mode, pitcher-side and batter-side success rates are calculated, respectively, from pitcher data and batter data exchanged between the game apparatuses, and the success rate in one of the player and opponent superior in success rate is subjected to a probability processing using a pseudo-random number from the random number generation section 315, to determine whether a result of hitting/pitching is hit or out.

In the present invention, the following modifications may be employed.

(1) While the game apparatus in the above embodiments is designed to change a mode of the game through means of the athlete cards 9 and based on a change in the card-mounted position, the present invention is not limited to this manner. For example, the athlete characters may be given team members which are pre-stored in the game apparatus, or may be team members which are designated from a large number of athlete characters stored in the game apparatus, or may be team members which are pre-stored in the game apparatus or designated from a large number of athlete characters stored in the game apparatus, and trained by a player through a training game or the like.

(2) Instead of the touch panel 10, the manual operation section may comprise a pointing device, such as a mouse or a joystick.

(3) While the competition game in the above embodiments is a simplified type where one sequence is processed with respect to each ball thrown by a pitcher, it may be configured in conformity to the baseball rules.

(4) In a player vs. CPU competition where one player competes against a built-in computer using a single game apparatus, the opponent-side strategy setting section 314 performs a control and image display as if the player competes against another player, i.e., an opponent. In this case, for example, in the hitting determination processings in Step S123 and Step #123, there is no information about the card-mounted position of the athlete card 9, and the computer can fully recognize operational information of the player. Considering these situations, a determination processing unique to the player vs. CPU competition is included. Thus, when the processings in Step S123 and Step #123 is initiated, the processings may be separated from each other depending on whether the competition is the normal competition using two game apparatuses or the player vs. CPU competition, so as to be executed in unique algorithms, respectively. After the separate processings, the routine may advance to the next step.

(5) The shape of the mark image is not limited to a circular shape, but may be a polygonal shape, such as a quadrangular shape. In this case, ability data may be reflected on each apex. Further, the shape may be an oval shape in place of a circular shape.

(6) In the above embodiments, the batting result is set as the batted-ball trajectory (speed and strength of a batted ball), and the determination on hit/out (except whiff) relies upon the subsequent calculation. Alternatively, the game apparatus may be configured to obtain a batting result including the determination on hit/out.

(7) While the game in the above embodiments has been described based on a roll-playing game between a pitcher (defensive) side and a batter (offensive) side, configured to simulate baseball, the game in the present invention is not limited to a baseball game, but the present invention may be applied to any other suitable competition game where a player's character and an opponent's character play rolls of defensive and offensive sides through a game media, such as a competition game configured to simulate penalty shootout in a soccer game between a shoot-side (offensive-side) and a keeper-side (defensive-side), a competition game configured to simulate a fight game between a punching-side (offensive-side) and a dodging-side (defensive-side), or a competition game configured to simulate a shooting game between a shooting (e.g., gun shooting)-side (offensive-side) and a dodging-side (defensive-side).

(8) Instead of the scheme where the player's tactical data created base on an input operation result is transmitted to the opponent's game apparatus, a scheme where respective input operation results in player's and opponent's game apparatuses are exchanged to create tactical data in each of the game apparatuses based on the received data.

As mentioned above, the present invention provides a competition game system which comprises at least two game apparatuses each including a manual operation section for allowing a player to perform an input operation, and a display unit for displaying an image, wherein tactical data created based on respective results of the input operations to the manual operation sections are transmitted and received between respective ones of the game apparatuses to allow a competition game having an identical event to be progressed in each of the game apparatuses based on the transmitted and received tactical data. In this competition game system, each of the game apparatuses includes action-setting means adapted, based on a result of an input operation to the manual operation section by a player, to create player-side tactical data, transmitting/receiving control means adapted to transmit the player-side tactical data created by the action-setting means, to the at least one opponent's game apparatus, and receive opponent-side tactical data from the opponent's game apparatus, through the communication section, determination means adapted to determine a competition result, based on the player-side tactical data, and the opponent-side tactical data received by the transmitting/receiving control means, and image display control means adapted to display a game image onto the display unit according to the competition result determined by the determination means.

In the competition game system of the present invention, player-side and opponent-side tactical data created based on respective results of input operations to the manual operation sections are transmitted and received (exchanged) between the at least two game apparatuses through the communication section. Then, the competition game having an identical event will be played in each of the game apparatuses according to the transmitted and received tactical data. In each of the game apparatuses, player-side tactical data corresponding to a result of an input operation to the manual operation section by a player is created by the action-setting means, and transmitted to the at least one opponent's game apparatus by the transmitting/receiving control means through the communication section, and opponent-side tactical data for a competition is received from the opponent's game apparatus through the communication section. Then, a competition result is determined by the determination means, based on the player-side tactical data and the opponent-side tactical data received by the transmitting/receiving control means, and a game image is displayed on the display unit by the image display control means, according to the competition result determined by the determination means. In the competition game system, only tactical data created in the player's game apparatus is transmitted to the opponent's game apparatus in an exchanging manner between the game apparatuses, and the determination means in each of the game apparatuses performs a common processing using the acquired input-operation data from the opponent's game apparatus. Thus, the same competition result will be created and a game image having an identical event will be displayed on the display unit in each of the game apparatuses. This makes it possible to eliminate the need for the conventional processing based on a master-slave relationship, so as to reduce burdens of configuration and processing.

Preferably, the action-setting means is operable to create the player-side tactical data in conformity to a content of the input operation to the manual operation section. According to this feature, the player-side tactical data is created in conformity to a content of the input operation which is performed to the manual operation section by the player.

Preferably, the action-setting means includes operation judgment means adapted to judge whether there is an input operation to the manual operation section, wherein the action-setting means is operable, when it is judged that there is no input operation, to create the player-side tactical data in accordance with a predetermined tactic creation rule. According to this feature, when the operation judgment means determines that no player's input operation is made to the manual operation section, the action-setting means creates player-side tactical data according to the predetermined tactic creation rule. Thus, even if no input operation is made, the game can be developed.

Preferably, the communication section includes a buffer adapted to temporarily store at least received data, and the transmitting/receiving control means is operable, after transmitting the player-side tactical data to the opponent's game apparatus, to access the buffer so as to obtain received data therefrom. According to this feature, after transmitting player-side tactical data to the opponent's game apparatus, the transmitting/receiving control means access the buffer to check whether data is loaded in the receive buffer. Then, if there is data in the receive buffer, a processing of acquiring (reading) the data will be performed. Thus, each of the game apparatuses can acquire player-side tactical data and opponent-side tactical data constantly and concurrently (synchronously). This allows the game in the game apparatuses to be synchronously progressed.

Preferably, the manual operation section is adapted to allow a plurality of tactics determining a content of the game progressing, to be manually operated in a selectable manner. According to this feature, a player can select a desired one of the plurality of tactics through the manual operation section. This makes it possible to provide variations in game progressing through the selection of various tactics.

Preferably, the determination means includes first storage means adapted to store various types of player's tactics and respective success probabilities of the player's tactics, in associated relation, and second storage means adapted to store various types of opponent's tactics and respective success probabilities of the opponent's tactics, in associated relation, wherein the determination means is operable, based on a success probability of each of selected one or more of the player's tactics, and a success probability of each of selected one or more of the opponent's tactics which are received from the opponent's game apparatus by the transmitting/receiving control means, to determine the competition result in accordance with a predetermined result determination rule which is sheared by all of the game apparatuses. According to this feature, based on a success probability of each of selected one or more of the player's tactics, and a success probability of each of selected one or more of the opponent's tactics which are received from the opponent's game apparatus by the transmitting/receiving control means, the determination means determines the competition result in accordance with a predetermined result determination rule which is sheared by all of the game apparatuses. This makes it possible to create an identical competition result in the respective game apparatuses.

Preferably, the competition game system includes random number generation means which is shared by all of the game apparatuses, and operable to generate a pseudo-random number for use as the predetermined result determination rule, wherein the random number generation means is adapted to be initialized before start of the game. According to this feature, the random number generation means is initialized before start of the game. Thus, during the determination processing, the success probability-based result determination rule provided in the determination means generates an identical pseudo-random number in the respective game apparatuses to allow an identical competition result to be created in the respective game apparatuses. The term "before start of the game" may include a start time of the game, and logically include a timing just before the determination processing.

Preferably, the competition result to be determined by the determination means is a result of execution of one sequence, and the game is made up of a series of sequences. According to this feature, one sequence is executed every time an action corresponding to an tactic selected by a player is performed, and, when such a sequence is sequentially executed plural times, the game will be terminated. Thus, a game strategy can be set plural times during one game to provide a higher level of excitement/enjoyment of the game.

When the game is configured to simulate a baseball, the image display control means is operable to display a player's character onto the display unit, the manual operation section is preferably operable, when the player's character is configured to simulate a pitcher, to allow a player to input, as a tactic, pitching data including at least one of a pitch type, a pitched-ball speed and a pitch location of a ball character configured to simulate a ball to be thrown by the player's character. According to this feature, when the present invention is applied to a baseball game, and the player's character is configured to simulate a pitcher, the manual operation section allows a player to input, as a tactic, pitching data including at least one of a pitch type, a pitched-ball speed and a pitch location of the ball character configured to simulate a ball to be thrown by the player's character. This makes it possible to provide a wide variation in the pitched ball character.

When the game is configured to simulate a baseball, and the image display control means is operable to display a player's character onto the display unit, the manual operation section is preferably operable, when the player's character is configured to simulate a batter, to allow a player to input, as a tactic, batting data countering the pitching data, wherein the betting data includes at least one of a swing height and a swing speed of a bat character configured to simulate a bat to be swung by the player's character. According to this feature, when the present invention is applied to a baseball game, and the player's character is configured to simulate a batter, the manual operation section allows a player to input, as a tactic, batting data countering the pitching data, wherein the betting data includes at least one of a swing height and a swing speed of the bat character configured to simulate a bat to be swung by the player's character. This makes it possible to provide a wide variation in swing of the batter character.

Preferably, the image display control means is operable to display, on the display unit in each of the game apparatuses, an image of a competition game configured such that a player's character and an opponent's character alternately play on offensive and defensive sides through a game medium, wherein each of the game apparatus includes: area-graphic display control means adapted to display, in a predetermined position of an image screen of the display unit, an area graphic having a predetermined shape which virtually represents a designable range for a given offensive location set in a game space of the game medium by the offensive side, and a given defensive location set in the game space by the defensive side in such a manner as to take a given action relative to the game medium; setup means adapted, depending on whether the game apparatus is played on the offensive or defensive side, to allow a corresponding one of the offensive and defensive location to be set up in the area graphic as the player-side tactical data to be created based on a result of an input operation to the manual operation section, and to set up a shape of a first mark image on the basis of the setup location; mark display control means adapted to display, onto the area graphic, the first mark image set up by the setup means, and, after completion of the setup processing by the setup means, display, onto the area graphic image, a second mark image which is received from the opponent's game apparatus through the communication means, and set up in a predetermined shape on the basis of the other one of the offensive and defensive locations which is set up in the area graphic; and offensive vs. defensive result-setting means adapted to set an offensive vs. defensive result depending on a level of overlapping between the first and second mark images, wherein the action-setting means is operable to create the shape of the first mark image as the player-side tactical data.

According to this feature, each of the player's and opponent's game apparatuses is equipped with the manual operation section adapted to be externally operated, the display unit and the communication means. The game apparatuses are connected to a network so as to perform data communication about player side and opponent side tactical data therebetween, and a game, such as a game configured to simulate baseball, in which a player's character and an opponent character play rolls of an offensive side and a defensive side through a game medium, is displayed on the respective displays of the game apparatuses, and progressed. In a predetermined position of an image screen of the display unit, the area-graphic display control means displays an area graphic having a predetermined shape which virtually represents a designable range for a given offensive location set in a game space of the game medium by the offensive side, and a given defensive location set in the game space by the defensive side in such a manner as to take a given action relative to the game medium (in a baseball game, the offensive location may be a passing position of the swung bat character above a home base, and the defensive location may be a passing position of the pitched ball character above the home base). Depending on whether the game apparatus is played on the offensive or defensive side, the setup means of the play game apparatus allows a corresponding one of the offensive and defensive location (in the baseball game, a swing location for the offensive side or a pitch location for the defensive side) to be set up in the area graphic as the player-side tactical data to be created based on a result of an input operation to the manual operation section. Further, the setup means sets up a shape of a first mark image on the basis of the setup location. Then, the mark display control means displays, onto the area graphic, the first mark image set up by the setup means, and, after completion of the setup processing by the setup means, display, onto the area graphic image, a second mark image which is received from the opponent's game apparatus through the communication means, and set up in a predetermined shape on the basis of the other one of the offensive and defensive locations (in the baseball game, the swing location and the pitch location) which is set up in the area graphic. Then, the offensive vs. defensive result-setting means sets an offensive vs. defensive result (in the baseball game, a batting result) depending on a level of overlapping between the first and second mark images. Thus, the first mark image having a predetermined shape set up on the basis of either one of the offensive and defensive location which is designated through the manual operation section of the player's game apparatus operated by the player who plays the game on the offensive or defensive side (in the baseball game, a pitcher side or batter side), and the second mark image which is received from the opponent's game apparatus through the communication means after being designated by the opponent' game apparatus operated by the opponent, and set up in a predetermined shape on the basis of the other location, are displayed on the area graphic having a predetermined shape which virtually represents a designable range for the given offensive location set in a game space of the game medium by the offensive side, and the given defensive location set in the game space by the defensive side in such a manner as to take a given action relative to the game medium (in a baseball game, the offensive location may be a passing position of the swung bat character above a home base, and the defensive location may be a passing position of the pitched ball character above the home base). Then, a level of overlapping between the first and second mark images is detected to set an offensive vs. defensive result depending on the overlapping level. Thus, the prediction (sherlocking) about the location designated by the opponent provides a higher level of excitement/enjoyment of the game. In addition, as compared with conventional competition game, a further precise offensive vs. defensive result (in the baseball game, a batting result) can be set to provide a realistic game capable of keeping players interested.

The game apparatus for use in the competition game system has no element or component required for a master/slave relationship, and therefore can have a simplified configuration.

In this specification, an element or component described as means for achieving a certain function is not limited to a structure or configuration described in this specification to achieve the certain function, but includes any other structure or configuration, such as a unit, component or element, capable of achieving the certain function.

INDUSTRIAL APPLICABILITY

In the competition game system of the present invention, data to be exchange between player's and opponent's game apparatuses can be limited to tactical data created in each of the game apparatus, and each of the game apparatuses can perform the same operation according to the input operation data acquired from the other. Thus, an identical competition result is created in the respective game apparatuses to allow a game image having an identical event to be displayed on the respective display unit of the game apparatuses. This makes it possible to eliminate the need for the conventional processing based on a master-slave relationship, so as to reduce burdens of configuration and processing.

The invention claimed is:

1. A competition game system configured to simulate a baseball game comprising at least two game apparatuses each including a manual operation section for allowing a player to perform an input operation, and a display unit for displaying an image, wherein tactical data created based on respective results of the input operations to said manual operation sections are transmitted and received between respective ones of said game apparatuses via a communication section to allow a competition game having an identical event to be progressed in each of said game apparatuses based on said transmitted and received tactical data, wherein each of said game apparatuses comprising:

an action-setting means adapted, based on a result of an input operation to said manual operation section by a player, to create player-side tactical data;

a transmitting/receiving control means adapted to transmit said player-side tactical data created by said action-setting means, to the at least one opponent's game apparatus, and receive opponent-side tactical data from said opponent's game apparatus, through said communication section;

a determination means adapted to determine a competition result, based on said player-side tactical data, and said opponent-side tactical data received by said transmitting/receiving control means; and an image display control means adapted to display a game image onto said display unit according to said competition result determined by said determination means, wherein said determination means includes:

a first storage means adapted to store a plurality of types of player's tactics and respective success probabilities of said player's tactics, in associated relation; and a second storage means adapted to store a plurality of types of opponent's tactics and respective success probabilities of said opponent's tactics, in associated relation;

wherein said determination means is operable, based on a previously stored success probability of each of selected one or more of said player's tactics, and a previously stored success probability of each of selected one or more of said opponent's tactics which are received from said opponent's game apparatus by said transmitting/receiving control means, to determine a competition result in accordance with a predetermined result determination rule which is shared by said at least two game apparatuses;

said image display control means is operable to display a player's character onto said display unit: and said manual operation section is operable, when said player's character is configured to simulate a pitcher, to allow a player to input, as a tactic, pitching data including at least one of a pitch type, a pitched-ball speed and a pitch location of a ball character configured to simulate a ball to be thrown by said player's character.

2. The competition game system as defined in claim 1, wherein said action-setting means is operable to create the player-side tactical data in conformity to a content of the input operation to said manual operation section.

3. The competition game system as defined in claim 1, wherein said action-setting means includes operation judgment means adapted to judge whether there is an input operation to said manual operation section, wherein said action-setting means is operable, when it is judged that there is no input operation, to create the player-side tactical data in accordance with a predetermined tactic creation rule.

4. The competition game system as defined in claim 1, wherein:

said communication section includes a buffer adapted to temporarily store at least received data; and said transmitting/receiving control means is operable, after transmitting the player-side tactical data to said opponent's game apparatus, to access said buffer so as to obtain received data therefrom.

5. The competition game system as defined in claim 1, wherein said manual operation section is adapted to allow a plurality of tactics determining a content of the game progression, to be manually operated in a selectable manner.

6. The competition game system as defined in claim 1, further comprising a random number generation means which is shared by all of said game apparatuses, and operable to generate a pseudo-random number for use as said predetermined result determination rule, said random number generation means being adapted to be initialized before start of said game.

7. The competition game system as defined in claim 1, wherein said competition result to be determined by said determination means is a result of execution of one sequence, and said game is made up of a series of sequences.

8. The competition game system as defined in claim 1, wherein said image display control means is operable to display, on the display unit in each of said game apparatuses, an image of a competition game configured such that a player's character and an opponent's character alternately play on offensive and defensive sides through a game medium, wherein each of said game apparatus includes:

an area-graphic display control means adapted to display, in a predetermined position of an image screen of said display unit, an area graphic having a predetermined shape which virtually represents a designable range for a given offensive location set in a game space of said game medium by the offensive side, and a given defensive location set in said game space by the defensive side in such a manner as to take a given action relative to said game medium;

a setup means adapted, depending on whether said game apparatus is played on the offensive or defensive side, to allow a corresponding one of said offensive and defensive location to be set up in said area graphic as the player-side tactical data to be created based on a result of an input operation to said manual operation section, and to set up a shape of a first mark image on the basis of said setup location;

a mark display control means adapted to display, onto said area graphic, said first mark image set up by said setup means, and, after completion of said setup processing by said setup means, display, onto said area graphic image, a second mark image which is received from the opponent's game apparatus through said communication means, and set up in a predetermined shape on the basis of the other one of said offensive and defensive locations which is set up in said area graphic; and an offensive vs. defensive result-setting means adapted to set an offensive vs. defensive result depending on a level of overlapping between said first and second mark images, wherein said action-setting means is operable to create the shape of said first mark image as the player-side tactical data.

9. A game apparatus for use in a competition game system configured to simulate a baseball game with at least one other game apparatus, each game apparatus including a manual operation section for allowing a player to perform an input operation, and a display unit for displaying an image, wherein tactical data created based on respective results of the input operations to said manual operation sections are transmitted and received among said game apparatus and said at least one other game apparatus via a communication section to allow a competition game having an identical event to be progressed based on said transmitted and received tactical data, wherein said game apparatus comprising:

an action-setting means adapted, based on a result of an input operation to said manual operation section by a player, to create player-side tactical data;

a transmitting/receiving control means adapted to transmit said player-side tactical data created by said action-setting means, to the at least one opponent's game apparatus, and receive opponent-side tactical data from said opponent's game apparatus, through said communication section;

a determination means adapted to determine a competition result, based on said player-side tactical data, and said opponent-side tactical data received by said transmitting/receiving control means; and an image display control means adapted to display a game image onto said display unit according to said competition result determined by said determination means, wherein said determination means includes:

a first storage means adapted to store a plurality of types of player's tactics and respective success probabilities of said player's tactics, in associated relation; and a second storage means adapted to store a plurality of types of opponent's tactics and respective success probabilities of said opponent's tactics, in associated relation;

wherein said determination means is operable, based on a success probability of each of selected one or more of said player's tactics, and a success probability of each of selected one or more of said opponent's tactics which are received from said opponent's game apparatus by said transmitting/receiving control means, to determine a competition result in accordance with a predetermined result determination rule which is shared by said game apparatus and said at least one other game apparatus, including said opponent's game apparatus;

said image display control means is operable to display a player's character onto said display unit; and said manual operation section is operable when said player's character is configured to simulate a pitcher, to allow a player to input, as a tactic, pitching data including at least one of a pitch type, a pitched-ball speed and a pitch location of a ball character configured to simulate a ball to be thrown by said player's character.

10. The competition game system of claim 1, wherein a player's tactic among said player's tactics indicates a tactic selected by the player from among a plurality of predetermined tactics;

an opponent's tactic among said opponent's tactics indicates a tactic selected by the opponent from among the plurality of predetermined tactics;

in the case where the player's tactic and the opponent's tactic are coincident with each other, the determination means determines the competition result in accordance with the success probability associated with the tactic selected by one of the player and the opponent; and in a case where the player's tactic and the opponent's tactic are not coincident with each other, the determination means determines the competition result in accordance with the success probability associated with the tactic selected by the other one of the player and the opponent.

11. The competition game system of claim 1, further comprising:

first selecting means for selecting one or more player tactics from among the stored plurality of type of player's tactics to be active; and second selecting means for selecting one or more opponent tactics from among the stored plurality of type of opponent's tactics to be active; and wherein multiple tactics are selected to be active from among either one or both of the stored plurality of player tactics and the stored plurality of opponent's tactics;

wherein said determining means determines said competition result based on previously stored, respective success probabilities of said selected active multiple tactics, in associated relation.

12. A competition game system configured to simulate a baseball game comprising at least two game apparatuses each including a manual operation section for allowing a player to perform an input operation, and a display unit for displaying an image, wherein tactical data created based on respective results of the input operations to said manual operation sections are transmitted and received between respective ones of said game apparatuses via a communication section to allow a competition game having an identical event to be progressed in each of said game apparatuses based on said transmitted and received tactical data, wherein each of said game apparatuses comprising:

an action-setting means adapted, based on a result of an input operation to said manual operation section by a player, to create player-side tactical data;

a transmitting/receiving control means adapted to transmit said player-side tactical data created by said action-setting means, to the at least one opponent's game apparatus, and receive opponent-side tactical data from said opponent's game apparatus, through said communication section;

a determination means adapted to determine a competition result, based on said player-side tactical data, and said opponent-side tactical data received by said transmitting/receiving control means; and an image display control means adapted to display a game image onto said display unit according to said competition result determined by said determination means, wherein said determination means includes:

a first storage means adapted to store a plurality of types of player's tactics and respective success probabilities of said player's tactics, in associated relation; and a second storage means adapted to store a plurality of types of opponent's tactics and respective success probabilities of said opponent's tactics, in associated relation;

wherein said determination means is operable, based on a previously stored success probability of each of selected one or more of said player's tactics, and a previously stored success probability of each of selected one or more of said opponent's tactics which are received from said opponent's game apparatus by said transmitting/receiving control means, to determine a competition result in accordance with a predetermined result determination rule which is shared by said at least two game apparatuses, said image display control means is operable to display a player's character onto said display unit; and said manual operation section is operable, when said player's character is configured to simulate a batter, to allow a player to input, as a tactic, batting data countering said pitching data, said betting data including at least one of a swing height and a swing speed of a bat character configured to simulate a bat to be swung by said player's character.

13. A game apparatus for use in a competition game system configured to simulate a baseball game with at least one other game apparatus, each game apparatus including a manual operation section for allowing a player to perform an input operation, and a display unit for displaying an image, wherein tactical data created based on respective results of the input operations to said manual operation sections are transmitted and received among said game apparatus and said at least one other game apparatus via a communication section to allow a competition game having an identical event to be progressed based on said transmitted and received tactical data, wherein said game apparatus comprising:

an action-setting means adapted, based on a result of an input operation to said manual operation section by a player, to create player-side tactical data;

a transmitting/receiving control means adapted to transmit said player-side tactical data created by said action-setting means, to the at least one opponent's game apparatus, and receive opponent-side tactical data from said opponent's game apparatus, through said communication section;

a determination means adapted to determine a competition result, based on said player-side tactical data, and said opponent-side tactical data received by said transmitting/receiving control means; and an image display control means adapted to display a game image onto said display unit according to said competition result determined by said determination means, wherein said determination means includes:

a first storage means adapted to store a plurality of types of player's tactics and respective success probabilities of said player's tactics, in associated relation; and a second storage means adapted to store a plurality of types of opponent's tactics and respective success probabilities of said opponent's tactics, in associated relation;

wherein said determination means is operable, based on a success probability of each of selected one or more of said player's tactics, and a success probability of each of selected one or more of said opponent's tactics which are received from said opponent's game apparatus by said transmitting/receiving control means, to determine a competition result in accordance with a predetermined result determination rule which is shared by said game apparatus and said at least one other game apparatus, including said opponent's game apparatus;

said image display control means is operable to display a player's character onto said display unit; and said manual operation section is operable, when said player's character is configured to simulate a batter, to allow a player to input, as a tactic, batting data countering said pitching data, said betting data including at least one of a swing height and a swing speed of a bat character configured to simulate a bat to be swung by said player's character.

* * * * *